US011303711B2

(12) United States Patent
Tamura

(10) Patent No.: US 11,303,711 B2
(45) Date of Patent: Apr. 12, 2022

(54) COMMUNICATION SYSTEM, COMMUNICATION DEVICE, COMMUNICATION METHOD, AND NON-TRANSITORY COMPUTER READABLE MEDIUM STORING PROGRAM

(71) Applicant: NEC Corporation, Tokyo (JP)

(72) Inventor: Toshiyuki Tamura, Tokyo (JP)

(73) Assignee: NEC Corporation

( * ) Notice: Subject to any disclaimer, the term of this patent is extended or adjusted under 35 U.S.C. 154(b) by 20 days.

(21) Appl. No.: 16/590,792

(22) Filed: Oct. 2, 2019

(65) Prior Publication Data

US 2020/0036800 A1 Jan. 30, 2020

Related U.S. Application Data

(63) Continuation of application No. 16/041,311, filed on Jul. 20, 2018, now abandoned, which is a
(Continued)

(30) Foreign Application Priority Data

Feb. 13, 2014 (JP) .............................. JP2014-025566

(51) Int. Cl.
*H04L 29/08* (2006.01)
*H04L 67/148* (2022.01)
(Continued)

(52) U.S. Cl.
CPC ........ *H04L 67/148* (2013.01); *G06F 9/45533* (2013.01); *G06F 9/45558* (2013.01);
(Continued)

(58) Field of Classification Search
CPC ....... H04L 67/148; H04L 69/40; H04L 29/10; H04L 67/12; G06F 9/45533;
(Continued)

(56) References Cited

U.S. PATENT DOCUMENTS 8,264,956 B2 9/2012 Ramankutty et al.
8,782,008 B1 7/2014 Xing et al.
(Continued)

FOREIGN PATENT DOCUMENTS

CN 1321296 A 11/2001
CN 101730124 A 6/2010
(Continued)

OTHER PUBLICATIONS

"Network Functions Virtualisation (NFV)", Update White Paper, at the "SDN and OpenFlow World Congress", Frankfurt-Germany, (http://portal.etsi.org/NFV/NFV_White_Paper2.pdf, pp. 1-16, Oct. 2013.
(Continued)

*Primary Examiner* — Kiet Tang
(74) *Attorney, Agent, or Firm* — NEC-IPC

(57) ABSTRACT

An object is to provide a communication system capable of preventing a number of control signals, which could occur in a mobile communication network, from occurring when a VM is deleted in a node device without suspending a service. A communication system according to the present invention includes a communication device 1, and a communication device 2 configured to control a plurality of sessions set between the communication devices 1 and 2 by using a plurality of VMs, in which the communication device 2 notifies, by using a determination that a plurality of sessions that are controlled between the communication device 1 and a VM 3 should be controlled in a VM 4 different from the VM 3 as a trigger, the communication device 1 of identification information used in the VM 4 and updates the sessions.

3 Claims, 71 Drawing Sheets

Related U.S. Application Data continuation of application No. 15/118,304, filed as application No. PCT/JP2015/000427 on Jan. 30, 2015, now Pat. No. 10,057,355.

(51) Int. Cl.

| | | |
|---|---|---|
| *H04W 76/30* | (2018.01) | |
| *H04W 76/20* | (2018.01) | |
| *G06F 9/455* | (2018.01) | |
| *H04W 76/12* | (2018.01) | |
| *H04W 76/15* | (2018.01) | |
| *H04W 76/11* | (2018.01) | |
| *H04L 69/40* | (2022.01) | |
| *H04W 76/22* | (2018.01) | |
| *H04W 88/12* | (2009.01) | |

(52) U.S. Cl.
CPC ............ *H04W 76/11* (2018.02); *H04W 76/12* (2018.02); *H04W 76/15* (2018.02); *H04W 76/20* (2018.02); *H04W 76/30* (2018.02); *G06F 2009/45595* (2013.01); *H04L 69/40* (2013.01); *H04W 76/22* (2018.02); *H04W 88/12* (2013.01)

(58) Field of Classification Search
CPC ....... G06F 9/45558; G06F 2009/45595; G06F 9/45504; G06F 9/45516; H04W 76/12; H04W 76/15; H04W 76/11; H04W 76/30; H04W 76/20; H04W 76/22; H04W 88/12; H04W 76/10
See application file for complete search history.

(56) References Cited

U.S. PATENT DOCUMENTS

| | | | |
|---|---|---|---|
| 9,642,077 B2 | 5/2017 | Mathai et al. | |
| 9,867,225 B2 | 1/2018 | Xia et al. | |
| 2010/0226350 A1* | 9/2010 | Lim | H04W 8/26 370/338 |
| 2011/0255409 A1* | 10/2011 | Aramoto | H04W 36/0027 370/236 |
| 2011/0314467 A1 | 12/2011 | Pearson | |
| 2014/0105103 A1 | 4/2014 | Nethi et al. | |
| 2014/0198655 A1 | 7/2014 | Ishii et al. | |
| 2014/0282519 A1 | 9/2014 | Apte et al. | |
| 2014/0317293 A1* | 10/2014 | Shatzkamer | G06F 9/45558 709/226 |
| 2015/0178128 A1 | 6/2015 | Knowles et al. | |
| 2015/0305085 A1* | 10/2015 | Huang | H04W 76/30 370/328 |
| 2016/0088519 A1* | 3/2016 | Hoffmann | H04W 28/0247 370/236 |

FOREIGN PATENT DOCUMENTS

| | | |
|---|---|---|
| CN | 103238345 A | 8/2013 |
| CN | 103297412 A | 9/2013 |
| EP | 2 665 228 | 11/2013 |
| JP | 2010-045429 A | 2/2010 |
| JP | 2013-239913 | 11/2013 |
| JP | 2013-258648 | 12/2013 |
| KR | 20120084641 A | 7/2012 |
| RU | 2503148 C1 | 10/2013 |
| WO | WO 20008037279 A1 | 4/2008 |
| WO | WO 2013/110352 A1 | 8/2013 |
| WO | WO 2013/161178 A1 | 10/2013 |
| WO | WO 2013/164917 A1 | 11/2013 |

OTHER PUBLICATIONS

3GPP TS 23.401, 3$^{rd}$ Generation Partnership Project; "Technical Specification Group Services and System Aspects; General Packet Radio Service (GPRS) enhancements for Evolved Universal Terrestrial Radio Access Network (E-UTRAN) access" (Release 12), pp. 1-301, Dec. 2013.

International Search Report and Written Opinion dated Apr. 21, 2015, in corresponding PCT International Application.

Extended European Search Report dated Aug. 21, 2017, by the European Patent Office in counterpart European Patent Application No. 15749594.6.

Office Action issued in a counterpart Russian Patent Application No. 2016136355, dated Oct. 19, 2018.

Decision to Grant a Patent dated Mar. 5, 2019, issued from the Japanese Patent Office in counterpart Japanese Patent Application No. 2015-562720.

Notification of the First Office Action dated Aug. 27, 2018 from the Chinese National Intellectual Property Administration, PRC in counterpart Chinese Patent Application No. 201580008540. 7.

3GPP TR 23.857 V11.0.0; 3$^{rd}$ Generation Partnership Project; Technical Specification Group Core Network and Terminals; Study of Evolved Packet Core (EPC) Nodes Restoration (Release 11) (Dec. 2012).

S3-130641, China Unicom, "Generalize the Environment of Functions and Nodes to Cover NFV (Network Function visualization) Scenarios" 3GPP TSG SA WG3 (Security) Meeting #72, Jul. 8-12, 2013.

S2-130626, NEC, "SaMOG Solution Based on Dynamic Flow Routing", SA WG2 Meeting #95, Prague, Czech Republic, Jan. 28-Feb. 1, 2013.

\* cited by examiner

SGW initiated S5-C/S8-C update(Per UE procedure)

SGW initiated S5-C/S8-C update(Bulk procedure)

SGW initiated S5-U/S8-U update (Per UE procedure)

SGW initiated S4-U update (Bulk procedure)

SGW initiated S11 update (Per UE procedure)

SGW initiated S11 update (Bulk procedure)

SGW initiated Gxx update

PGW initiated S5-C/S8-C update (Per UE procedure)

PGW initiated SGi update

PGW initiated Gz update

SGSN initiated S4-C update (Per UE procedure)

SGSN initiated Iu-C update

SGSN initiated S6d update

SGSN initiated Gr update

SGSN initiated Gn-C update (Per UE procedure)

SGSN initiated Gs update

GGSN initiated Gn-U update (Per UE procedure)

GGSN initiated Gi update

GGSN initiated Gx update

GGSN initiated Gy update

GGSN initiated Gz update

RNC/BSC initiated Iu-C update

RNC/BSC initiated Iu-U update (Per UE procedure)

COMMUNICATION SYSTEM, COMMUNICATION DEVICE, COMMUNICATION METHOD, AND NON-TRANSITORY COMPUTER READABLE MEDIUM STORING PROGRAM

CROSS-REFERENCE TO RELATED PATENT APPLICATIONS

This application is a continuation of U.S. patent application Ser. No. 16/041,311, filed Jul. 20, 2018, which is a continuation of U.S. patent application Ser. No. 15/118,304, filed Aug. 11, 2016 (now U.S. Pat. No. 10,057,355), which is a National Stage Entry of International Application No. PCT/JP2015/000427, filed Jan. 30, 2015, which claims priority from Japanese Patent Application No. 2014-025566, filed Feb. 13, 2014. The entire contents of the above-referenced applications are expressly incorporated herein by reference.

TECHNICAL FIELD

The present invention relates to a communication system, a communication device, a communication method, and a program. In particular, the present invention relates to a communication system including a communication device that relays communication between terminals, a communication device, a communication method, and a program.

BACKGROUND ART

A communication network includes a plurality of relay devices in order to carry out communication between terminal devices. For example, in the 3GPP (3rd Generation Partnership Project) for laying down standard specifications for mobile communication networks, they are examining a network configuration in which user traffic and control traffic are relayed by using node devices such as MMEs (Mobility Management Entities), SGWs (Serving Gateways), and PGWs (Packet Data Network Gateways).

In recent years, it has been examined to efficiently use resources of a network by virtualizing node devices forming the network. For example, a case where a node device uses a VM (Virtual Machine) for each interface through which the node device connects with another node device is explained hereinafter. When traffic between the node device and the other node device increases, a VM for performing communication with the other node device is added in the node device. Further, when the traffic between the node device and the other node device decreases, a VM for performing communication with the other node device is deleted and the deleted VM may be added (i.e., reused) as a VM that used for performing communication with another node device. The VM may be, for example, a communication resource, such as an internal memory, disposed inside the node device. Further, the VM is used as a partial element for forming the node device. That is, the above-described example is based on the precondition that a plurality of interfaces are used as partial elements in the node device and the VM corresponds to a communication resource constituting one of the interfaces.

In this way, by adding or deleting a VM according to the amount of traffic processed by the node device or according to other conditions, the communication resources in the network can be efficiently used. In Non-patent Literature 1, virtualization in a network or in a node device is specified as NFV (Network Functions Virtualization).

Note that examples of the main factor for adding a VM in a node device include a case where there is a possibility of the occurrence of congestion in the node device or in the whole network due to an increase in traffic or the like. When there is a possibility of the occurrence of congestion, the increase in traffic can be handled by adding a VM. For example, in the case where a mobile communication network is taken into consideration, traffic that is transmitted from a terminal device due to the occurrence of an event such as an ATTACH in which upon power-on of the terminal device, the terminal device connects to the mobile communication network or a handover that occurs as the terminal device moves flows into a newly-added VM.

On the other hand, examples of the main factor for deleting a VM in a node device include a purpose of preventing wasteful use of communication resources when the processing capacity of the node device considerably surpasses the traffic capacity thereof. That is, it is possible to reduce the power consumption and reduce the communication resources by eliminating electric power supplied to a VM that has been excessively (or wastefully) used.

CITATION LIST

Non Patent Literature

Non-patent Literature 1: "Network Functions Virtualisation—Update White Paper" Oct. 15-17, 2013 at the "SDN and OpenFlow World Congress", Frankfurt-Germany Non-patent Literature 2: 3GPP TS 23.401 V12.3.0 (2013-12) 3rd Generation Partnership Project; Technical Specification Group Services and System Aspects; General Packet Radio Service (GPRS) enhancements for Evolved Universal Terrestrial Radio Access Network (E-UTRAN) access (Release 12)

SUMMARY OF INVENTION

Technical Problem

Data related to a subscriber, data related to a session, or the like is associated with a VM that is used inside a node device such as an MME, an SGW and a PGW. Therefore, in order to delete a VM without suspending a mobile communication service provided to a subscriber, it is necessary to transfer data related to the subscriber, date related to a session, or the like to another VM and then delete the original VM with which the date related to the subscriber or the like is no longer associated. However, there is a problem that there are no specifications for such an operation in the standard specified in the 3GPP or other communication standards.

An object of the present invention is to provide a communication system, a communication device, a communication method, and a program capable of preventing a number of control signals, which could occur in a mobile communication network, from occurring when a VM is deleted in a node device without suspending a service.

Solution to Problem

A communication system according to a first aspect of the present invention includes: a first communication device, and a second communication device configured to control a plurality of sessions set between the first and second communication devices by using a plurality of VMs, in which the second communication device notifies, by using a determination that a plurality of sessions that are controlled between the first communication device and a first VM among the plurality of VMs should be controlled in a second VM among the plurality of VMs different from the first VM as a trigger, the first communication device of identification information used in the second VM and updates the sessions.

A communication device according to a second aspect of the present invention includes a control unit, the control unit being configured to: control a plurality of sessions set between the communication device and another communication device by using a plurality of VMs; and notify, by using a determination that a plurality of sessions that are controlled between the another communication device and a first VM among the plurality of VMs should be controlled in a second VM among the plurality of VMs different from the first VM as a trigger, the another communication device of identification information used in the second VM and update the sessions.

A communication method according to a third aspect of the present invention includes: controlling a plurality of sessions set with another communication device by using a plurality of VMs; determining that a plurality of sessions that are controlled between the another communication device and a first VM among the plurality of VMs should be controlled in a second VM among the plurality of VMs different from the first VM; notifying the another communication device of identification information used in the second VM; and updating the sessions.

A program according to a fourth aspect of the present invention causes a computer to execute: controlling a plurality of sessions set with another communication device by using a plurality of VMs; determining that a plurality of sessions that are controlled between the another communication device and a first VM among the plurality of VMs should be controlled in a second VM among the plurality of VMs different from the first VM; notifying the another communication device of identification information used in the second VM; and updating the sessions.

Advantageous Effects of Invention

According to the present invention, it is possible to provide a communication system, a communication device, a communication method, and a program capable of preventing a number of control signals, which could occur in a mobile communication network, from occurring when a VM is deleted in a node device without suspending a service. Further, the present invention can also be applied to an operation in which when a VM is added, rather than being deleted, a plurality of sessions are transferred to the added VM.

DESCRIPTION OF EMBODIMENTS

Explanation of Comparative Example

A comparative example that the inventors have examined before conceiving a communication system according to an exemplary embodiment is explained hereinafter with reference to FIGS. 99 to 101. In the comparative example, a procedure in which a VM in an MME is deleted and a new session is constructed in accordance with the procedure specified in the current 3GPP is explained. Further, in FIGS. 99 to 101, explanations are given by using a UE (User Equipment), an eNB (evolved NB), an MME, an SGW, a PGW, a PCRF (Policy and Charging Rules Function) and an HSS (Home Subscriber Server), which are devices specified in the 3GPP.

Firstly, an outline of a process flow from the deletion of a VM in an MME to the construction of a new session is explained with reference to FIG. 99. When it is determined that a session (e.g., a PDN connection) set in the VM of the MME should be transferred, the MME starts an MME-initiated Detach procedure (Non-patent Literature 2: section 5.3.8.3) (S1001). Upon the start-up of the MME-initiated Detach procedure, a UE (User Equipment) changes its state to a Detach state (a state in which the UE is detached from the network). Next, the UE, which is in the Detach state, starts an E-UTRAN Initial Attach process (Non-patent Literature 2: section 5.3.2.1) (S1002). Next, when the MME receives an ATTACH signal, the MME constructs an S11 session by using an MME different from the MME in which the VM is to be deleted (S1003). In this way, the transfer of the PDN connection is completed.

By performing the process in the step S1001, information about the UE detached from the MME can be deleted. Further, in an SGW, a PGW, or the like, by detaching the UE, the information about the UE detached from the respective node device can be deleted.

Figure 99:
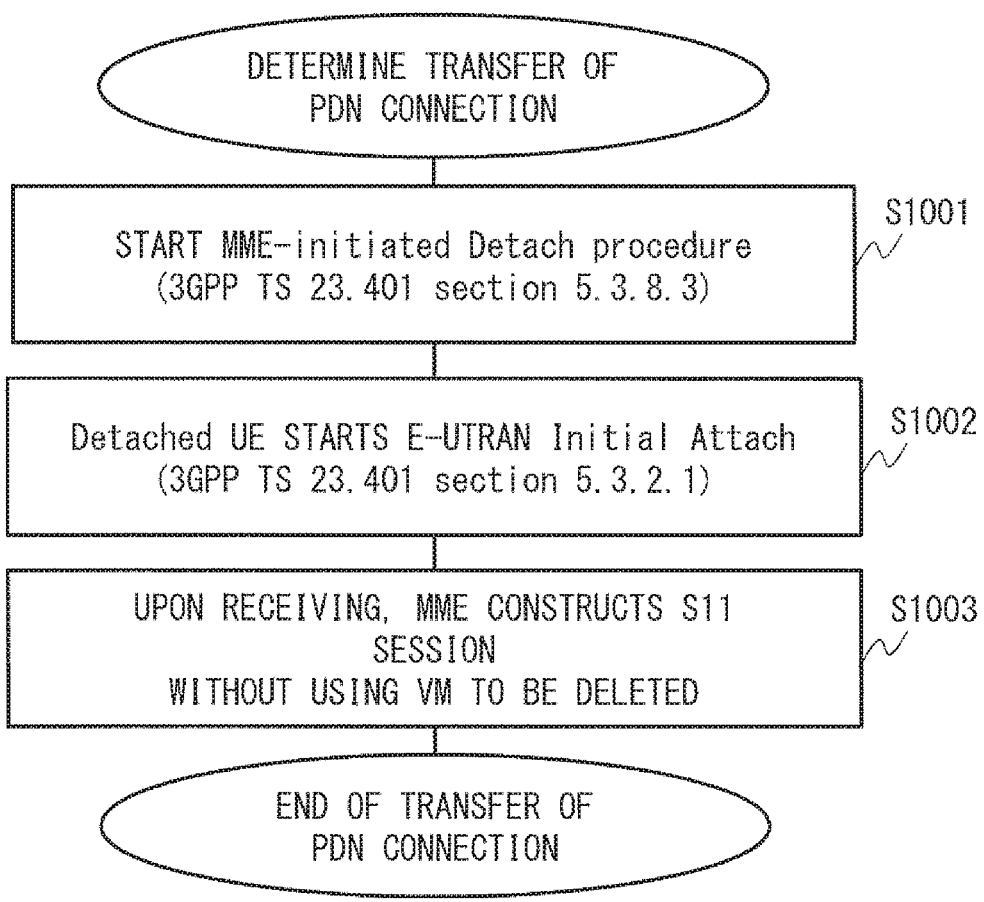
FIG. 99 shows a flowchart for explaining an outline of a process flow for deleting a VM in an MME and constructing a new session in a comparative example.
Figure 100:
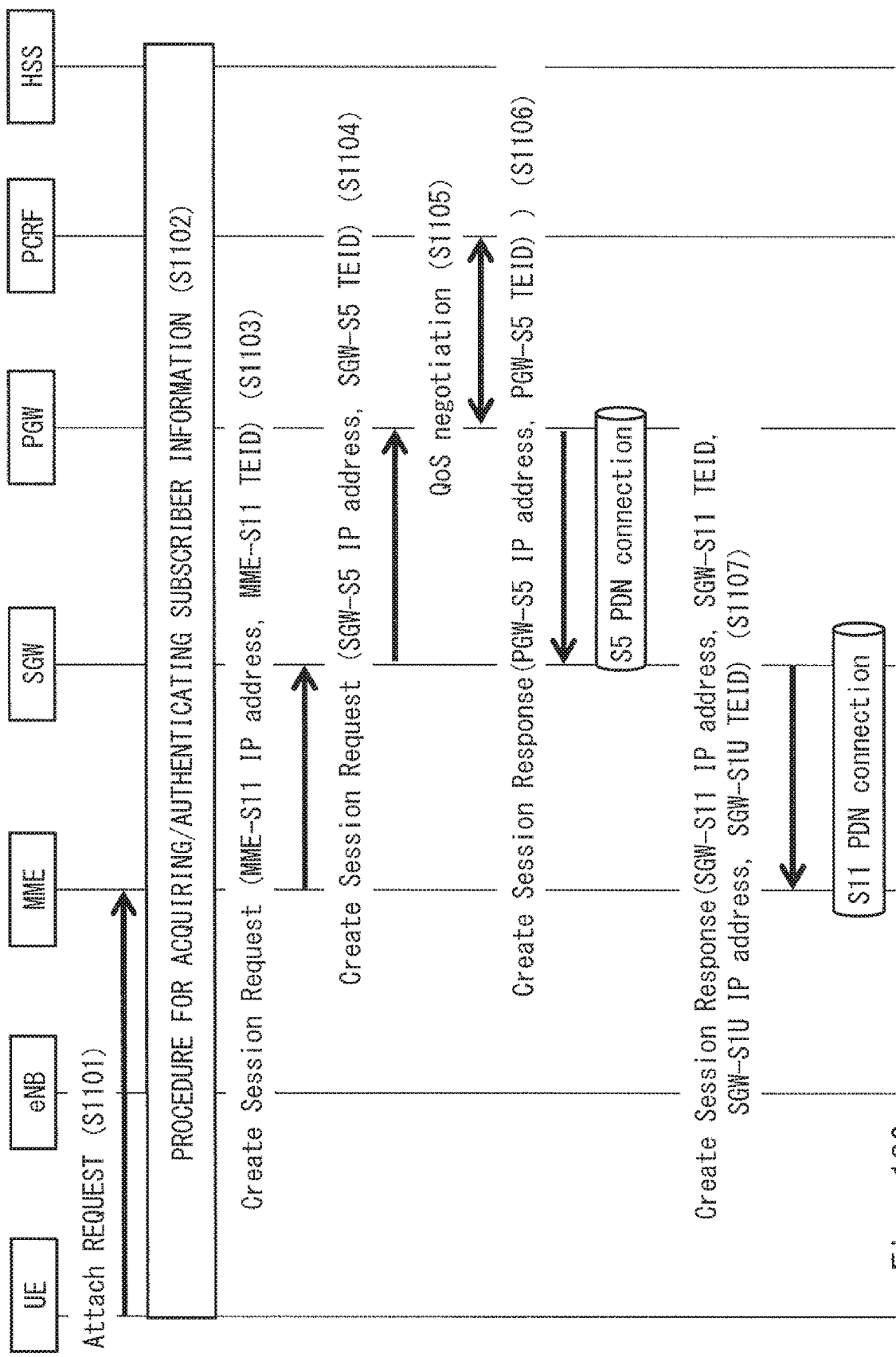
FIG. 100 shows a flow of a PDN connection resetting process in the comparative example.
Figure 101:
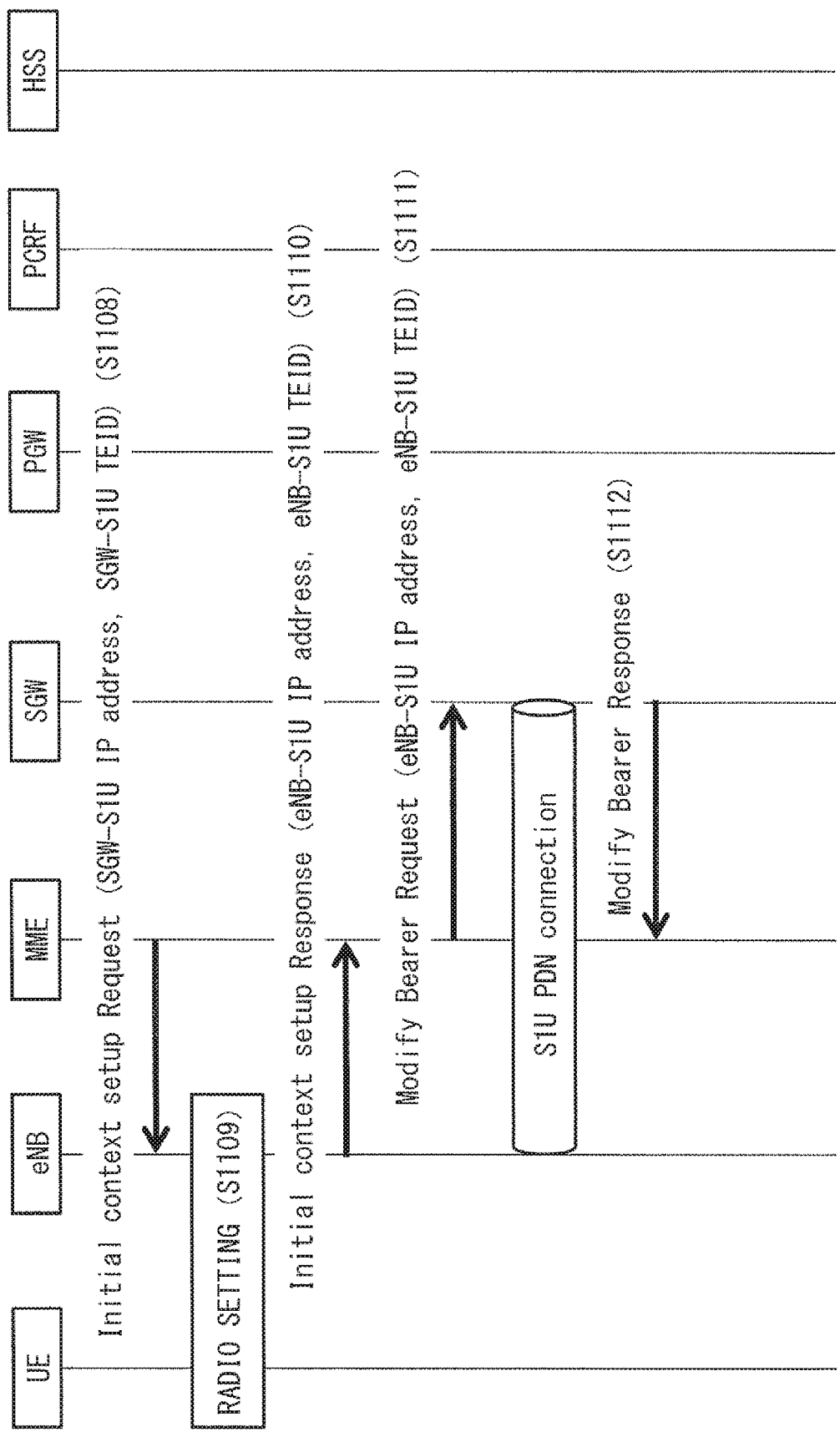
FIG. 101 shows a flow of the PDN connection resetting process in the comparative example.

Next, a flow of process for re-setting a PDN connection performed in the steps S1002 and S1003 in FIG. 99 is explained in a concrete manner with reference to FIGS. 100 and 101.

Firstly, a UE transmits an Attach request message to an MME (S1101). Next, in a step S1002, the UE is authenticated (S1102). Next, the MME transmits a Create Session Request (MME-S11 IP address, MME-S11 TEID) message to an SGW (S1103).

Next, the SGW transmits the Create Session Request (SGW-S5 IP address, SGW-S5 TEID) message to a PGW (S1104). Next, a QoS negotiation process is performed between the PGW and a PCRF (S1105). Next, the PGW transmits a Create Session Response (PGW-S5 IP address, PGW-S5 TEID) message to the SGW (S1106). By transmitting/receiving the messages in the steps S1104 and S1106, tunnel information of each of the SGW and the PGW is exchanged between the SGW and the PGW. As a result, a PDN connection, which is used in an S5 interface, is established.

Next, the SGW transmits the Create Session Response (SGW-S11 IP address, SGW-S11 TEID, SGW-S1-U IP address, SGW-S1-U TEID) message to the MME (S1107). By transmitting/receiving the messages in the steps S1103 and S1107, tunnel information of each of the SGW and the MME is exchanged between the SGW and the MME. As a result, a PDN connection, which is used in an S11 interface and an S1-U interface, is established.

Next, the MME transmits an Initial context setup Request (SGW-S1-U IP address, SGW-S1-U TEID) message to an eNB (S1108). Next, in a step S1109, a radio setting between the UE and the eNB is made. Next, the eNB transmits the Initial context setup Request (eNB-S1-U IP address, eNB-S1-U TEID) message to the MME (S1110). Next, the MME transmits a Modify Bearer Request (eNB-S1-U IP address, eNB-S1-U TEID) to the SGW (S1111). By transmitting/receiving the messages in the steps S1107, S1108, S1110 and S1111, tunnel information of each of the eNB and the SGW is exchanged between the eNB and the SGW. As a result, a PDN connection, which is used in the S1-U interface, is established.

Next, the SGW transmits a Modify Bearer Response message to the MME (S1112).

As explained above, the UE can set the S5 PDN connection, the S11 PDN connection, and the S1-U PDN connection by temporarily changing its state to the Detach state and then performing the steps S1101 to S1112.

However, in the process explained above in the comparative example, the MME needs to make the UE temporarily change its state to the Detach state to delete the VM and then perform the steps S1101 to S1112 before the UE changes its state to the Attach state. As a result, the number of signals increases. Further, as the number of UEs increases, the number of signals that are transmitted/received in the mobile communication network increases even further. Therefore, there is a concern that as the number of signals increases, congestion could occur. Further, when the UE is detached, the mobile communication service for the UE is interrupted. As a result, there is a concern that the service quality could significantly deteriorate. In exemplary embodiments described below, a communication system and a communication process flow in which a VM is deleted by transmitting/receiving the required minimum number of messages to/from a neighboring node(s) are explained.

First Exemplary Embodiment

Exemplary embodiments according to the present invention are explained hereinafter with reference to the drawings. A configuration example of a communication system according to a first exemplary embodiment of the present invention is explained with reference to FIG. 1. The communication system shown in FIG. 1 includes communication devices 1 and 2.

Each of the communication devices 1 and 2 is a computer device that operates by having a CPU (Center Processing Unit) execute a program stored in a memory, or includes a plurality of VMs each of which operates by executing a program stored in a memory. Further, each of the communication devices 1 and 2 may be an MME, an SGW, a PGW, or the like, which are node devices specified in the 3GPP. Further, each of the communication devices 1 and 2 may be a NodeB or an eNodeB, which are base station devices, or an SGSN (Serving General packet radio service Support Node), a GGSN (Gateway General packet radio service Support Node), an RNC (Radio Network Controller), or the like, which form the so-called "second-generation" network.

The communication device 2 sets a plurality of sessions between the communication device 2 and the communication device 1 and communicates with the communication device 1. The plurality of sessions may be, for example, sessions set for respective terminal devices, or sessions set for respective groups of terminal devices when a plurality of terminal devices are divided into the groups. Each session may include route information between the communication devices 1 and 2, information necessary for carrying out communication with a counterpart communication device, information about a terminal device, and the like. The information about a terminal device may be, for example, an identifier of the terminal device, information about a communication speed permitted for the terminal device, and the like.

Figure 1:
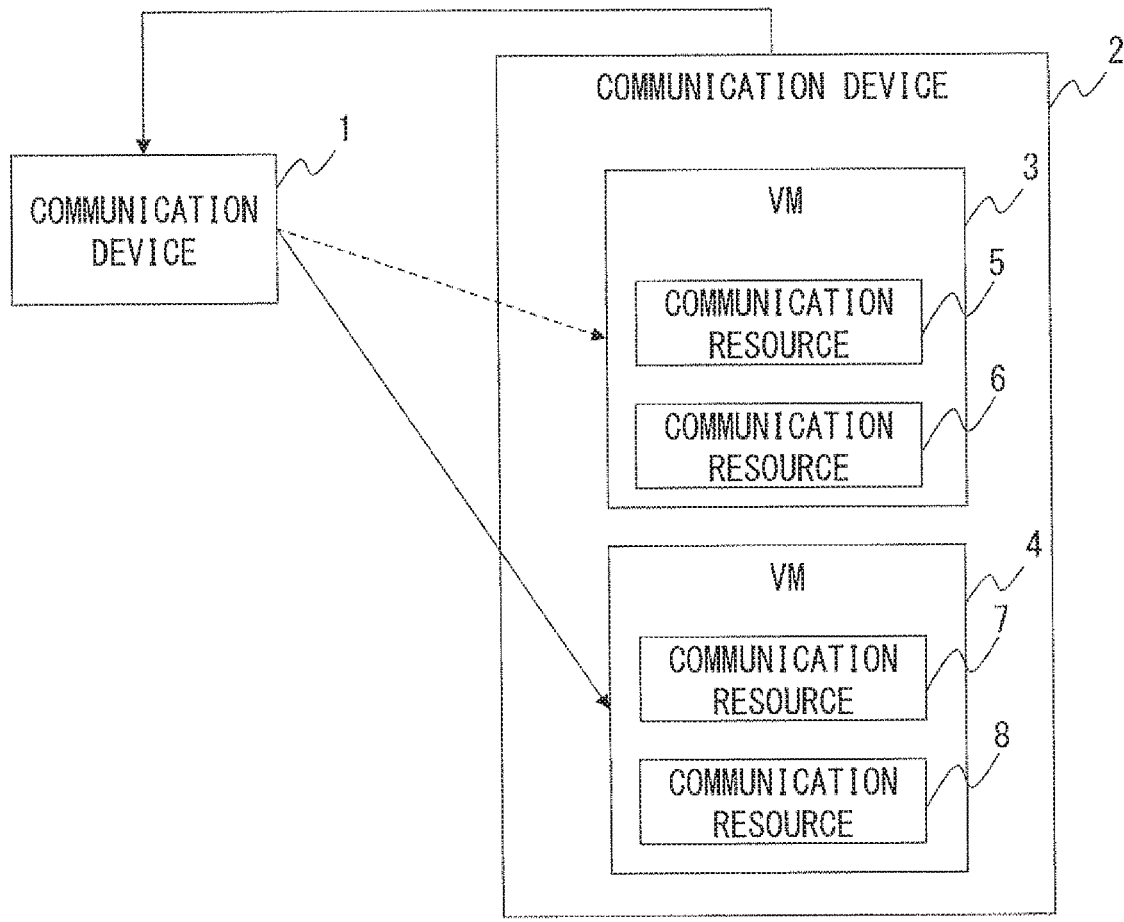
FIG. 1 shows a configuration diagram of a communication system according to a first exemplary embodiment.

The communication device 2 sets a plurality of sessions by using a VM 3 or a VM 4. In FIG. 1, the dotted-line arrow indicates a state where the communication device 1 sets a plurality of sessions with VM 3 and the solid-line arrow indicates a state where the communication device 1 sets a plurality of sessions with VM 4. These arrows indicate that the communication device 1 transfers the sessions set between the communication device 1 and the VM 3 to the VM 4.

The VMs 3 and 4 are formed by a plurality of communication resources such as different CPUs, memories, and network interfaces. In FIG. 1, the VM 3 includes communication resources 5 and 6, and the VM 4 includes communication resources 7 and 8. When the communication device 2 is virtualized, the VMs 3 and 4 become partial elements constituting the communication device 2. The resources corresponding to the VMs 3 and 4 may be separately supplied with electric power. That is, the electric power that is consumed when only one of the VMs 3 and 4 is used can be reduced from the electric power that is consumed when the VMs 3 and 4 are both used.

The communication device 2 determines that the state in which a plurality of sessions set between the communication devices 1 and 2 by using the VM 3 should be changed so that the plurality of sessions set between the communication devices 1 and 2 are controlled by using the VM 4. For example, the communication device 2 may change the VM that controls the plurality of sessions set between the communication devices 1 and 2 according to an instruction entered by a supervisor or the like who manages the communication device 2, or change the VM that controls the plurality of sessions set between the communication devices 1 and 2 according to an instruction signal input from other operation devices or the like.

By using the determination that the state in which a plurality of sessions set between the communication devices 1 and 2 are controlled by using the VM 3 should be changed so that the plurality of sessions set between the communication devices 1 and 2 are controlled by using the VM 4 as a trigger, the communication device 2 notifies the communication device 1 of identification information used in the VM 4 and updates the sessions. The identification information is information by which the fact that the control is performed in the VM 4 is uniquely recognized in the communication device 2.

The situation for the determination that the state in which a plurality of sessions set between the communication devices 1 and 2 are controlled by using the VM 3 should be changed so that the plurality of sessions set between the communication devices 1 and 2 are controlled by using the VM 4 includes the following situations. For example, the communication device 2 deletes the VM 3 and thereby transfers the plurality of sessions set in the VM 3 to the VM 4. Alternatively, the communication device 2 adds a new VM 4 and hence transfers some or all of the plurality of sessions set in the VM 3 to the VM 4.

As explained above, when the communication device 2 changes the VM that controls a plurality of sessions set between the communication devices 1 and 2, the communication device 2 can notify the communication device 1 of the identification information used in the new VM after the change. Upon receiving the identification information of the new VM after the change from the communication device 2, the communication device 1 can designate the VM 4 as a destination when data is transmitted to the communication device 2 at and after the next time. In this way, it is possible to transfer data that has been originally transmitted from the communication device 1 to the VM 3 to the VM 4.

That is, by changing the sessions between the communication devices 1 and 2 without detaching the terminal device, it is possible to delete the VM 3 and transfer the traffic transmitted from the communication device 1 to the VM 4. That is, since the control signals that occur due to the deletion of the VM 3 are transmitted/received only between the communication devices 1 and 2, it is possible to prevent a large number of control signals from being transmitted/received in the network.

Second Exemplary Embodiment

Next, a configuration example of a communication network according to the second exemplary embodiment of the present invention is explained with reference to FIGS. 2 to 6. FIGS. 2 to 6 are configuration examples of a communication network specified in the 3GPP.

Figure 2:
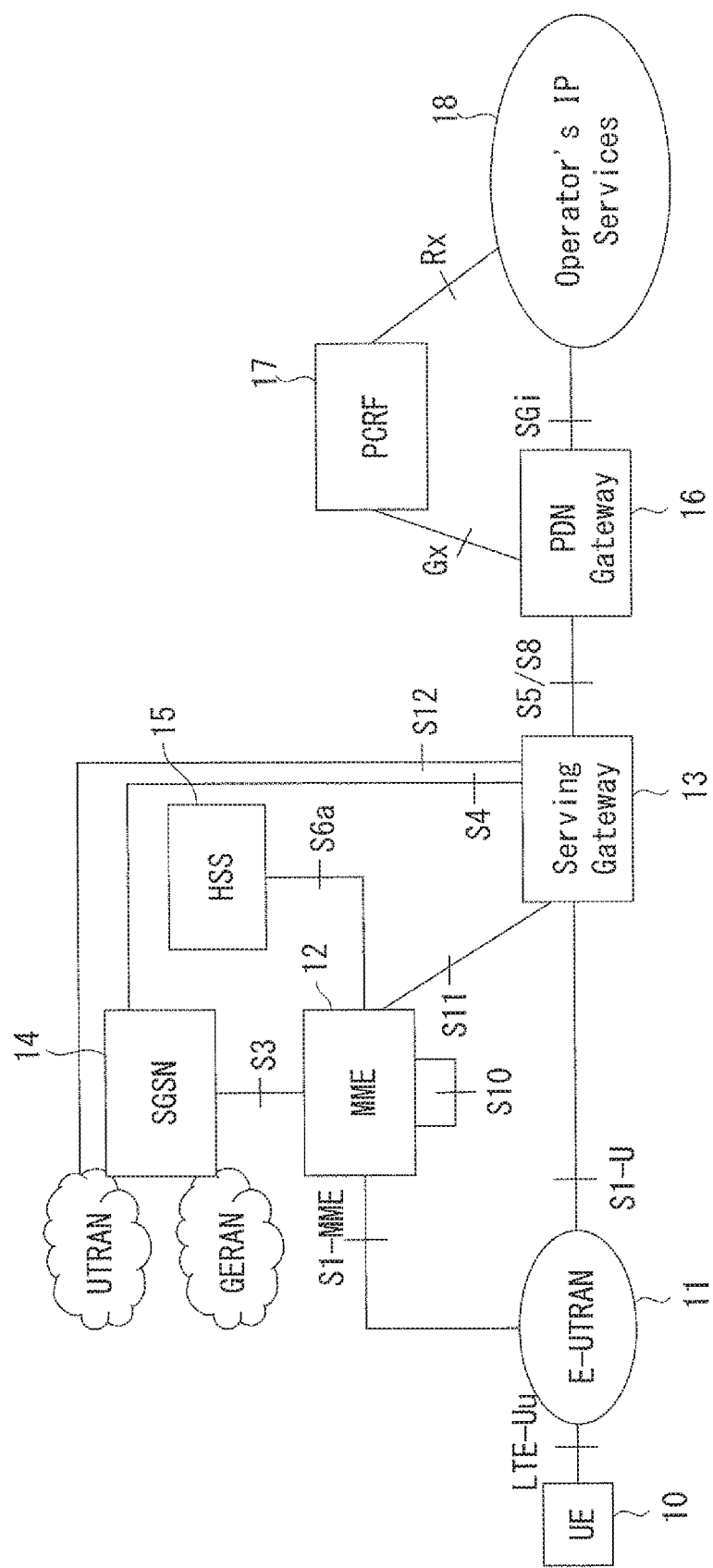
FIG. 2 is a configuration diagram of an EPS (Evolved Packet System) according to a second exemplary embodiment.

FIG. 2 is a configuration example of an EPS (Evolved Packet System) in a case where a UE does not perform roaming. The EPS shown in FIG. 2 includes a UE (User Equipment) 10, an E-UTRAN (Evolved Universal Terrestrial Radio Access Network) 11, an MME 12, an SGW 13, an SGSN (Serving GPRS Support Node) 14, an HSS (Home Subscriber Server) 15, a PGW 16, a PCRF (Policy and Charging Rules Function) 17, and an operator network 18. The operator network 18 may be, for example, an IMS (IP Multimedia Subsystem), a PSS (Packet Switch Streaming), or the like. The symbols LTE-Uu, S1-U, S3, Gx, and so on specified between node devices in the figure represent the names of the interfaces between the node devices. This is also applied to FIG. 3 and the subsequent figures. Further, the SGSN 14 is connected to an UTRAN and a GERAN (GSM (Registered Trademark) EDGE Radio Access Network), and the SGW 13 is connected to the UTRAN. Each of the E-UTRAN 11, the UTRAN and the GERAN represents a wireless network and includes a base station device and the like.

Figure 3:
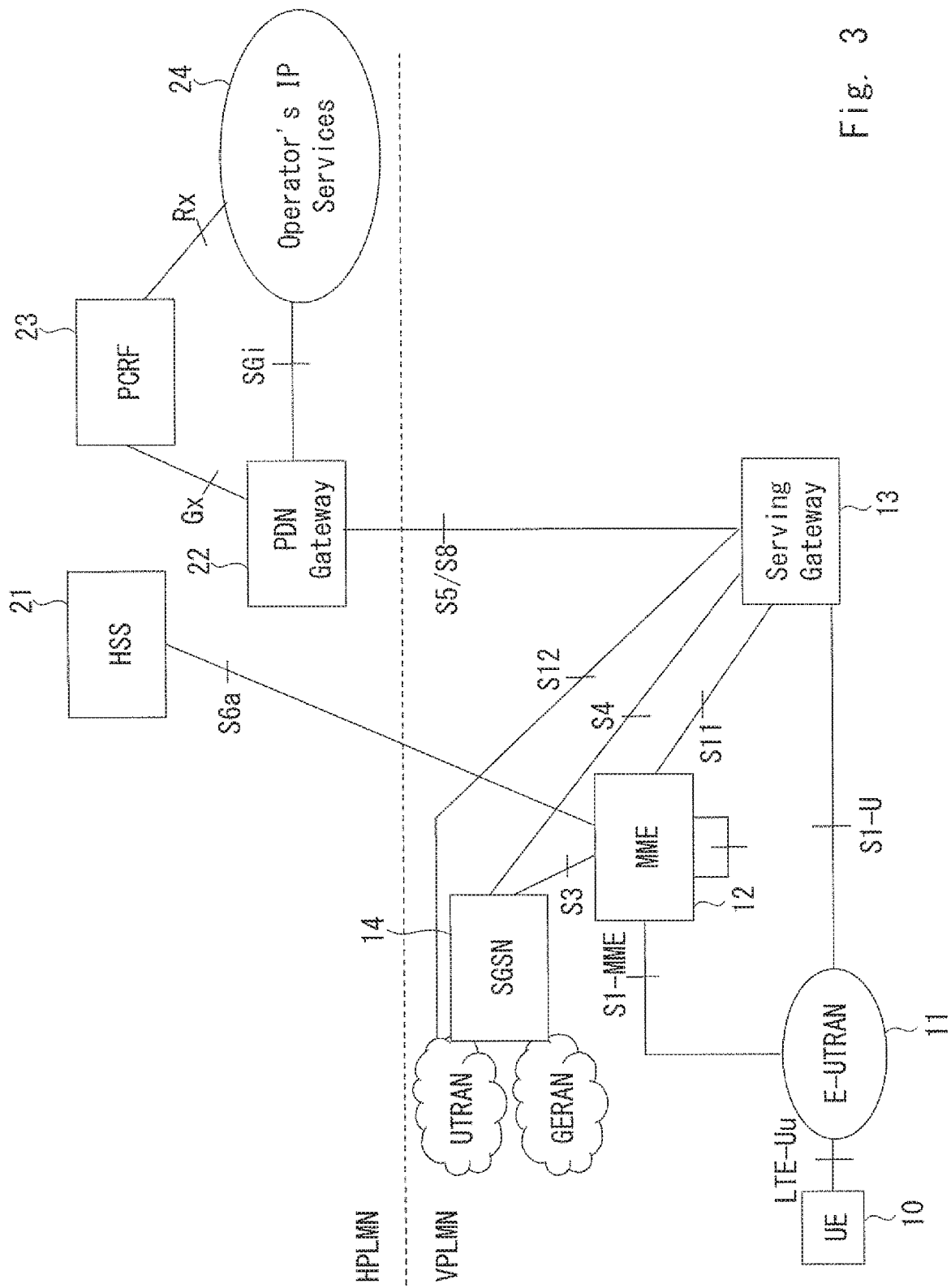
FIG. 3 is a configuration diagram of an EPS (Evolved Packet System) according to a first exemplary embodiment.

FIG. 3 is a configuration example of an EPS (Evolved Packet System) in a case where a UE is performing roaming. The EPS shown in FIG. 3 include a UE 10, an E-UTRAN 11, an MME 12, an SGW 13, an SGSN 14, an HSS 21, a PGW 22, a PCRF 23, and an operator network 24. In this figure, a UE 10 is located in a VPLMN (Visited Public Land Mobile Network). Therefore, the MME 12 communicates with the HSS 21 located in an HPLMN (Home Public Land Mobile Network), and the SGW 13 communicates with the PGW 22 located in the HPLMN. Note that the main difference between FIG. 3 and FIG. 2 is that while the interface between the SGW 13 and the PGW 22 is an interface S8 in FIG. 3, the interface between the SGW 13 and the PGW 16 is an interface S5 in FIG. 2. Details of FIGS. 2 and 3 are described in the specifications of 3GPP TS23.401.

Figure 4:
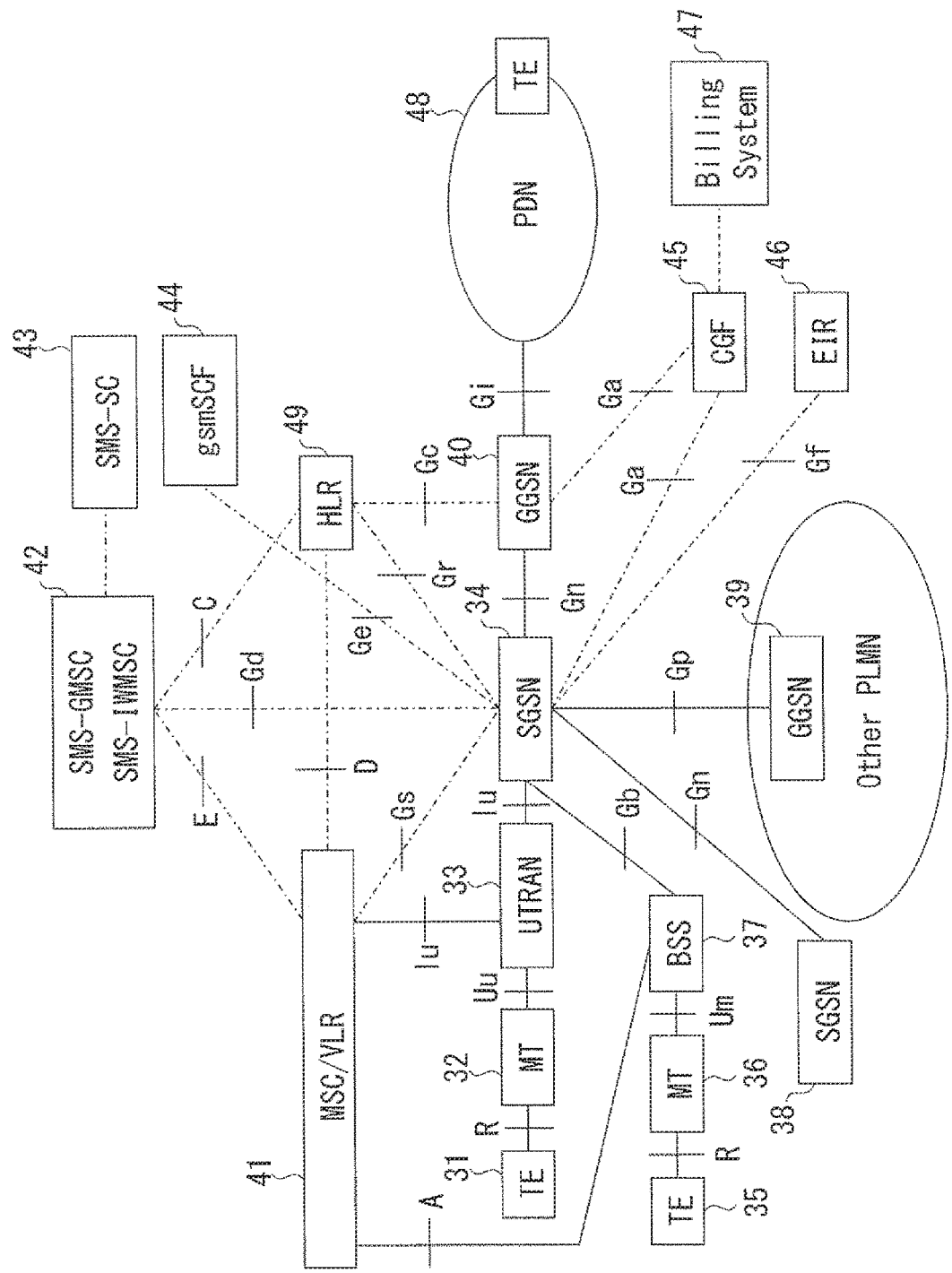
FIG. 4 is a configuration diagram of a 2G/3G communication network in accordance with 3GPP according to the first exemplary embodiment.

FIG. 4 shows a configuration example of the so-called "2G" or "3G" communication network in the 3GPP. The communication network shown in FIG. 4 includes a TE (Terminal Equipment) 31, an MT (Mobile Terminal) 32, a UTRAN 33, an SGSN 34, a TE 35, an MT 36, a BSS (Base Station System) 37, an SGSN 38, a GGSN (Gateway GPRS Support Node) 39, a GGSN 40, an MSC (Mobile Switching Center)/VLR (Visitor Location Register) 41, an SMS-GMSC and an SMS-IWMSC (Inter-Working Mobile Switching Centre) 42, an SMS-SC 43, a gsmSCF (gsm Service Control Function) 44, a CGF (Charging Gateway Function) 45, an EIR (Equipment Identity Register) 46, a Billing System 47, a TE 48, and an HLR 49. The dotted lines in the figure indicate Signaling interfaces for transmitting control signals, and the solid lines indicates Signaling and Data Transfer Interfaces for transmitting control signals and user data. Details of FIG. 4 are described in the specifications of 3GPP TS23.060.

Figure 5:
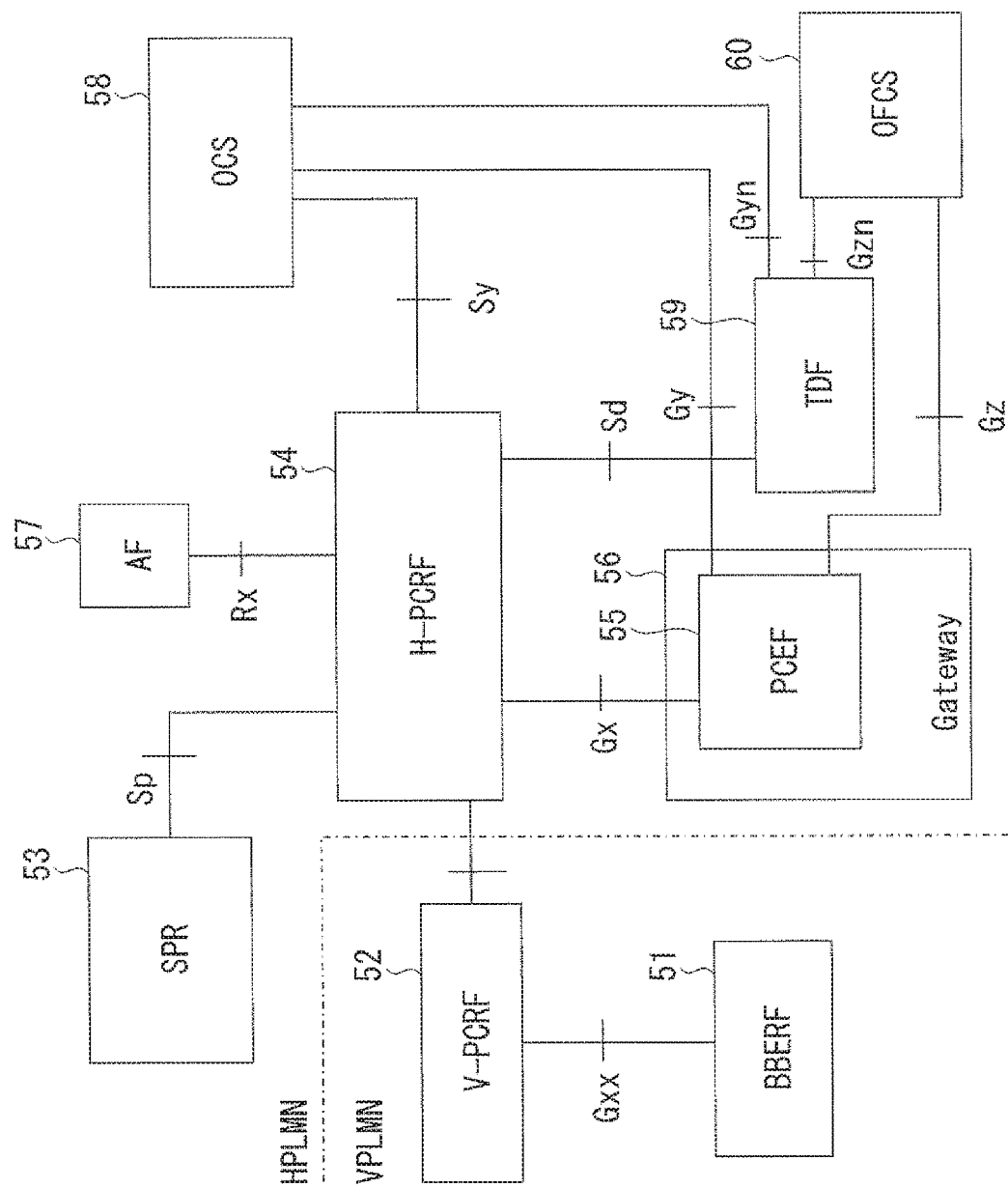
FIG. 5 is a configuration diagram of a communication network specified as PCC (Policy and Charging Control) in 3GPP according to the first exemplary embodiment.

FIG. 5 shows a communication network specified as PCC (Policy and Charging Control) in the 3GPP. The communication network shown in FIG. 5 includes a BBERF (Bearer Binding and Event Reporting Function) 51, a V-PCRF (Visited-PCFR) 52, an SPR (Subscriber Profile Repository) 53, an H-PCRF (Home-PCRF) 54, a PCEF (Policy and Charging Enforcement Function) 55, a Gateway 56, an AF (Application Function) 57, an OCS (Online Charging System) 58, a TDF (Traffic Detection Function) 59, and an OFCS (Offline Charging System) 60. Details of FIG. 5 are described in the specifications of 3GPP TS23.203.

Figure 6:
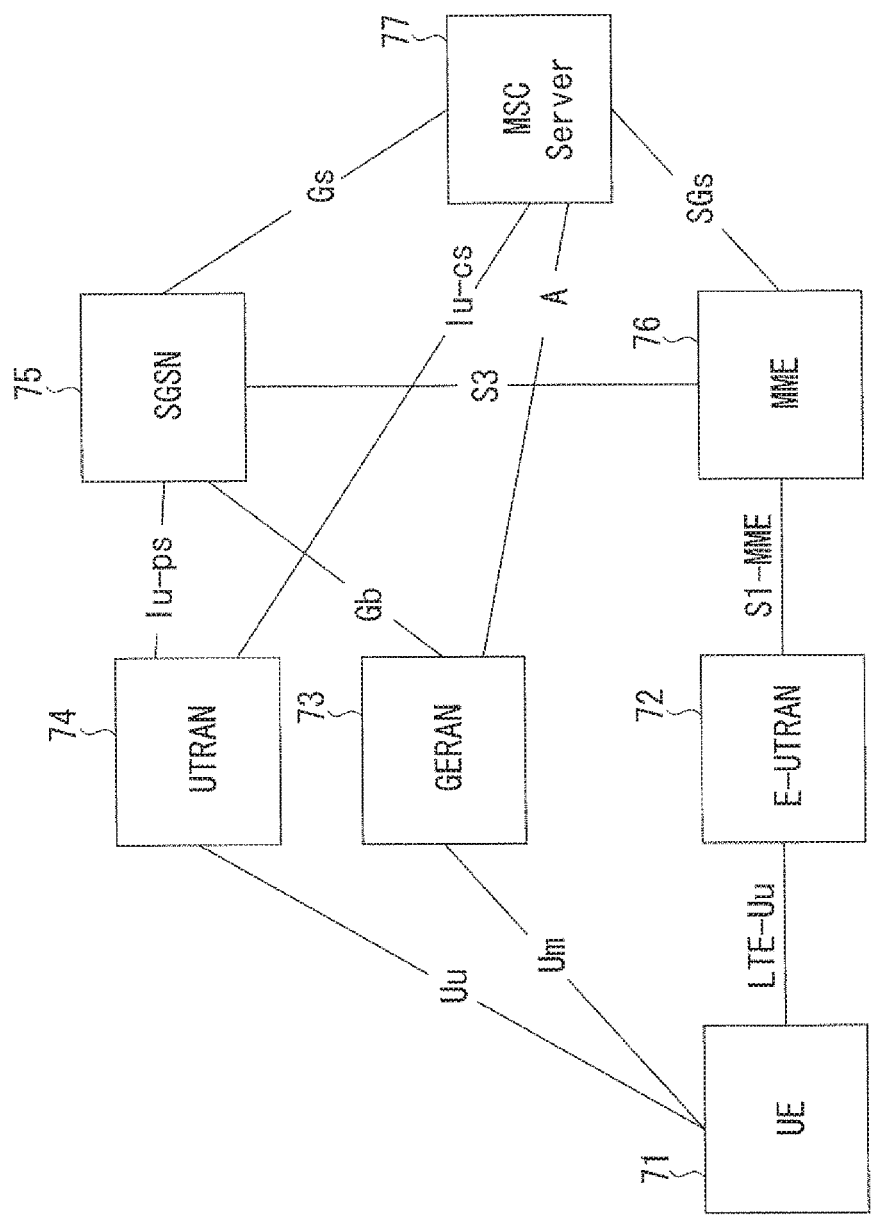
FIG. 6 is a configuration diagram of a communication network corresponding to CSFB (Circuit Switched Fall Back) in 3GPP according to a second exemplary embodiment.

FIG. 6 shows a configuration example of a communication network corresponding to CSFB (Circuit Switched Fall Back) in the 3GPP. The communication network shown in FIG. 6 includes a UE 71, an E-UTRAN 72, a GERAN 73, a UTRAN 74, an SGSN 75, an MME 76, and an MSC Server 77. Details of FIG. 6 are described in the specifications of 3GPP TS23.272.

Figure 7:
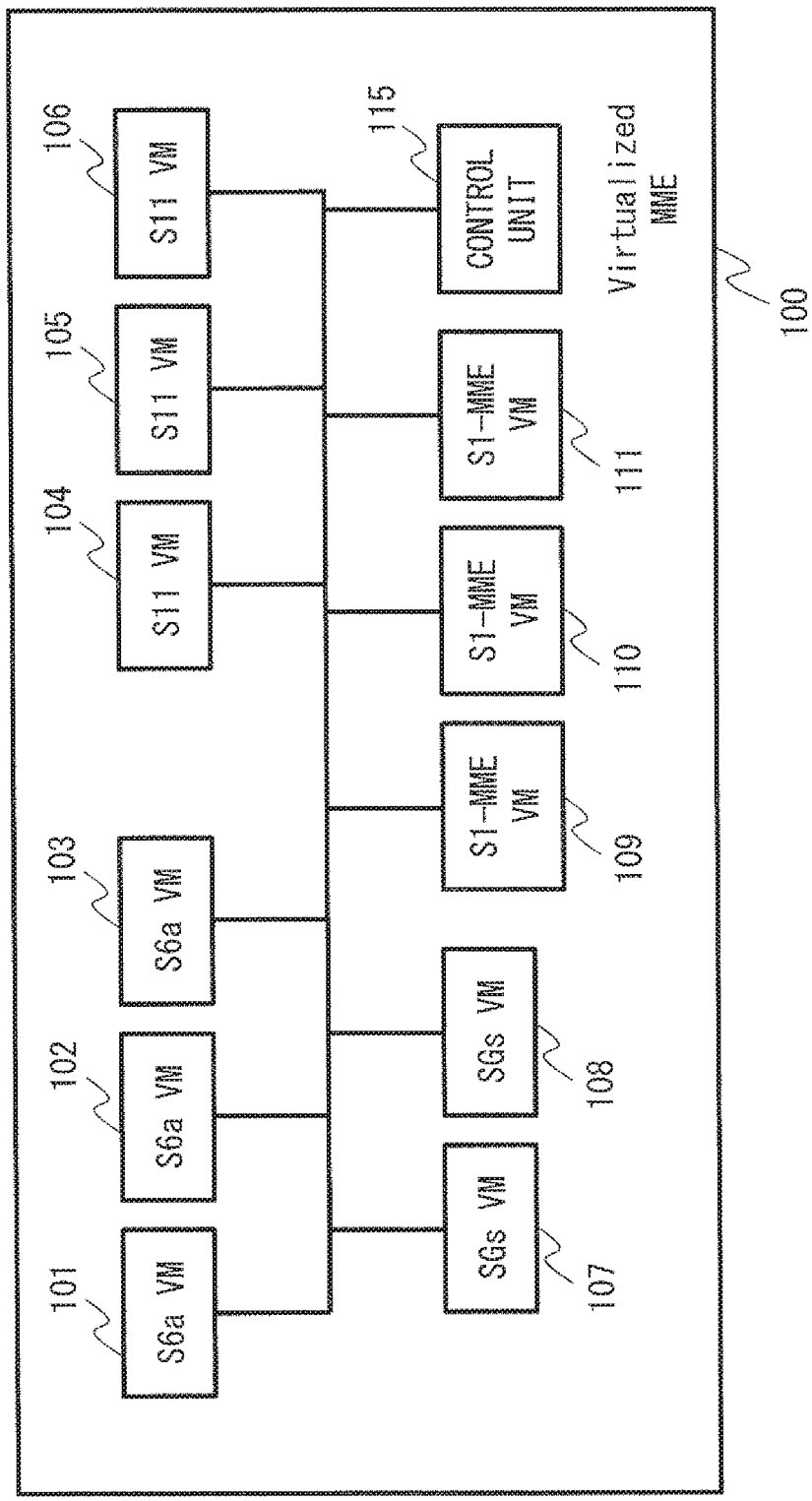
FIG. 7 is a configuration diagram of a Virtualized MME 100 according to the second exemplary embodiment.

Next, a configuration example of a Virtualized MME 100 according to the second exemplary embodiment is explained with reference to FIG. 7. The Virtualized MME 100 is a name given to an MME formed by a plurality of VMs. The Virtualized MME 100 is configured so as to use a VM(s) for an operation necessary for each interface in the MME 12 shown in FIG. 2 or in the MME 76 shown in FIG. 6. The Virtualized MME 100 includes S6a VMs 101-103, S11 VMs 104-106, an SGs VM 107, an SGs VM 108, S1-MME VMs 109-111, and a control unit 15. Note that the number of VMs used in each interface in the figure is just an example. That is, the number of VMs may be arbitrarily determined. This is also applied to other figures explained below.

The S6a VMs 101-103 provide functions necessary for controlling the interface between the Virtualized MME 100 and the HSS 15 shown in FIG. 2 or the HSS 21 shown in FIG. 3. Examples of the function include an acquisition of subscriber data. The S11 VMs 104-106 provide functions necessary for controlling sessions set between the Virtualized MME 100 and the SGW 13 shown in FIG. 2. The SGs VM 107 and the SGs VM 108 provide functions necessary for controlling sessions set between the Virtualized MME 100 and the MSC server 77 shown in FIG. 6. The S1-MME VMs 109-111 provide functions necessary for controlling sessions set between the Virtualized MME 100 and the E-UTRAN 11 shown in FIG. 1. The E-UTRAN 11 may be, for example, an eNB (evolved NB), which is a base station device.

For example, each VM allocates a predetermined memory area for each session. Therefore, the maximum number of sessions that can set in each VM may be determined according to the memory area or the memory capacity. The above-described matters for the VMs shown in the figure are also applied to VMs that are specified below.

The control unit 115 controls the number of sessions, determines the transfer destination of sessions set in the VM to be deleted, controls communication through each VM, and so on. Further, the control unit 115 may monitor the load state of each VM. Then, for example, when a night comes and the number of sessions is decreased beyond the predetermined number of sessions determined by a given VM, the control unit 115 may determine that the remaining sessions left in that VM should be transferred to other VMs, determine their transfer destinations, and/or determine that they are distributed over a plurality of VMs with consideration given to the load state of the transfer destinations. The above-described matters are also applied to control units of other devices described below.

Figure 8:
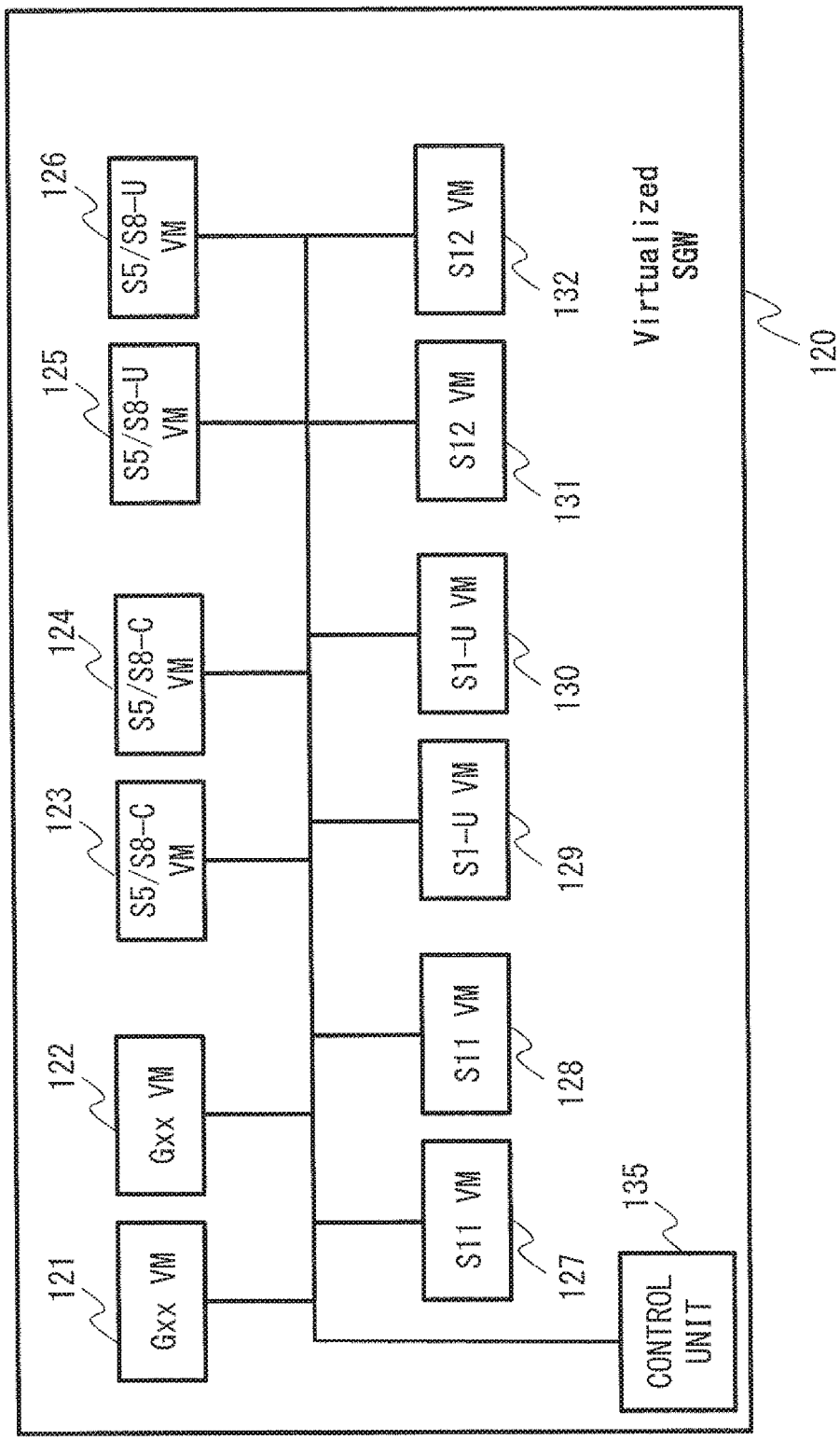
FIG. 8 is a configuration diagram of a Virtualized SGW 120 according to the second exemplary embodiment.

Next, a configuration example of a Virtualized SGW 120 according to the second exemplary embodiment is explained with reference to FIG. 8. The Virtualized SGW 120 is configured so as to use a VM(s) for an interface(s) in the SGW 13 shown in FIG. 2. The Virtualized SGW 120 includes a Gxx VM 121, a Gxx VM 122, an S5/S8-C VM 123, an S5/S8-C VM 124, an S5/S8-U VM 125, an S5/S8-U VM 126, an S11 VM 127, an S11 VM 128, an S1-U VM 129, an S1-U VM 130, an S12 VM 131, an S12 VM 132, and a control unit 135.

The Gxx VMs 121 and 122 are interfaces used for sessions set between the Virtualized SGW 120 and the V-PCRF 52 when the Virtualized SGW 120 has a function of the BBERF 51 shown in FIG. 5. The S5/S8-C VMs 123 and 124 are interfaces used for sessions set between the Virtualized SGW 120 and the PGW 16 shown in FIG. 2 or the PGW 22 shown in FIG. 3.

The S11 VMs 127 and 128 are interfaces used for sessions set between the Virtualized SGW 120 and the MME 12 shown in FIG. 2. The S1-U VMs 129 and 130 are interfaces used for sessions set between the Virtualized SGW 120 and the E-UTRAN 11 shown in FIG. 2. The E-UTRAN 11 may be, for example, an eNB (evolved NB), which is a base station device. The S12 VMs 131 and 132 are interfaces used for sessions set between the Virtualized SGW 120 and the UTRAN. The UTRAN may be, for example, a NodeB, which is a base station device.

Figure 9:
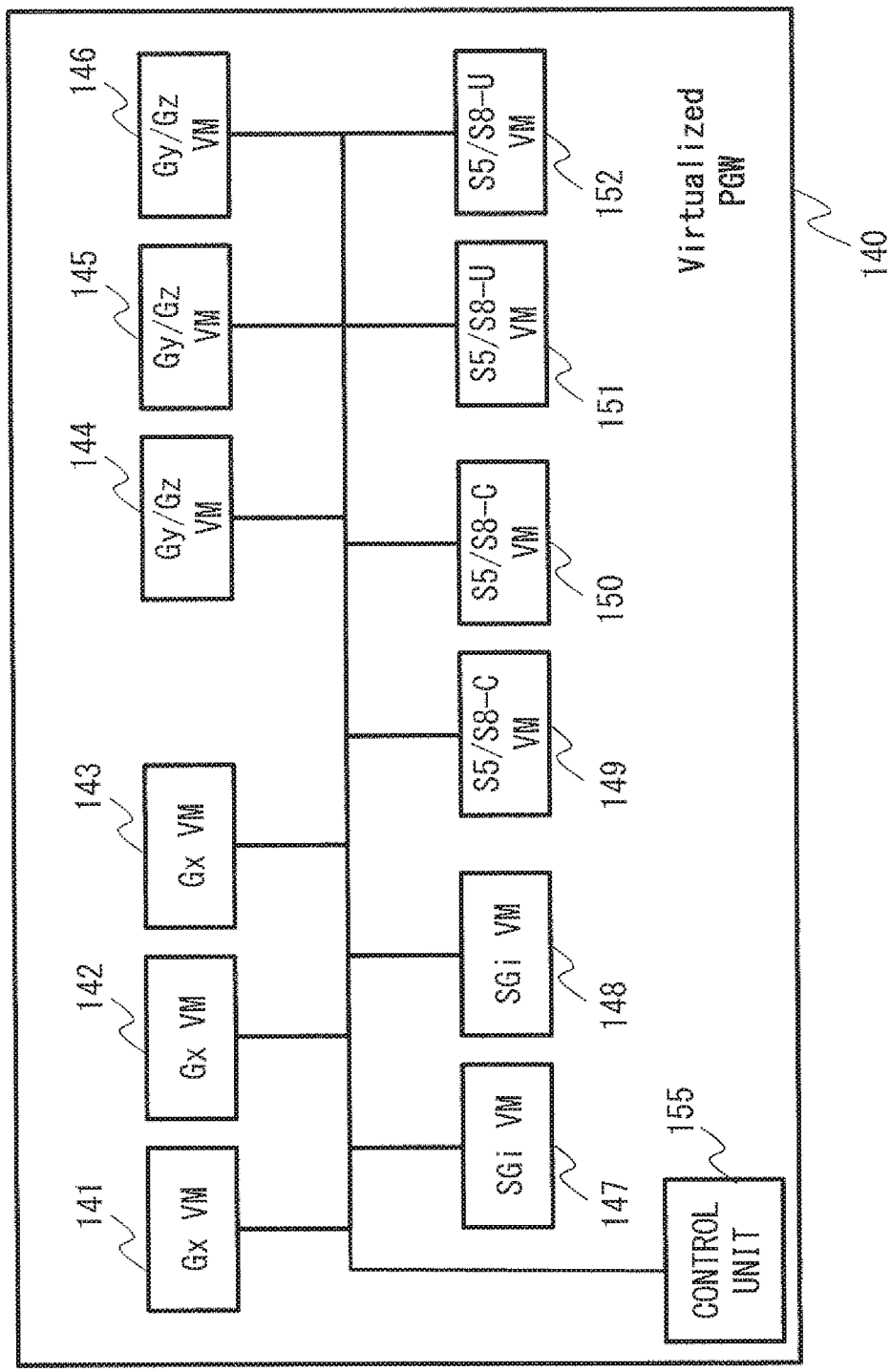
FIG. 9 is a configuration diagram of a Virtualized PGW 140 according to the second exemplary embodiment.

Next, a configuration example of a Virtualized PGW 140 according to the second exemplary embodiment is explained with reference to FIG. 9. The Virtualized PGW 140 is configured so as to use a VM(s) for an interface(s) in the PGW 16 shown in FIG. 2 or the PGW 22 shown in FIG. 3.

The Virtualized PGW 140 includes Gx VMs 141-143, Gy/Gz VMs 144-146, SGi VMs 147 and 148, S5/S8-C VMs 149 and 150, S5/S8-U VMs 151 and 152, and a control unit 155.

The Gx VMs 141-143 are interfaces used for sessions set between the Virtualized PGW 140 and the PCRF 17 shown in FIG. 2 or the PCRF 23 shown in FIG. 3. The Gy/Gz VMs 144-146 are interfaces used for sessions set between the Virtualized PGW 140 and the OCS 58 or the OFCS 60 shown in FIG. 5 when the Virtualized PGW 140 has a function of the PCEF 55.

The SGi VMs 147 and 148 are interfaces used for sessions set between the Virtualized PGW 140 and the operator network 18 shown in FIG. 2 or the operator network 24 shown in FIG. 3. The S5/S8-C VMs 149 and 150 are interfaces used for sessions set for C-Plane data communication between the Virtualized PGW 140 and the SGW 13. The S5/S8-U VM 151 and 152 are interfaces used for sessions set for U-Plane data communication between the Virtualized PGW 140 and the SGW 13 shown in FIG. 2.

Figure 10:
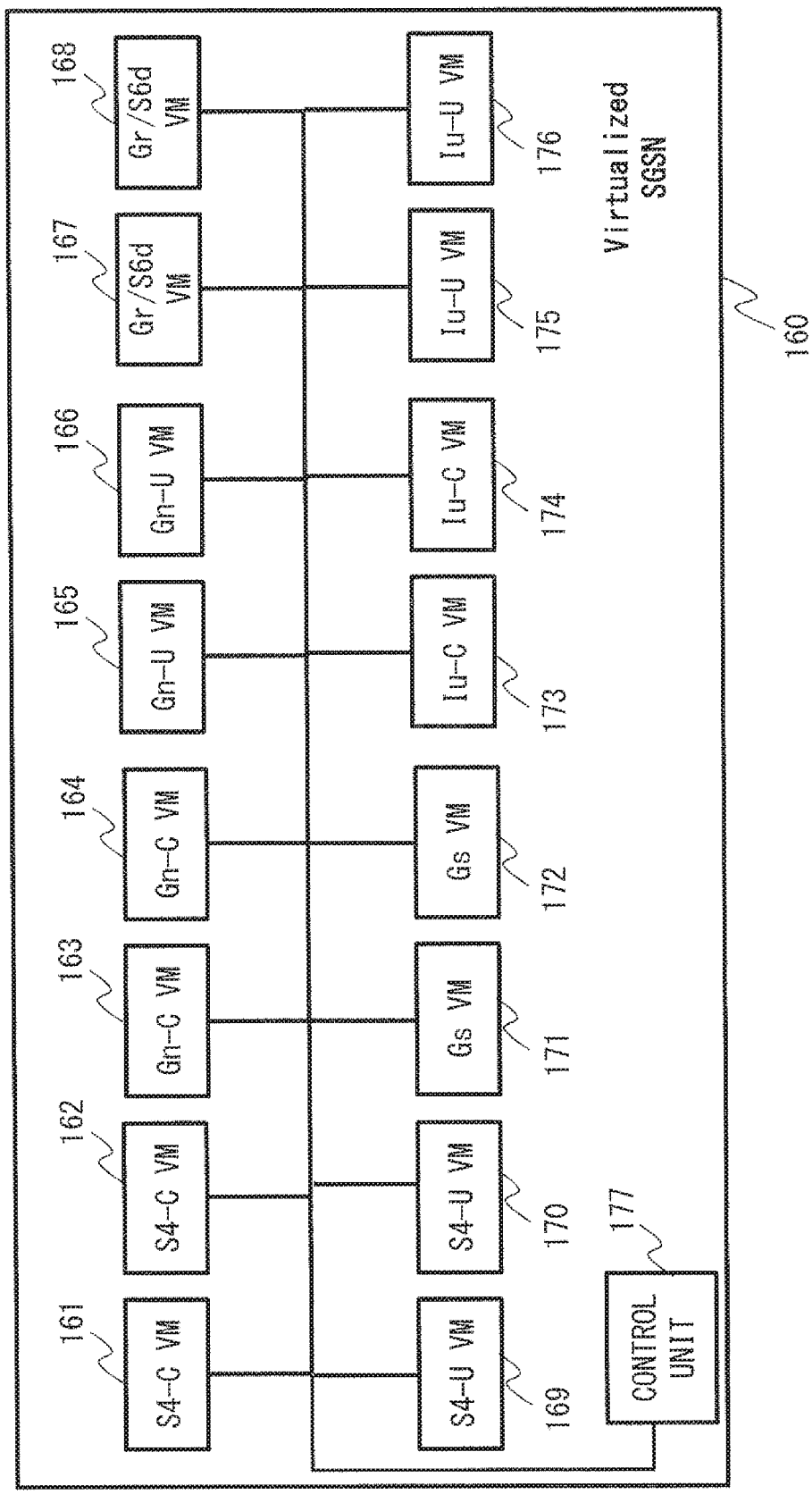
FIG. 10 is a configuration diagram of a Virtualized SGSN 160 according to the second exemplary embodiment.

Next, a configuration example of a Virtualized SGSN 160 according to the second exemplary embodiment is explained with reference to FIG. 10. The Virtualized SGSN 160 is configured so as to use a VM(s) for an interface(s) in the SGSN 14 shown in FIG. 2 or the SGSN 34 shown in FIG. 4.

The Virtualized SGSN 160 includes S4-C VMs 161 and 162, Gn-C VMs 163 and 164, Gn-U VMs 165 and 166, Gr/S6d VMs 167 and 168, S4-U VMs 169 and 170, Gs VMs 171 and 172, Iu-C VMs 173 and 174, Iu-U VMs 175 and 176, and a control unit 177.

The S4-C VMs 161 and 162 are interfaces used for sessions set for C-Plane data communication between the Virtualized SGSN 160 and the SGW 13 shown in FIG. 2. The S4-U VMs 169 and 170 are interfaces used for sessions set for U-Plane data communication between the Virtualized SGSN 160 and the SGW 13.

The Gn-C VMs 163 and 164 are interfaces used for sessions set for C-Plane data communication between the Virtualized SGSN 160 and the GGSN 40. The Gn-U VMs 165 and 166 are interfaces used for sessions set for U-Plane data communication between the Virtualized SGSN 160 and the GGSN 40 shown in FIG. 4.

The Gr/S6d VMs 167 and 168 are interfaces used for sessions set between the Virtualized SGSN 160 and the HLR 49 shown in FIG. 4. The Gs VMs 171 and 172 are interfaces used for sessions set between the Virtualized SGSN 160 and the MSC/VLR 41.

The Iu-C VMs 173 and 174 are interfaces used for sessions set for C-Plane data communication between the Virtualized SGSN 160 and the UTRAN 33. The Iu-U VMs 175 and 176 are interfaces used for sessions set for U-Plane data communication between the Virtualized SGSN 160 and the UTRAN 33 shown in FIG. 4.

Figure 11:
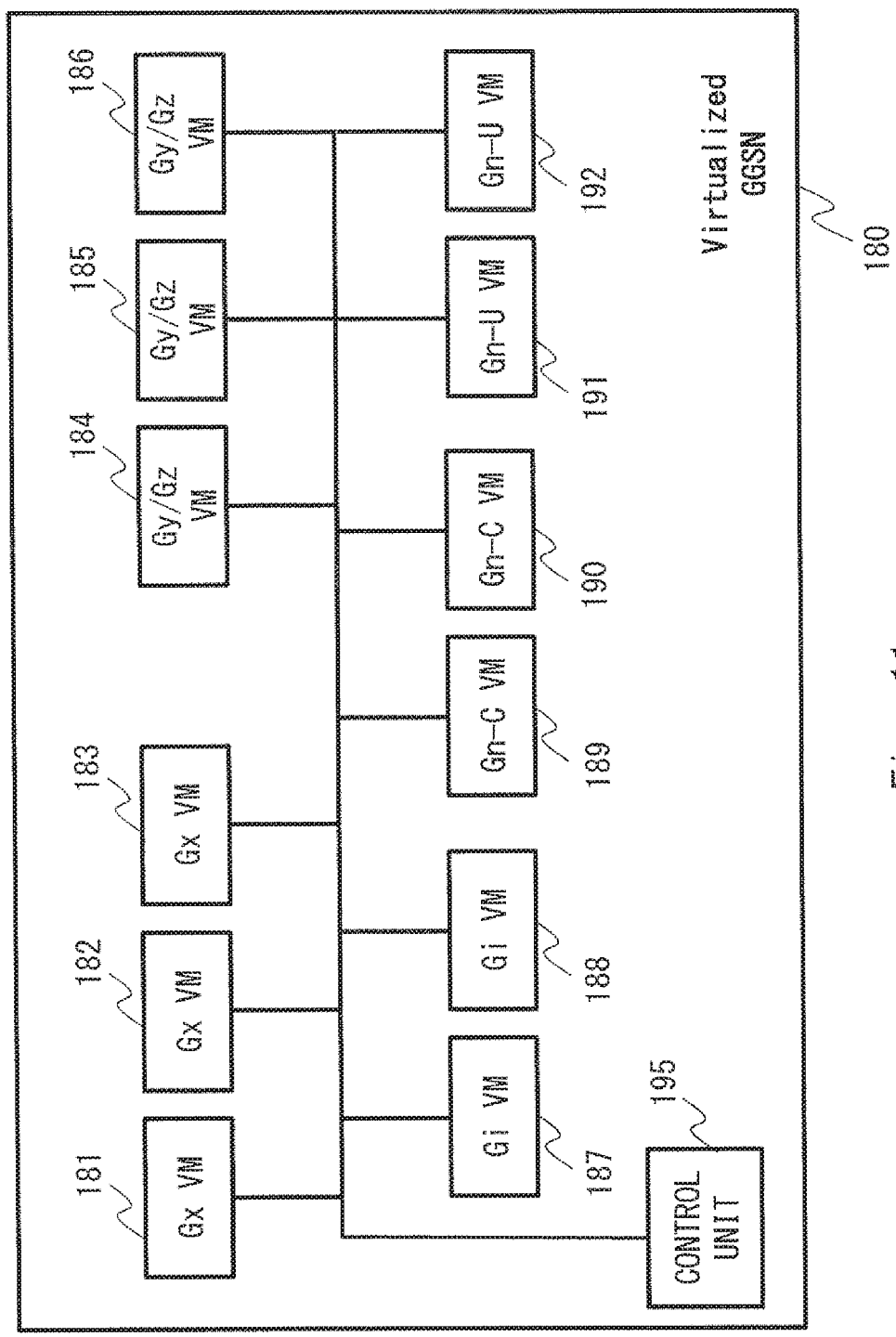
FIG. 11 is a configuration diagram of a Virtualized GGSN 180 according to the second exemplary embodiment.

Next, a configuration example of a Virtualized GGSN 180 according to the second exemplary embodiment is explained with reference to FIG. 11. The Virtualized GGSN 180 is configured so as to use a VM(s) for an interface(s) in the SGSN 14 shown in FIG. 2 or the SGSN 34 shown in FIG. 4.

The Virtualized GGSN 180 includes Gx VMs 181-183, Gy/Gz VMs 184-186, Gi VMs 187 and 188, Gn-C VMs 189 and 190, Gn-U VMs 191 and 192, and a control unit 195.

The Gx VMs 181-183 are interfaces used for sessions set between the Virtualized GGSN 180 and the H-PCRF 54 when the Virtualized GGSN 180 has a function of the PCEF 55. The Gy/Gz VMs 144-146 are interfaces used for sessions set between the Virtualized GGSN 180 and the OCS 58 or the OFCS 60 when the Virtualized GGSN 180 has a function of the PCEF 55 shown in FIG. 5.

The Gi VMs 187 and 188 are interfaces used for sessions set between the Virtualized GGSN 180 and an IP network to which a communication carrier provides services unique to that carrier, or a PDN (Packet Delivery Network) managed by other communication carriers.

The Gn-C VMs 189 and 190 are interfaces used for sessions set for C-Plane data communication between the Virtualized GGSN 180 and the SGSN 34. The Gn-U VMs 191 and 192 are interfaces used for sessions set for U-Plane data communication between the Virtualized GGSN 180 and the SGSN 34 shown in FIG. 4.

Figure 12:
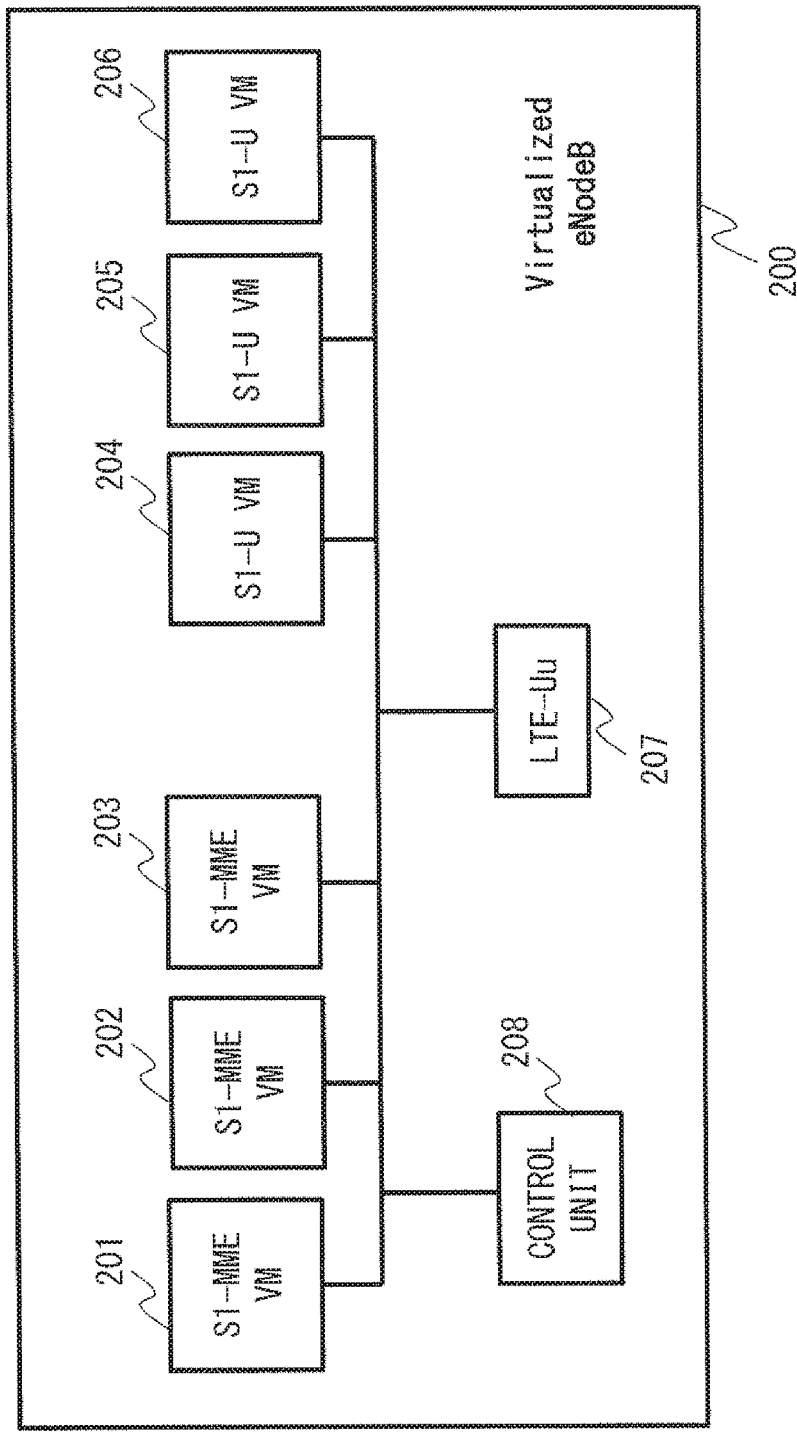
FIG. 12 is a configuration diagram of a Virtualized eNodeB 200 according to the second exemplary embodiment.

Next, a configuration example of a Virtualized eNodeB 200 according to the second exemplary embodiment is explained with reference to FIG. 12. The Virtualized eNodeB 200 is configured so as to use a VM(s) for an interface(s) in an eNodeB located in the E-UTRAN 11 shown in FIG. 2.

The Virtualized eNodeB 200 includes S1-MME VMs 201-203, S1-U VMs 204-206, an LTE-Uu 207, and a control unit 208.

The S1-MME VMs 201-203 are interfaces used for sessions set between the Virtualized eNodeB 200 and the MME 12 shown in FIG. 2. The S1-U VMs 204-206 are interfaces used for sessions set between the Virtualized eNodeB 200 and the SGW 13 shown in FIG. 2. The LTE-Uu 207 is an interface used for sessions set between the Virtualized eNodeB 200 and the UE 10.

Figure 13:
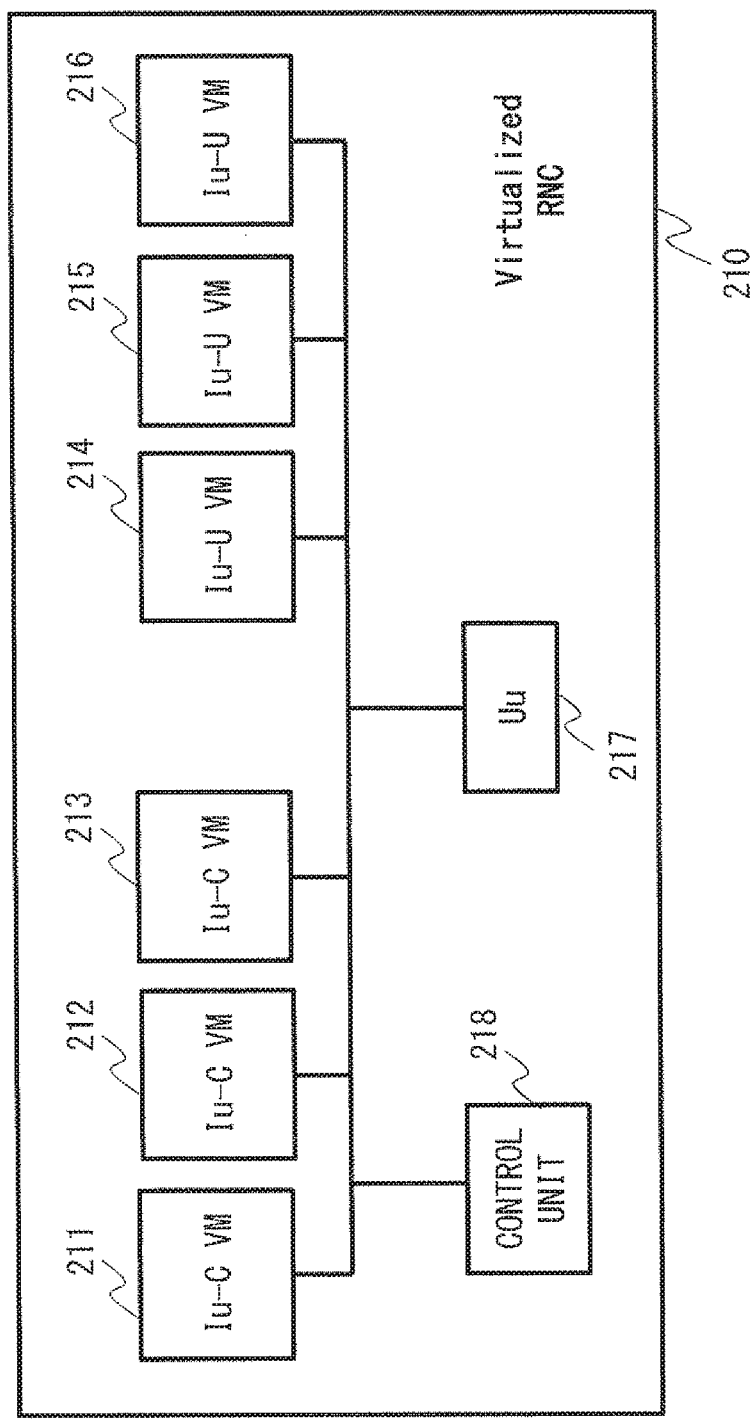
FIG. 13 is a configuration diagram of a Virtualized RNC 210 according to the second exemplary embodiment.

Next, a configuration example of a Virtualized RNC 210 according to the second exemplary embodiment is explained with reference to FIG. 13. The Virtualized RNC 210 is configured so as to use a VM(s) for an interface(s) in an RNC (Radio Network Controller) located in the UTRAN 33 shown in FIG. 4.

The Virtualized RNC 210 includes Iu-C VMs 211-213, Iu-U VMs 214-216, a Uu 217, and a control unit 218.

The Iu-C VMs 211-213 are interfaces used for sessions set for C-Plane data communication between the Virtualized RNC 210 and the SGSN 34 shown in FIG. 4. The Iu-U VMs 214-216 are interfaces used for sessions set for U-Plane data communication between the Virtualized RNC 210 and the SGSN 34. The Uu 217 is an interface used for sessions set between the Virtualized RNC 210 and the MT 32 shown in FIG. 4.

Figure 14:
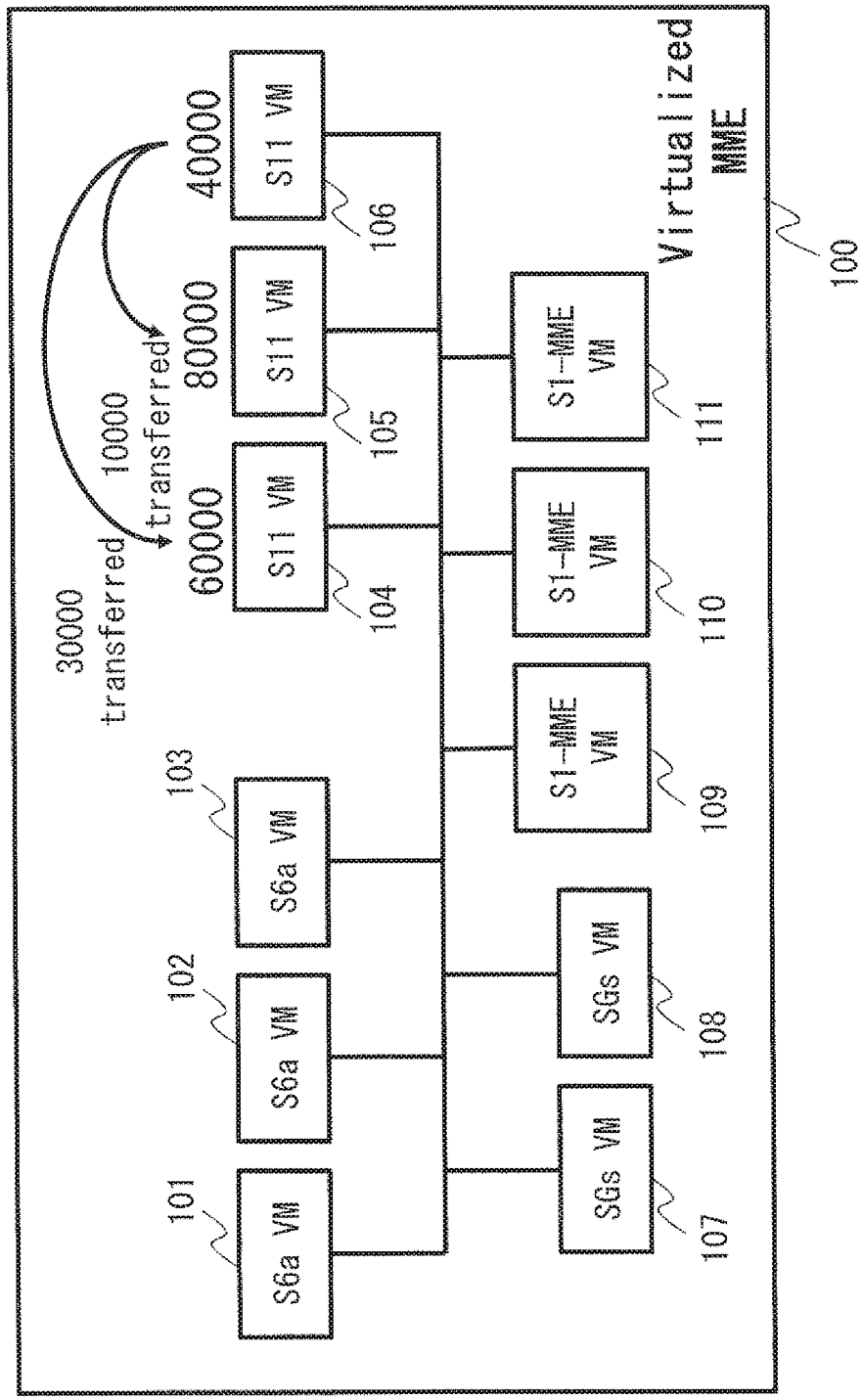
FIG. 14 is a diagram for explaining a transfer of a session when an S11 VM 106 of the Virtualized MME 100 according to the second exemplary embodiment is deleted.
Figure 15:
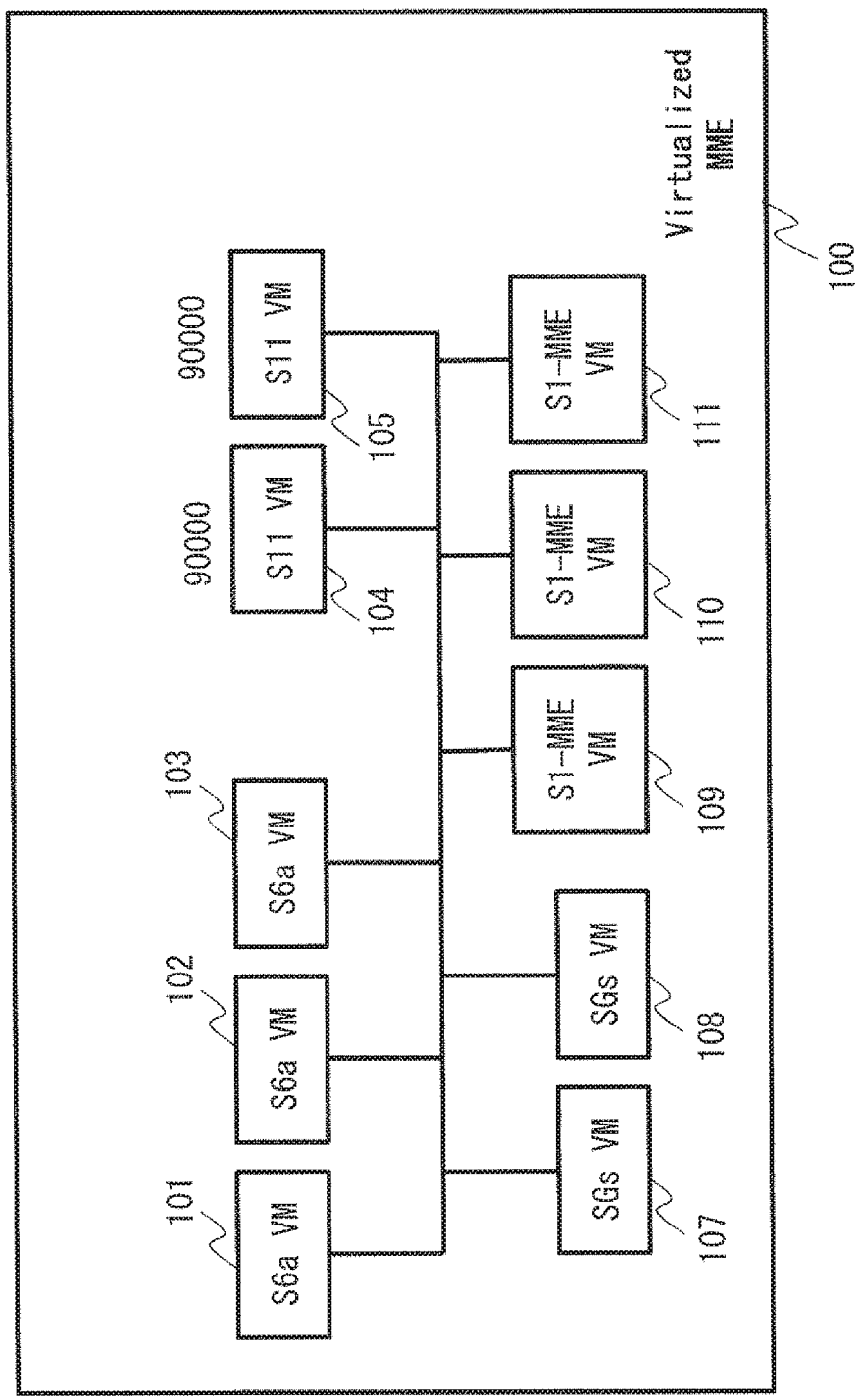
FIG. 15 is a diagram for explaining the transfer of the session when the S11 VM 106 of the Virtualized MME 100 according to the second exemplary embodiment is deleted.

Next, a transfer of sessions that is performed when the S11 VM 106 of the Virtualized MME 100 is deleted is explained with reference to FIGS. 14 and 15. The deletion of a VM may be a suspension of the supply of electric power to the VM. FIG. 14 shows sessions set between the Virtualized MME 100 and the SGW 13 in which: 60,000 sessions are set in the S11 VM 104; 80,000 sessions are set in the S11 VM 105; and 40,000 sessions are set in the S11 VM 106. Specifically, sessions may be PDN connections.

In FIG. 14, when the S11 VM 106 is deleted, it is necessary to transfer the 40,000 sessions set in the S11 VM 106 to the S11 VMs 104 and 105. For this transfer, the Virtualized MME 100 may transfer the sessions in the S11 VM 106 while taking the load states in the S11 VMs 104 and 105 into consideration by using the control unit 115. For example, the Virtualized MME 100 may transfer the sessions in the S11 VM 106 so that the number of sessions in the S11 VM 104 and that in the S11 VM 105 are roughly equal to each other.

Specifically, the Virtualized MME 100 may transfer 30,000 sessions in the S11 VM 106 to the S11 VM 104 and transfer 10,000 sessions in the S11 VM 106 to the S11 VM 105. By doing so, as shown in FIG. 15, each of the S11 VMs 104 and 105 has 90,000 sessions set therein and hence the loads of them become equal to each other. Further, the Virtualized MME 100 may perform management so that any new sessions that are generated during the session transfer operation from the S11 VM 106 to the S11 VMs 104 and 105 are not set in the S11 VM 106.

The management of the number of sessions set in each VM, the determination of the transfer destination of the sessions set in the VM to be deleted, and the like may be performed by a control unit such as a CPU mounted in the Virtualized MME 100. In FIGS. 14 and 15, an example where the S11 VM 106 of the Virtualized MME 100 is deleted is explained. However, control similar to the control shown in FIGS. 14 and 15 may be performed in the case where a VM other than the S11 VM 106 in the Virtualized MME 100 is deleted and a new VM is added, and in the case where a VM in other devices (such as the Virtualized SGW, PGW, SGSN, and GGSN) is deleted and a new VM is added.

Next, a process for transferring sessions performed when a VM is deleted according to the second exemplary embodiment is explained with reference to FIGS. 16 to 19. In FIGS. 16 to 19, a process for deleting the S5/S8-C VM 123 of the Virtualized SGW 120 is explained.

Figure 16:
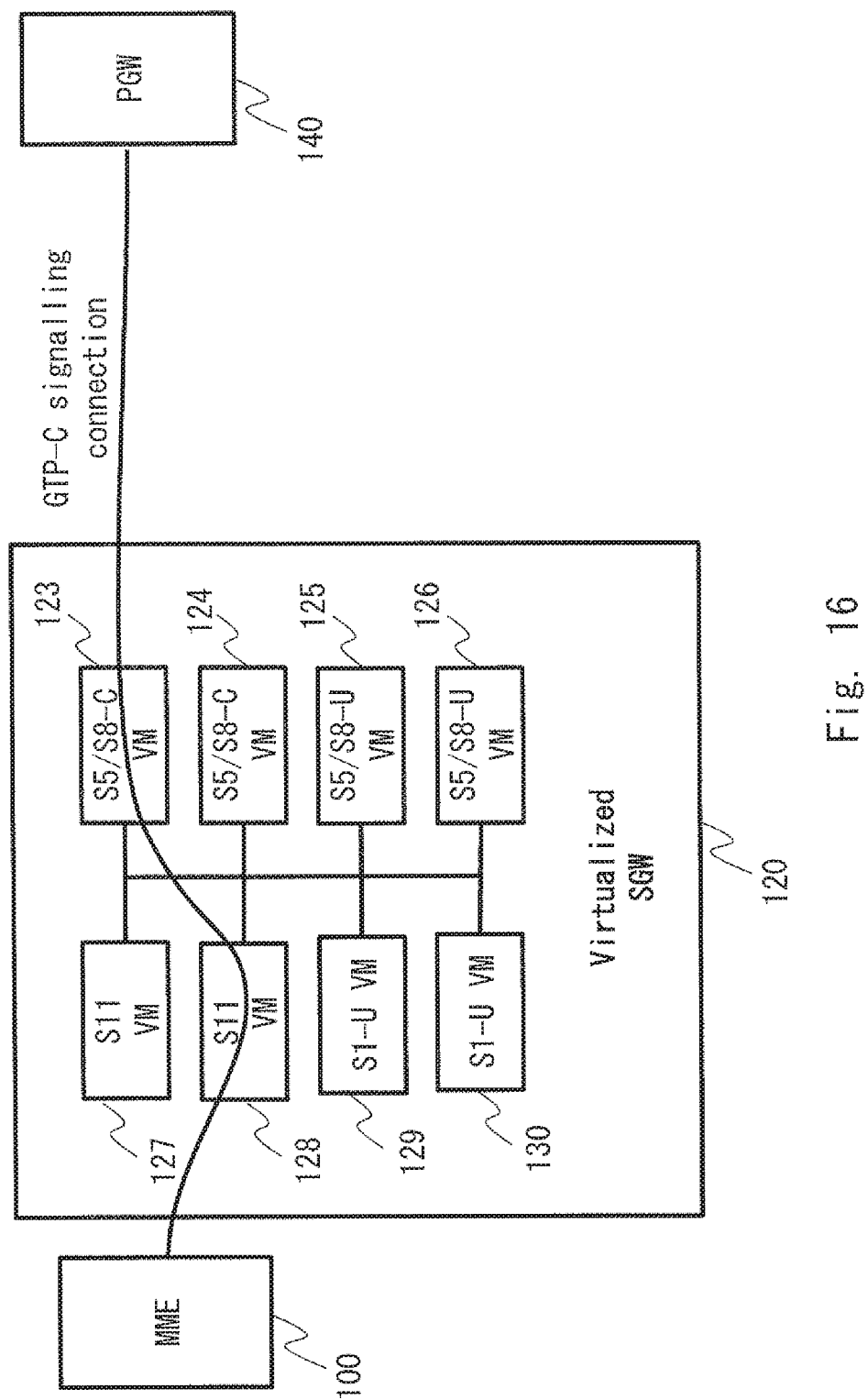
FIG. 16 is a diagram for explaining a session transfer process performed when an S5/S8-C VM according to the second exemplary embodiment is deleted.

FIG. 16 shows that a GTP-C signaling connection is set between the Virtualized MME 100 and the S11 VM 128 of the Virtualized SGW 120 and between the Virtualized PGW 140 and the S5/S8-C VM 123 of the Virtualized SGW 120.

Figure 17:
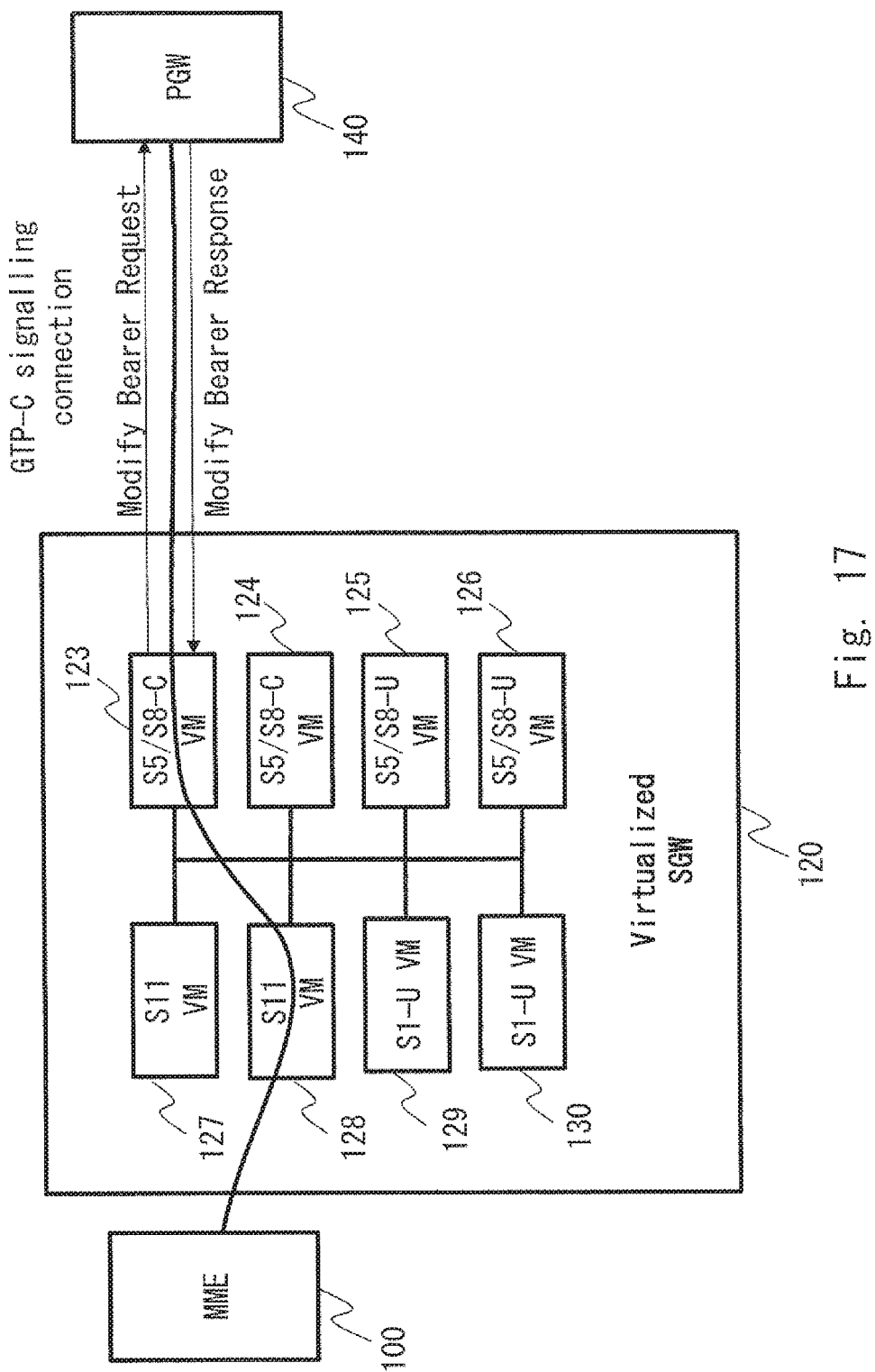
FIG. 17 is a diagram for explaining the session transfer process performed when the S5/S8-C VM according to the second exemplary embodiment is deleted.

FIG. 17 shows that when the S5/S8-C VM 123 is deleted, a Modify Bearer Request message and a Modify Bearer Response message are transmitted/received between the S5/S8-C VM 123 and the Virtualized PGW 140. Since the Virtualized PGW 140 receives the Modify Bearer Request, the Virtualized PGW 140 does not need to recognize that the S5/S8-C VM 123 is deleted.

Figure 18:
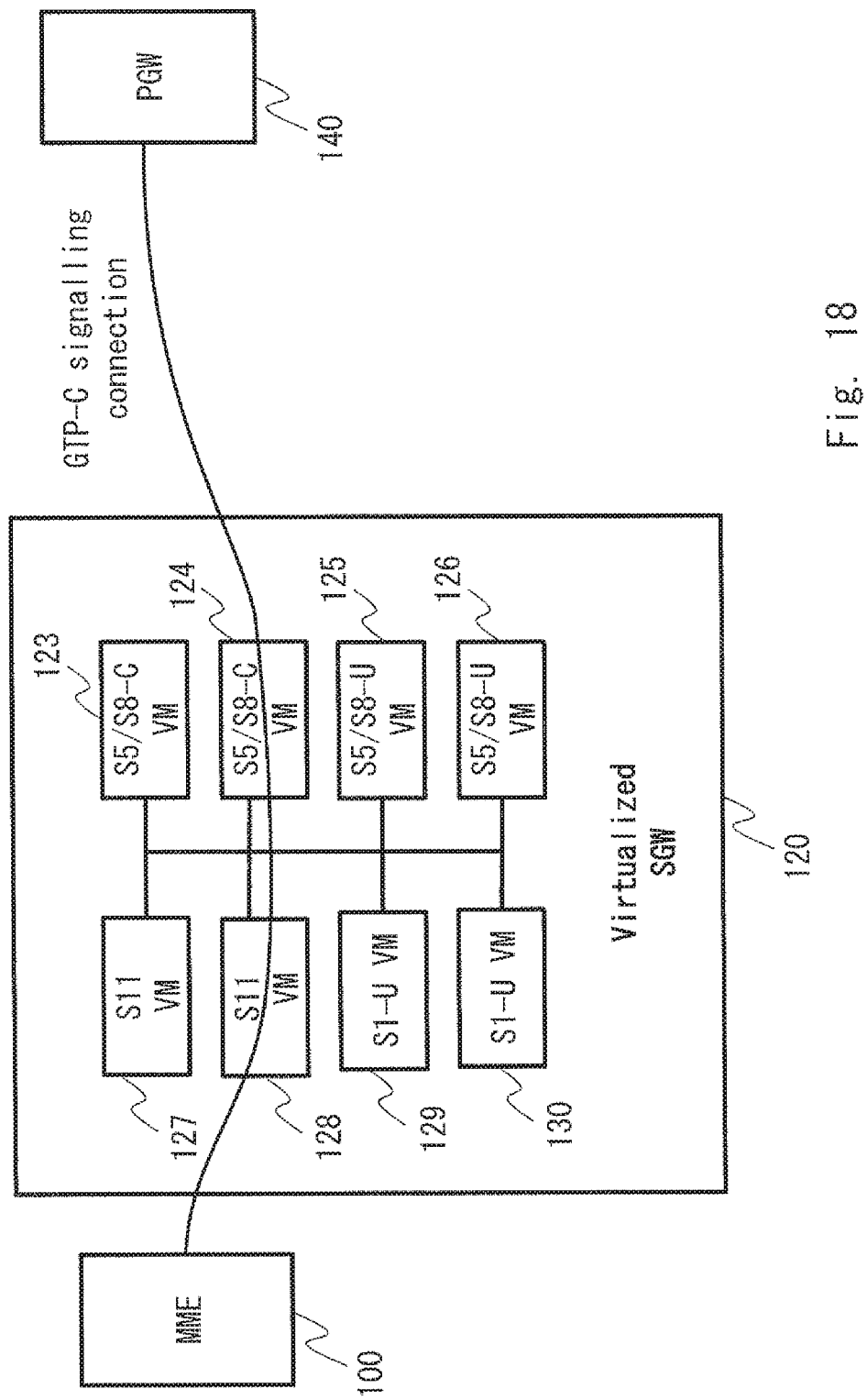
FIG. 18 is a diagram for explaining the session transfer process performed when the S5/S8-C VM according to the second exemplary embodiment is deleted.

As shown in FIG. 18, by transmitting/receiving the Modify Bearer Request and the Modify Bearer Response between the S5/S8-C VM 123 and the Virtualized PGW 140, the GTP-C signaling connection between the Virtualized SGW 120 and the Virtualized PGW 140 is updated. That is, the GTP-C signaling connection between Virtualized SGW 120 and the Virtualized PGW 140, which has been originally set between the S5/S8-C VM 123 and the Virtualized PGW 140, is set between the S5/S8-C VM 124 and the Virtualized PGW 140.

Figure 19:
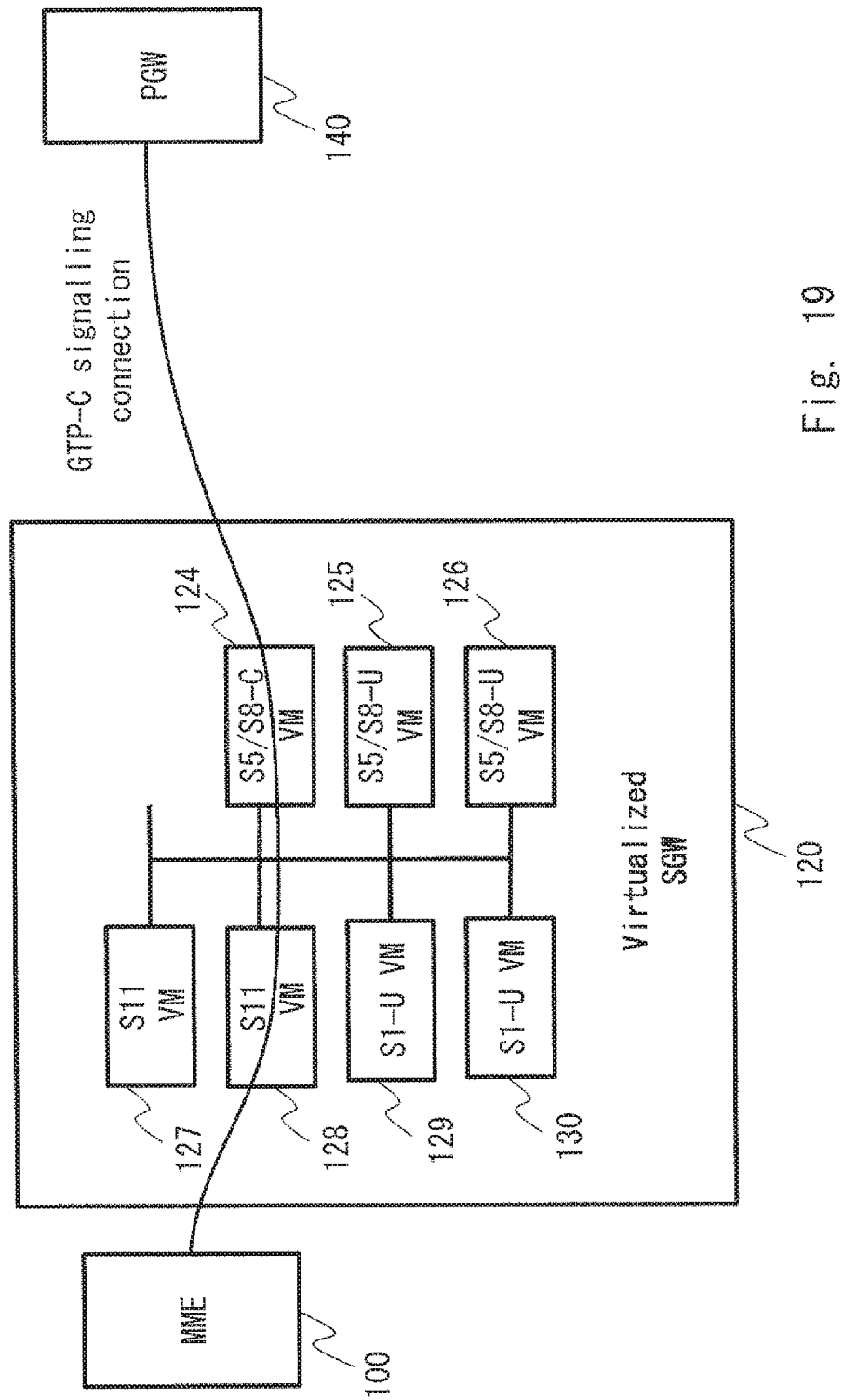
FIG. 19 is a diagram for explaining the session transfer process performed when the S5/S8-C VM according to the second exemplary embodiment is deleted.

FIG. 19 shows that after all the sessions set in the S5/S8-C VM 123 are transferred to the S5/S8-C VM 124, the S5/S8-C VM 123 is deleted.

Next, a process for transferring sessions performed when a VM is deleted according to the second exemplary embodiment is explained with reference to FIGS. 20 to 23. In FIGS. 20 to 23, a process for deleting the S5/S8-U VM 125 of the Virtualized SGW 120 is explained.

Figure 20:
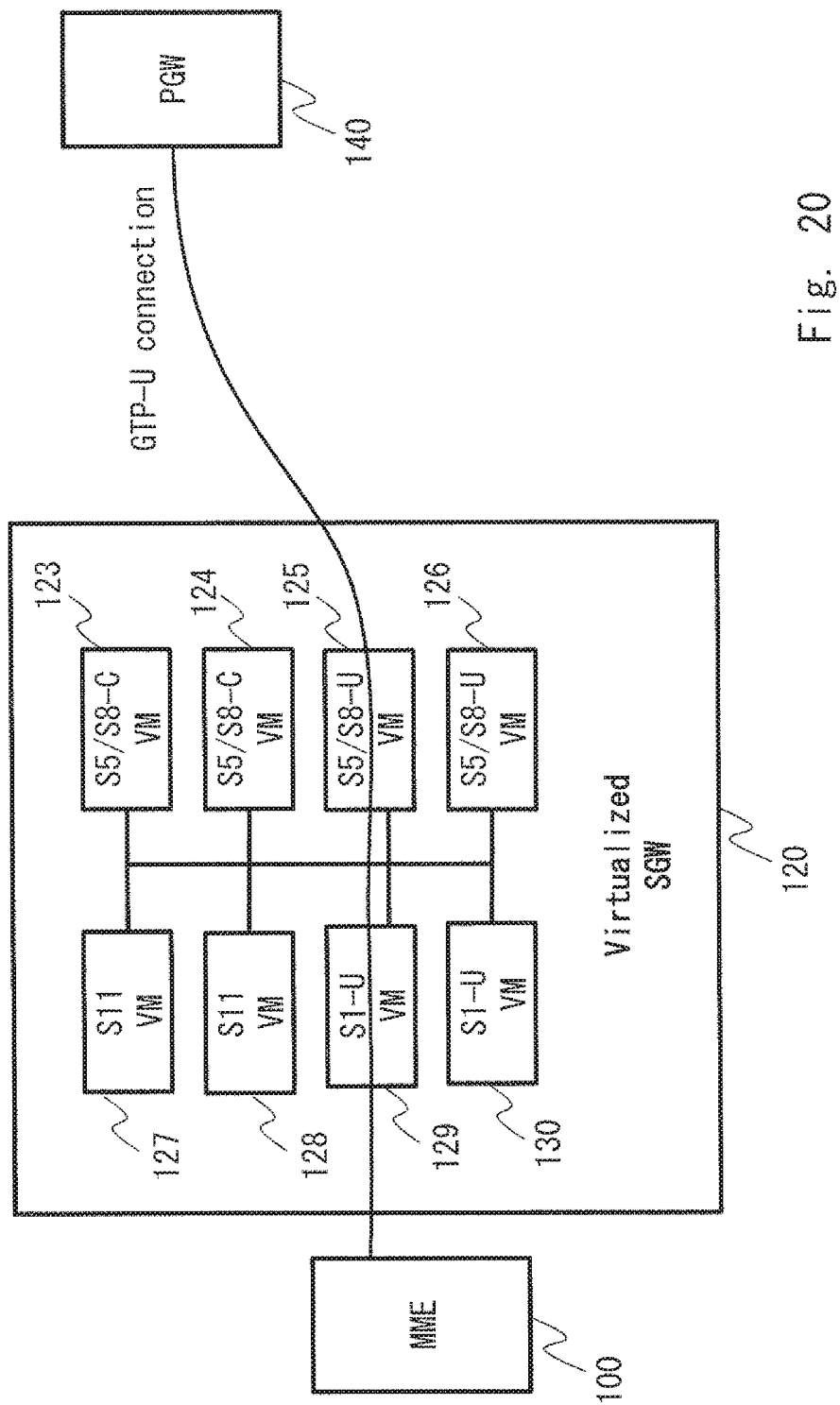
FIG. 20 is a diagram for explaining a session transfer process performed when an S5/S8-U VM according to the second exemplary embodiment is deleted.

FIG. 20 shows that a GTP-C signaling connection is set between the Virtualized MME 100 and the S1-U VM 129 of the Virtualized SGW 120 and between the Virtualized PGW 140 and the S5/S8-U VM 125 of the Virtualized SGW 120.

Figure 21:
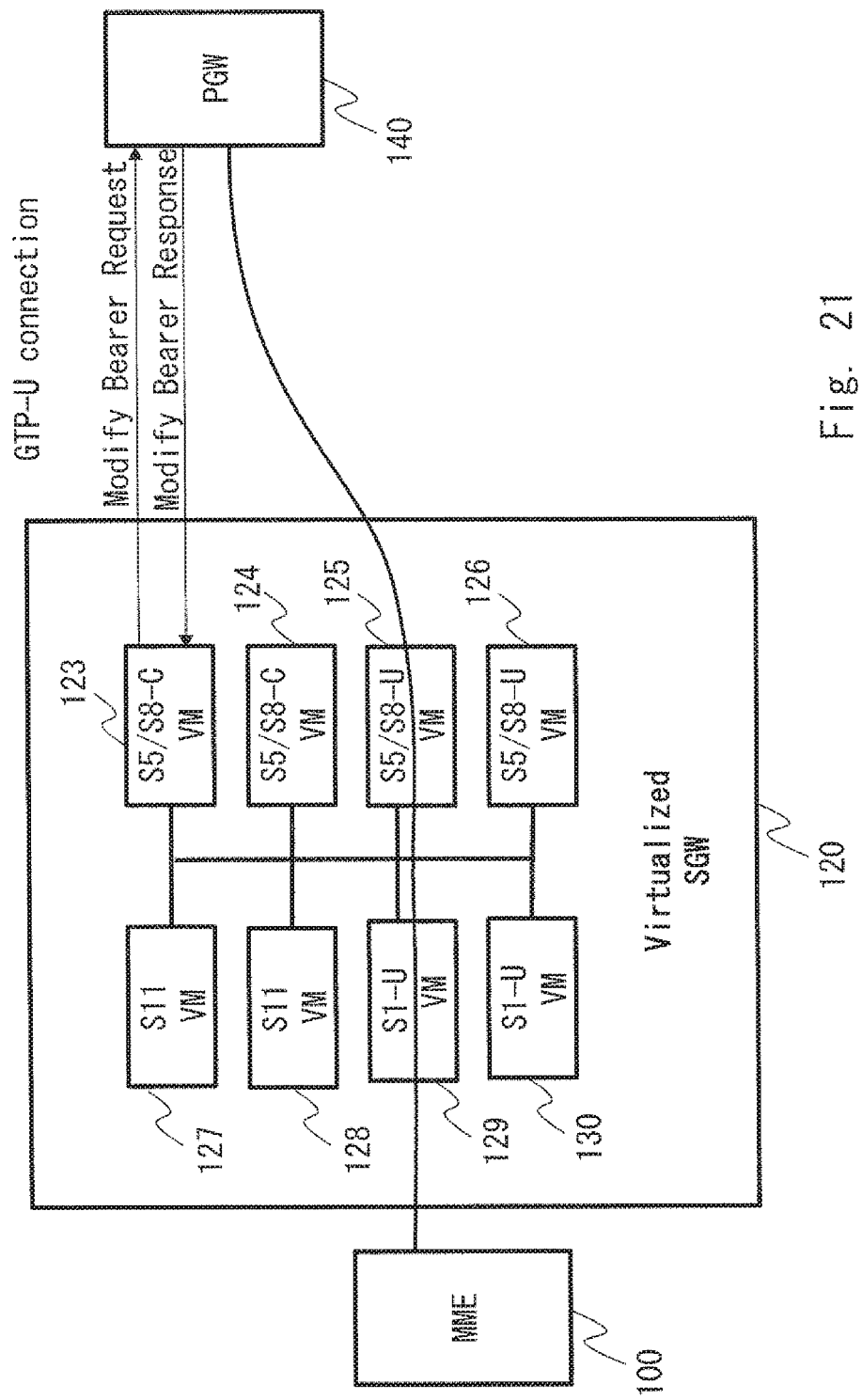
FIG. 21 is a diagram for explaining the session transfer process performed when an S5/S8-U VM according to the second exemplary embodiment is deleted.

FIG. 21 shows that when the S5/S8-U VM 125 is deleted, a Modify Bearer Request message and a Modify Bearer Response message are transmitted/received between the S5/S8-C VM 123 and the Virtualized PGW 140. Note that the Modify Bearer Request message and the Modify Bearer Response message are transmitted/received through the S5/S8-C VM 123. Since the Virtualized PGW 140 receives the Modify Bearer Request, the Virtualized PGW 140 does not need to recognize that the S5/S8-U VM 125 is deleted.

Figure 22:
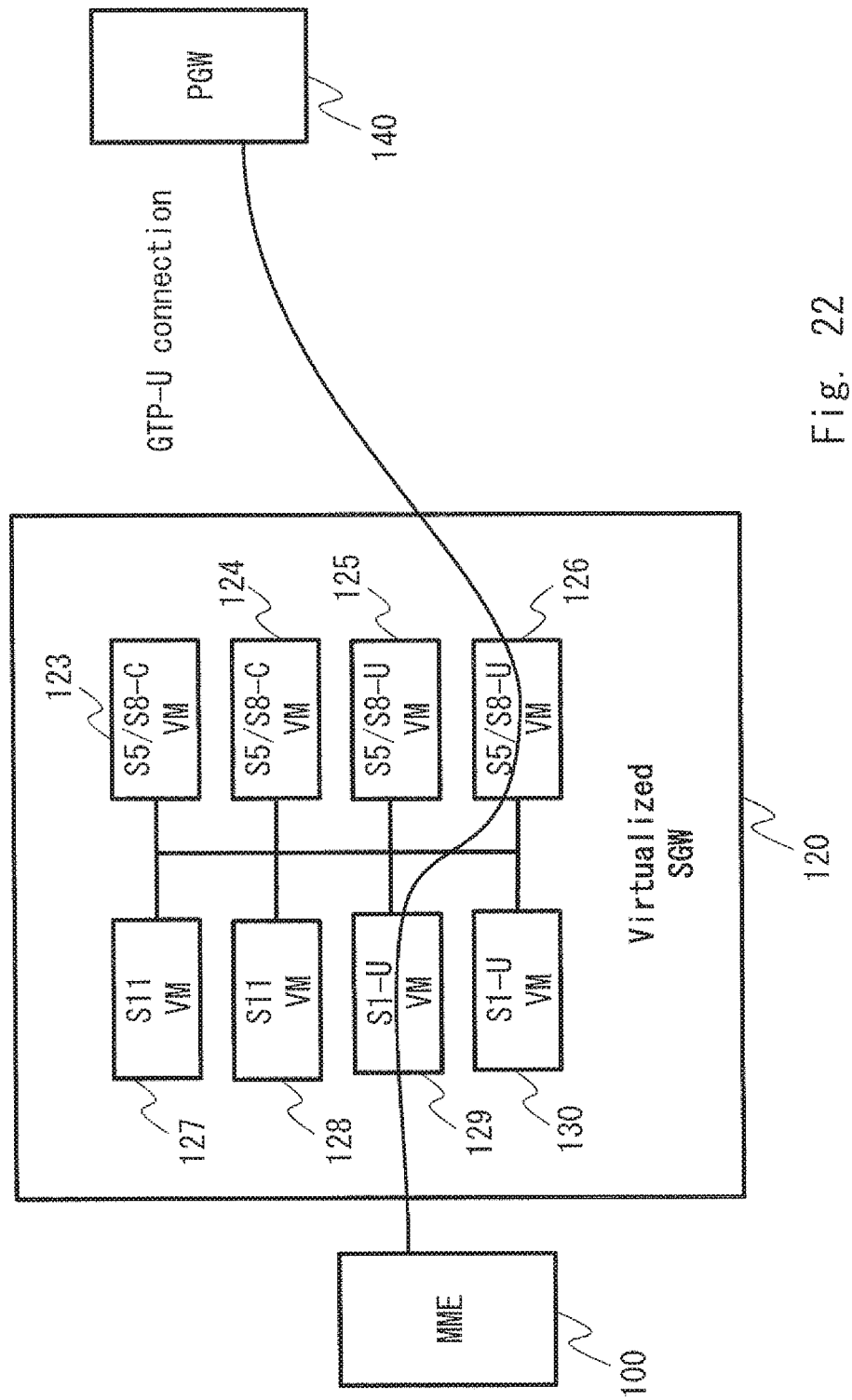
FIG. 22 is a diagram for explaining the session transfer process performed when an S5/S8-U VM according to the second exemplary embodiment is deleted.

As shown in FIG. 22, by transmitting/receiving the Modify Bearer Request and the Modify Bearer Response between the S5/S8-C VM 123 and the Virtualized PGW 140, the GTP-C signaling connection between the Virtualized SGW 120 and the Virtualized PGW 140 is updated. That is, the GTP-C signaling connection between Virtualized SGW 120 and the Virtualized PGW 140 is set between the S5/S8-U VM 126 and the Virtualized PGW 140.

Figure 23:
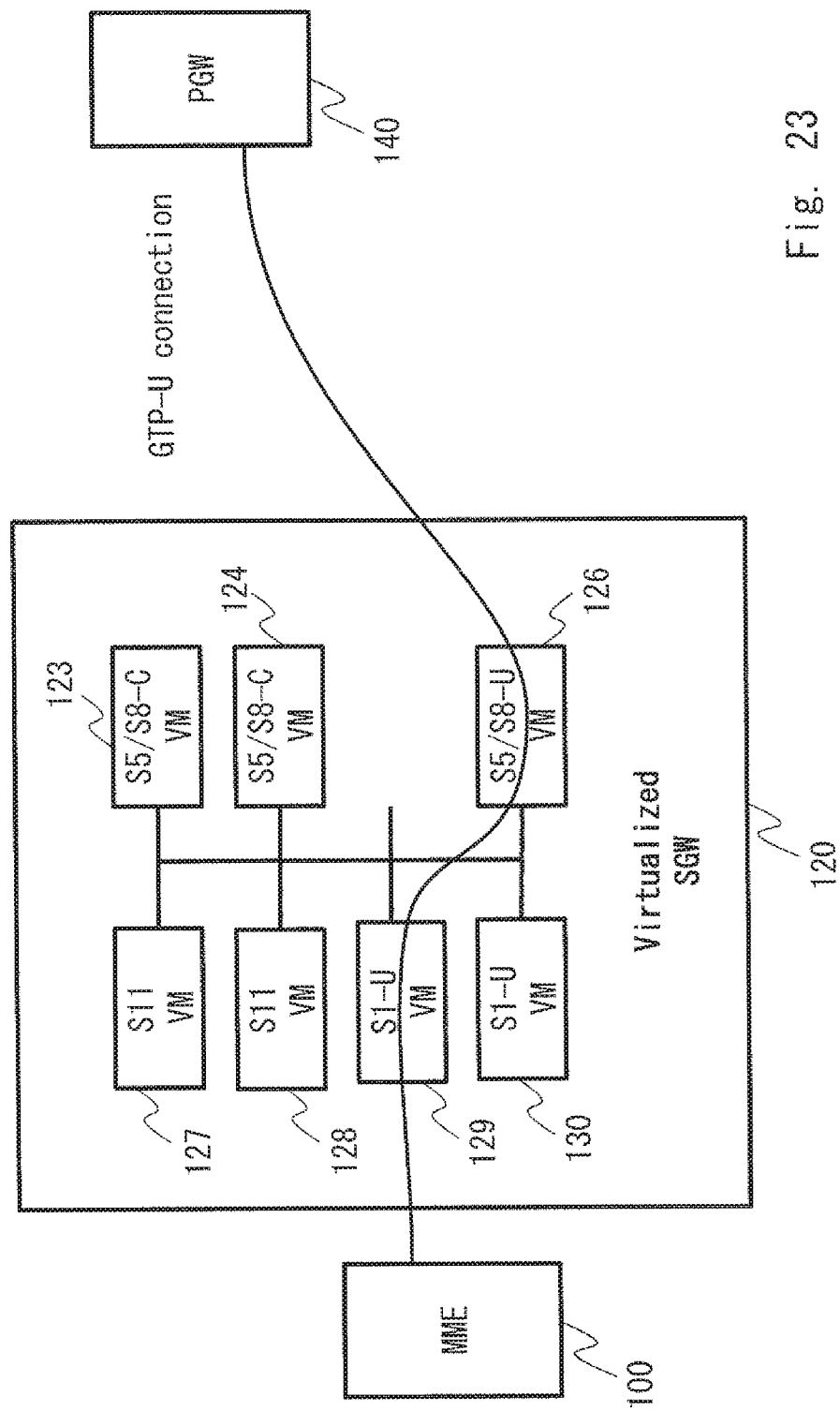
FIG. 23 is a diagram for explaining the session transfer process performed when an S5/S8-U VM according to the second exemplary embodiment is deleted.

FIG. 23 shows that after all the sessions set in the S5/S8-U VM 125 are transferred to the S5/S8-U VM 126, the S5/S8-U VM 125 is deleted.

Figure 24:
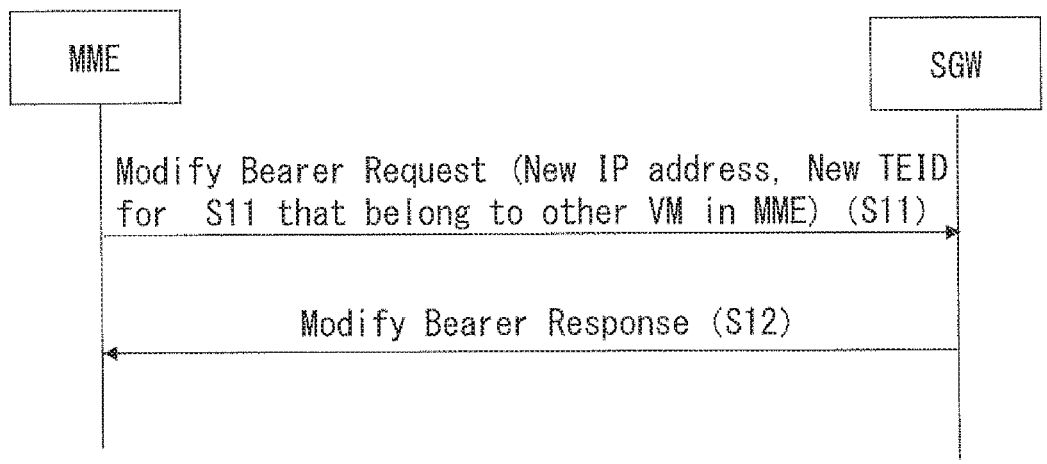
FIG. 24 shows a flow of a process that is performed when a VM of a Virtualized MME according to the second exemplary embodiment is deleted.

Next, a flow of a session information update process according to the second exemplary embodiment of the present invention is explained with reference to FIG. 24. FIG. 24 shows a process that is performed when one of the S11 VMs 104-106 of the Virtualized MME 100 is deleted.

Firstly, the Virtualized MME 100 transmits a Modify Bearer Request message to the Virtualized SGW 120 (S11). The Virtualized MME 100 sets an IP address indicating a VM at the transfer destination of the sessions and a TEID (Tunnel Endpoint ID) in the Modify Bearer Request message. The TEID is an identifier indicating the end of a path set between a VM of the Virtualized MME 100 and a VM of the Virtualized SGW 120. For example, the Virtualized SGW 120 can establish sessions between the Virtualized SGW 120 and a VM designated by the Virtualized MME 100 by transmitting a message designating a TEID notified (i.e., sent) from the Virtualized MME 100 to the Virtualized MME 100. The information indicating the VM at the transfer destination of the sessions may be an IP address and a GRE key.

Next, the Virtualized SGW 120 transmits a Modify Bearer Response message to the Virtualized MME 100 (S12). The Virtualized MME 100 transmits a Modify Bearer Request message for each of the sessions set in the S11 VM to be deleted.

Note that the sessions set between the Virtualized MME 100 and the Virtualized SGW 120 may be, for example, PDN connections. Further, when the S11 VM of the Virtualized MME 100 that should be deleted has sessions set between the S11 VM and a plurality of Virtualized SGWs, the Virtualized MME 100 transmits a Modify Bearer Request message to the plurality of Virtualized SGWs.

As explained above, the sessions set in the VM to be deleted can be transferred by performing the steps S11 and S12. In comparison to the process explained in the comparative example, the number of signals necessary for the transfer of sessions can be considerably reduced by performing the process explained above with reference to the figure.

Figure 25:
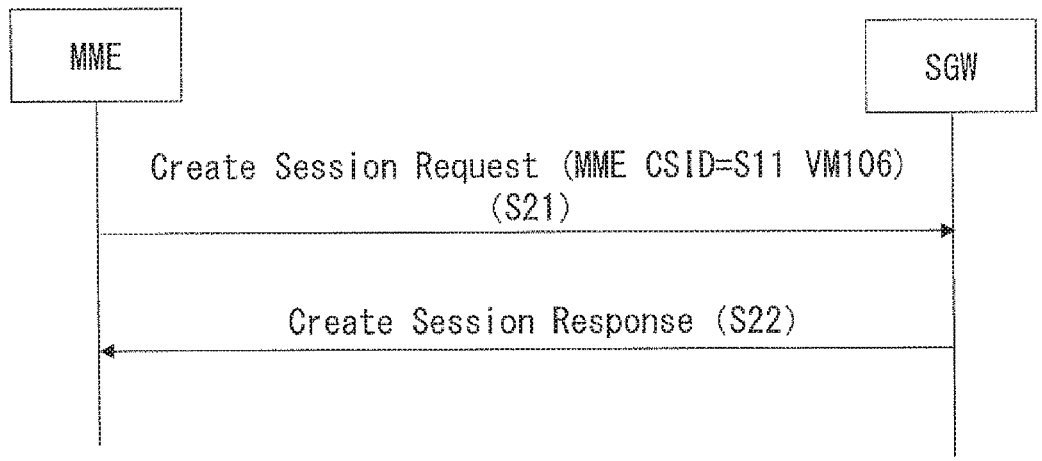
FIG. 25 shows a flow of the process that is performed when the VM of the Virtualized MME according to the second exemplary embodiment is deleted.

Next, a flow of a session information update process according to the second exemplary embodiment of the present invention is explained with reference to FIG. 25. Similarly to FIG. 24, FIG. 25 shows a process that is performed when one of the S11 VMs 104-106 of the Virtualized MME 100 is deleted. Further, while FIG. 24 shows a process in which a Modify Bearer Request message is transmitted for each session, FIG. 25 shows an example in which an update process is performed for a plurality of sessions at a time. Performing an update process for a plurality of sessions at a time is called a "bulk process".

A preparatory process for performing the bulk process is explained with reference to FIG. 25. Firstly, the Virtualized MME 100 transmits a Create Session Request message to the Virtualized SGW 120 when the Virtualized MME 100 establishes sessions between the Virtualized MME 100 and the Virtualized SGW 120 in an S11 interface (S21). At this point, the Virtualized MME 100 transmits a CSID associated with a plurality of sessions that are set by using the S11 VM 106 to the Virtualized SGW 120. The CSID may have a value that is different for each of the VMs in which sessions are set.

The Virtualized SGW 120 recognizes that all of a plurality of sessions for which the same CSID is set are set in the same VM in the Virtualized MME 100. The Virtualized SGW 120 transmits a Create Session Response message as a response to the Create Session Request message (S22).

Next, the bulk process between the Virtualized MME 100 and the Virtualized SGW 120 is explained with reference to FIG. 26. Firstly, the Virtualized MME 100 transmits an Update PDN Connection Set Request message to the Virtualized SGW 120 when the Virtualized MME 100 deletes the S11 VM 106 (S31). Note that the Virtualized MME 100 sets the CSID associated with the S11 VM 106, a group of IP addresses indicating VMs at the transfer destination of the sessions, and a group of TEIDs (Tunnel Endpoint IDs) in the Update PDN Connection Set Request message. The information indicating the VMs at the transfer destination of the sessions may be a group of IP addresses and a group of GRE keys.

Next, the Virtualized SGW 120 transmits an Update PDN Connection Set Response message as a response to the Update PDN Connection Set Request message (S32).

As explained below with reference to FIGS. 25 and 26, by performing the bulk process, a plurality of sessions can be transferred from a VM in which they are currently set to another VM by transmitting/receiving one Update PDN Connection Set Request message and one Update PDN Connection Set Response message. In contrast to this, in the case of FIG. 24, the same number of Modify Bearer Request messages and the same number of Modify Bearer Response messages as the number of set sessions need to be transmitted/received.

Figure 27:
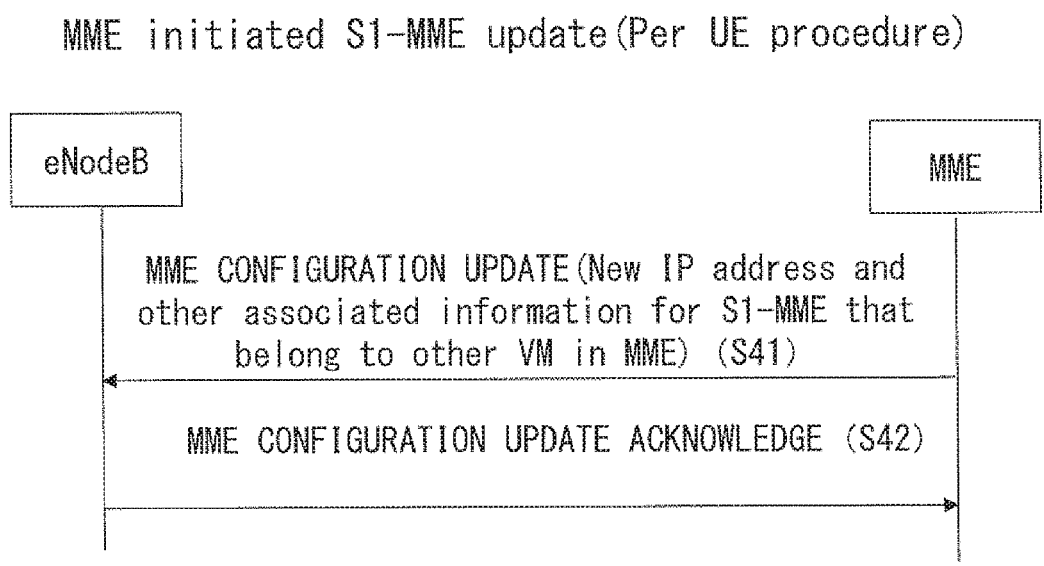
FIG. 27 shows a flow of the process that is performed when the VM of the Virtualized MME according to the second exemplary embodiment is deleted.

Next, a flow of a session information update process according to the second exemplary embodiment of the present invention is explained with reference to FIG. 27. FIG. 27 shows a process that is performed when one of the S1-MME VMs 109-111 of the Virtualized MME 100 is deleted.

Firstly, the Virtualized MME 100 transmits an MME CONFIGURATION UPDATE message to an eNodeB (S41). The Virtualized MME 100 sets an IP address or other identification information indicating a VM at the transfer destination of the sessions in an MME CONFIGURATION UPDATE message.

Next, the eNodeB transmits an MME CONFIGURATION UPDATE ACKNOWLEDGE message to the Virtualized MME 100 as a response to the MME CONFIGURATION UPDATE message (S42). The Virtualized MME 100 transmits an MME CONFIGURATION UPDATE message for each of the sessions set in the S1-MME VM to be deleted.

Figure 28:
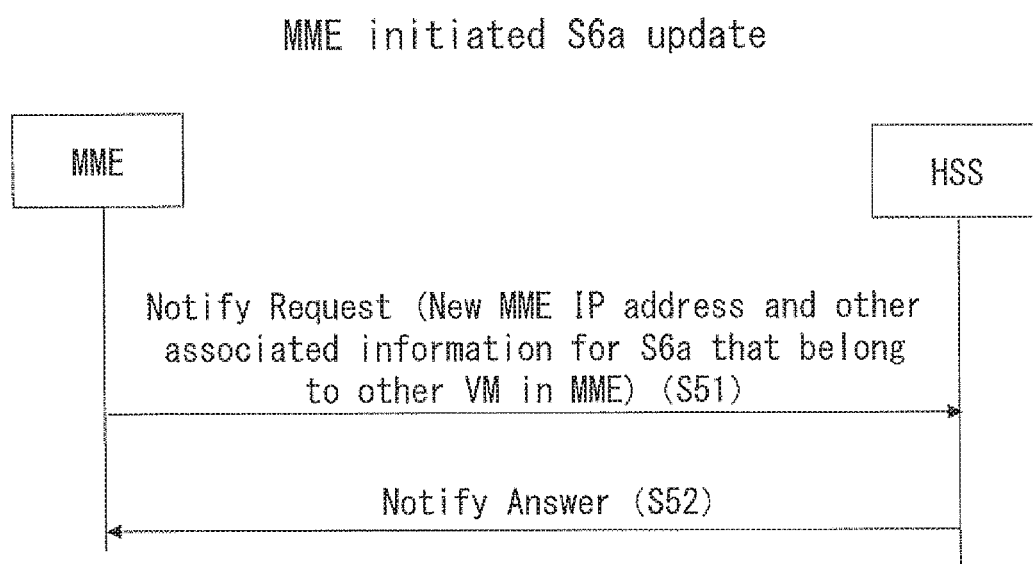
FIG. 28 shows a flow of the process that is performed when the VM of the Virtualized MME according to the second exemplary embodiment is deleted.

Next, a flow of a session information update process according to the second exemplary embodiment of the present invention is explained with reference to FIG. 28. FIG. 28 shows a process that is performed when one of the S6a VMs 101-103 of the Virtualized MME 100 is deleted. Note that steps S51 and S52 in FIG. 28 are similar to those in FIG. 27 except that the entity with which the Virtualized MME 100 communicates is the HSS 21 and the names of transmitted/received signals are different from those in FIG. 27. Therefore, their detailed descriptions are omitted here. Further, as the transmitted/received signals, a Notify Request message and a Notify Answer message are used.

Figure 29:
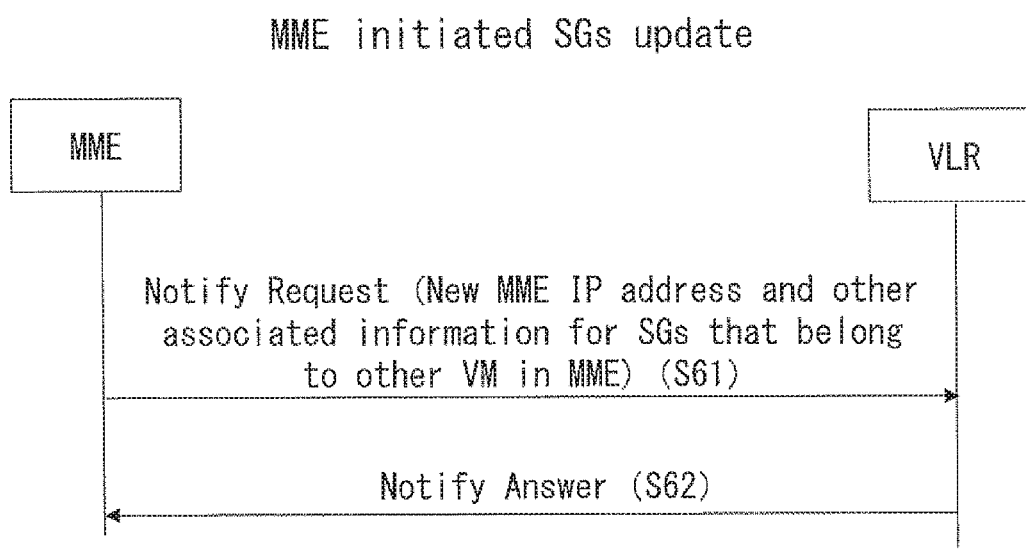
FIG. 29 shows a flow of the process that is performed when the VM of the Virtualized MME according to the second exemplary embodiment is deleted.

Next, a flow of a session information update process according to the second exemplary embodiment of the present invention is explained with reference to FIG. 29. FIG. 29 shows a process that is performed when the SGs VM 107 or 108 of the Virtualized MME 100 is deleted. Note that steps S61 and S62 in FIG. 29 are similar to those in FIG. 28 except that the entity with which the Virtualized MME 100 communicates is the VLR or the MSC server 77, and therefore their detailed descriptions are omitted here.

Figure 30:
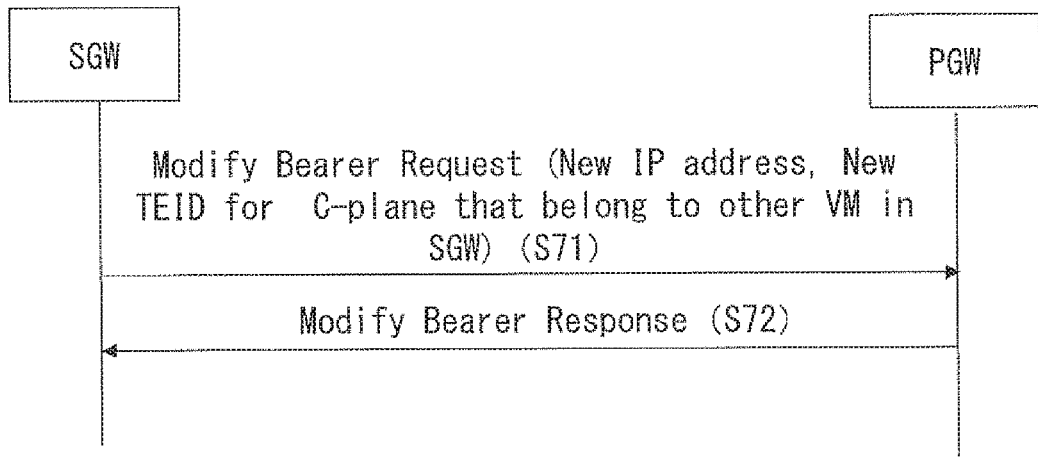
FIG. 30 shows a flow of a process that is performed when a VM of a Virtualized SGW according to the second exemplary embodiment is deleted.

Next, a flow of a session information update process according to the second exemplary embodiment of the present invention is explained with reference to FIG. 30. FIG. 30 shows a process that is performed when the S5/S8-CV VM 123 or 124 of the Virtualized SGW 120 is deleted. Note that steps S71 and S72 in FIG. 30 are similar to those in FIG. 24 except that the entity with which the Virtualized SGW 120 communicates is the Virtualized PGW 140, and therefore their detailed descriptions are omitted here.

Figure 31:
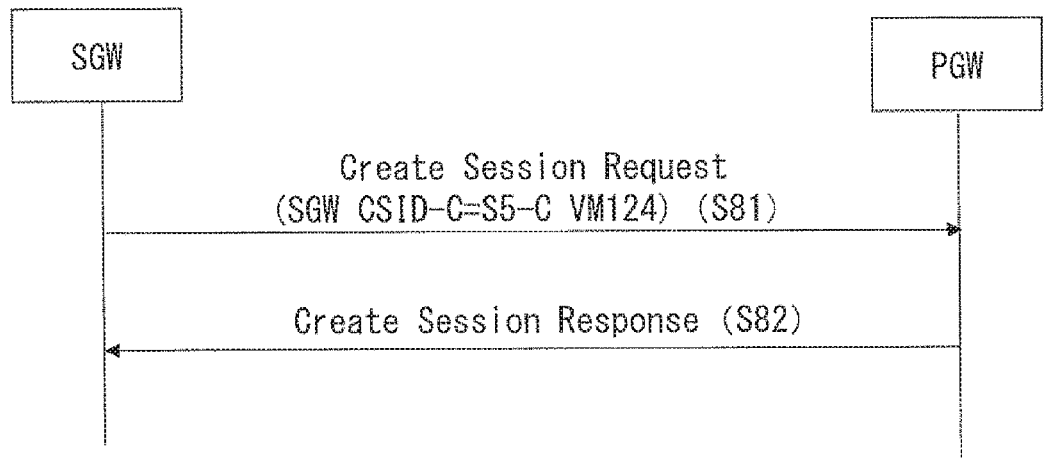
FIG. 31 shows a flow of the process that is performed when the VM of the Virtualized SGW according to the second exemplary embodiment is deleted.

Next, a flow of a session information update process according to the second exemplary embodiment of the present invention is explained with reference to FIG. 31. Similarly to FIG. 30, FIG. 31 shows a process that is performed when the S5/S8-CV VM 123 or 124 of the Virtualized SGW 120 is deleted. Further, while FIG. 30 shows a process in which a Modify Bearer Request message is transmitted for each session, FIG. 31 shows an example in which a bulk process is performed. Note that steps S81 and S82 in FIG. 31 are similar to those in FIG. 25 except that the entity with which the Virtualized SGW 120 communicates is the Virtualized PGW 140, and therefore their detailed descriptions are omitted here.

Figure 26:
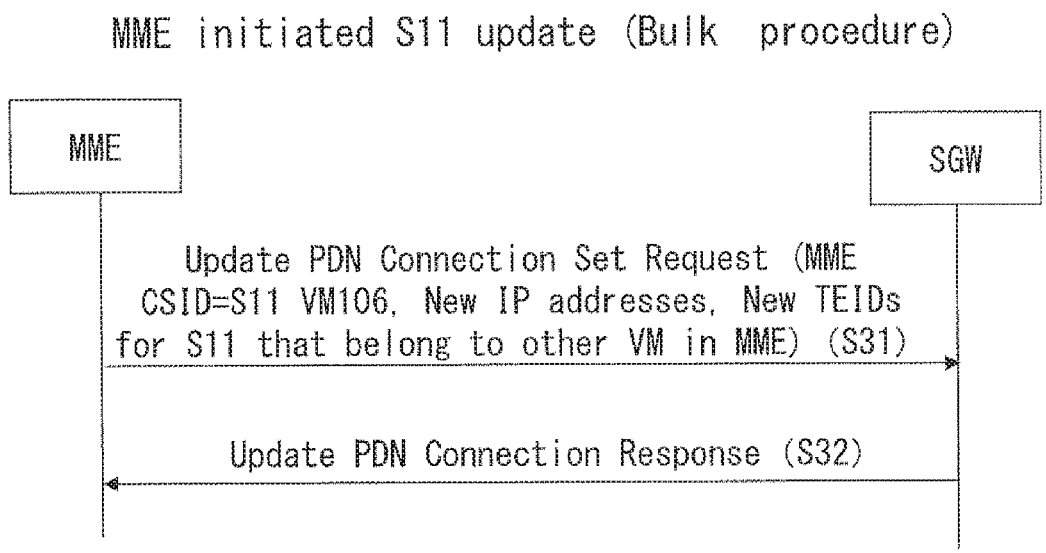
FIG. 26 shows a flow of the process that is performed when the VM of the Virtualized MME according to the second exemplary embodiment is deleted.
Figure 32:
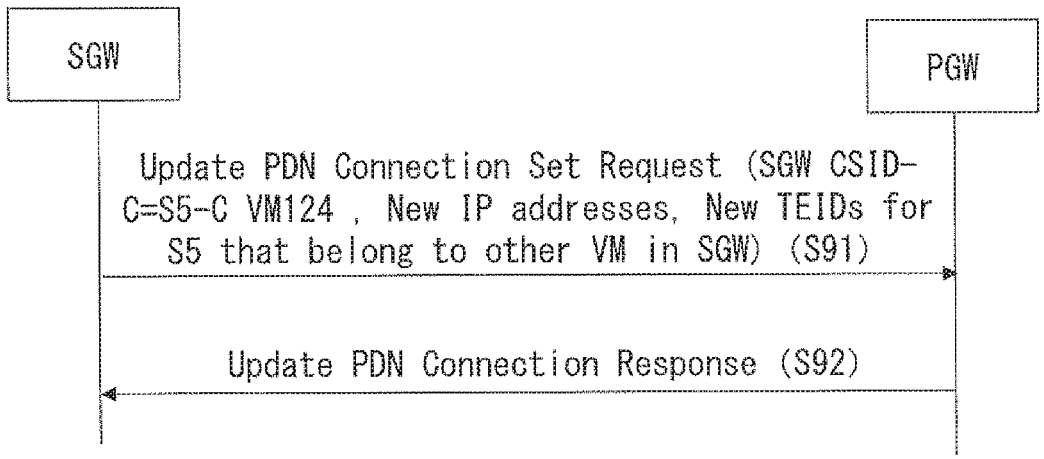
FIG. 32 shows a flow of the process that is performed when the VM of the Virtualized SGW according to the second exemplary embodiment is deleted.

Further, steps S91 and S92 in FIG. 32 are also similar to those in FIG. 26 except that the entity with which the Virtualized SGW 120 communicates is the Virtualized PGW 140, and therefore their detailed descriptions are omitted here.

Figure 33:
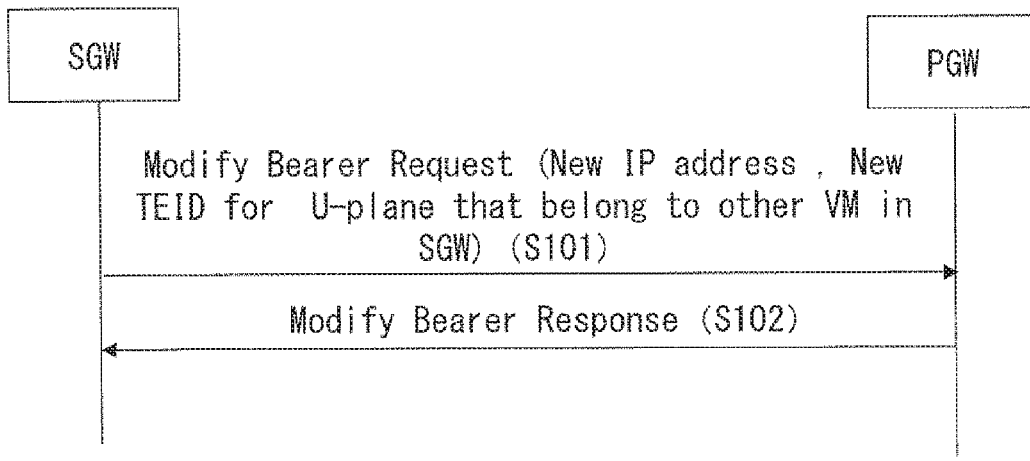
FIG. 33 shows a flow of the process that is performed when the VM of the Virtualized SGW according to the second exemplary embodiment is deleted.

Next, a flow of a session information update process according to the second exemplary embodiment of the present invention is explained with reference to FIG. 33. FIG. 33 shows a process that is performed when the S5/S8-U VM 125 or 126 of the Virtualized SGW 120 is deleted. Note that steps S101 and S102 in FIG. 33 are similar to those in FIG. 30 except that sessions that are used for U-plane data communication of an S5/S8 interface are updated, and therefore their detailed descriptions are omitted here.

Figure 34:
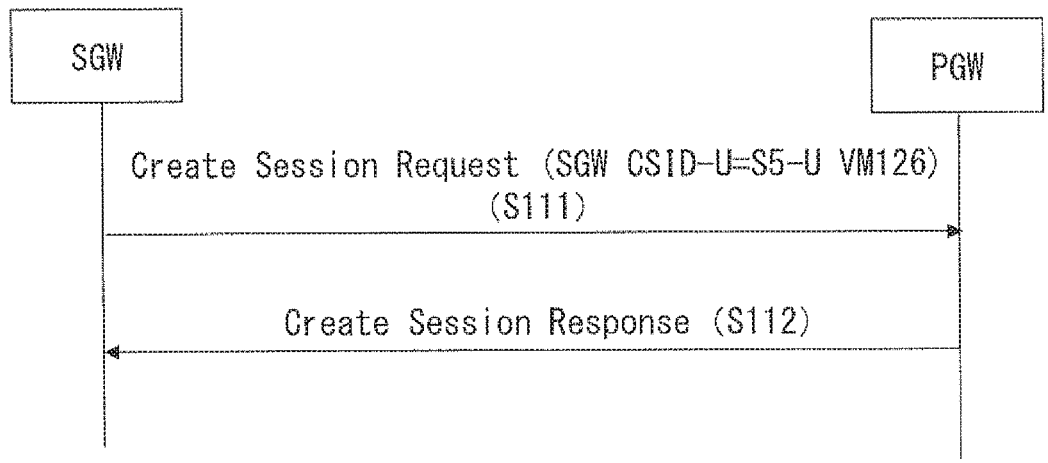
FIG. 34 shows a flow of the process that is performed when the VM of the Virtualized SGW according to the second exemplary embodiment is deleted.

Next, a flow of a session information update process according to the second exemplary embodiment of the present invention is explained with reference to FIG. 34. Similarly to FIG. 33, FIG. 34 shows a process that is performed when the S5/S8-U VM 125 or 126 of the Virtualized SGW 120 is deleted. Further, while FIG. 33 shows a process in which a Modify Bearer Request message is transmitted for each session, FIG. 34 shows an example in which a bulk process is performed. Note that steps S111 and S112 in FIG. 34 are similar to those in FIG. 31 except that sessions that are used for U-plane data communication of an S5/S8 interface are updated, and therefore their detailed descriptions are omitted here.

Figure 35:
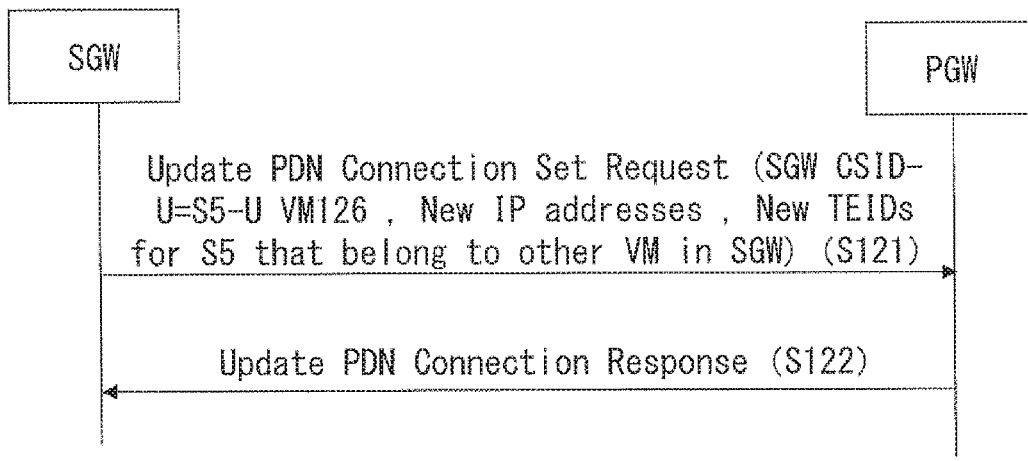
FIG. 35 shows a flow of the process that is performed when the VM of the Virtualized SGW according to the second exemplary embodiment is deleted.

Further, steps S121 and S122 in FIG. 35 are also similar to those in FIG. 32 except that sessions that are used for U-plane data communication of an S5/S8 interface are updated, and therefore their detailed descriptions are omitted here.

Figure 36:
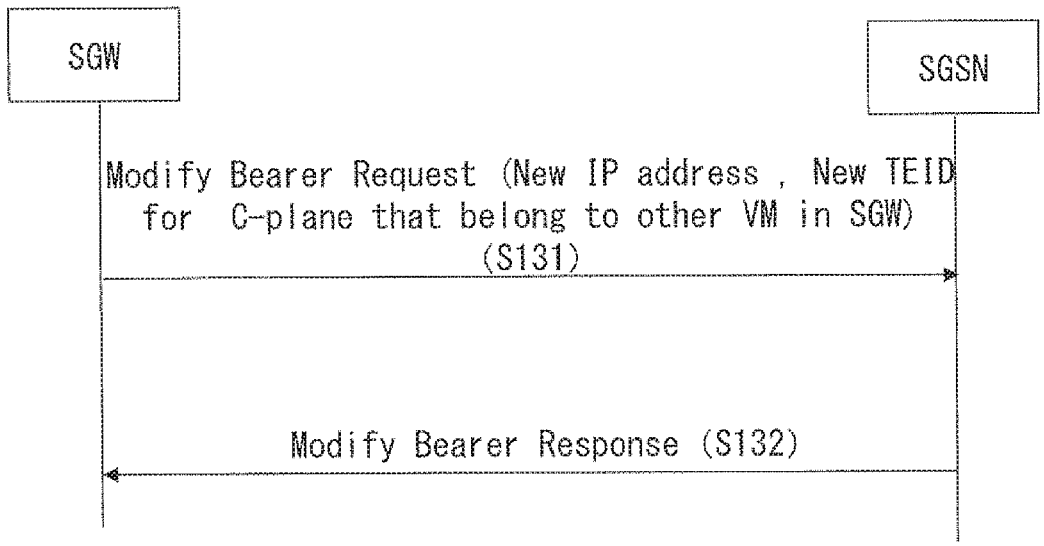
FIG. 36 shows a flow of the process that is performed when the VM of the Virtualized SGW according to the second exemplary embodiment is deleted.

Next, a flow of a session information update process according to the second exemplary embodiment of the present invention is explained with reference to FIG. 36. FIG. 36 shows a process that is performed when a VM that serves as an S4C interface of the Virtualized SGW 120 is deleted. Note that steps S131 and S132 in FIG. 36 are similar to those in FIG. 30 except that the entity with which the Virtualized SGW 120 communicates is the SGSN 14, and therefore their detailed descriptions are omitted here.

Figure 37:
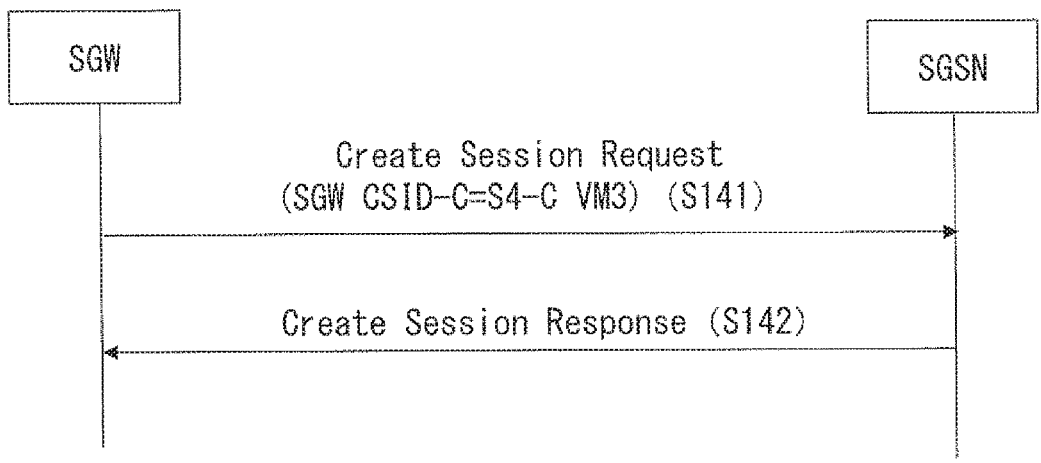
FIG. 37 shows a flow of the process that is performed when the VM of the Virtualized SGW according to the second exemplary embodiment is deleted.

Next, a flow of a session information update process according to the second exemplary embodiment of the present invention is explained with reference to FIG. 37. Similarly to FIG. 36, FIG. 37 shows a process that is performed when a VM that serves as an S4C interface of the Virtualized SGW 120 is deleted. Further, while FIG. 36 shows a process in which a Modify Bearer Request message is transmitted for each session, FIG. 37 shows an example in which a bulk process is performed. Note that steps S141 and S142 in FIG. 37 are similar to those in FIG. 34 except that sessions that are set in the S4C interface are updated, and therefore their detailed descriptions are omitted here.

Figure 38:
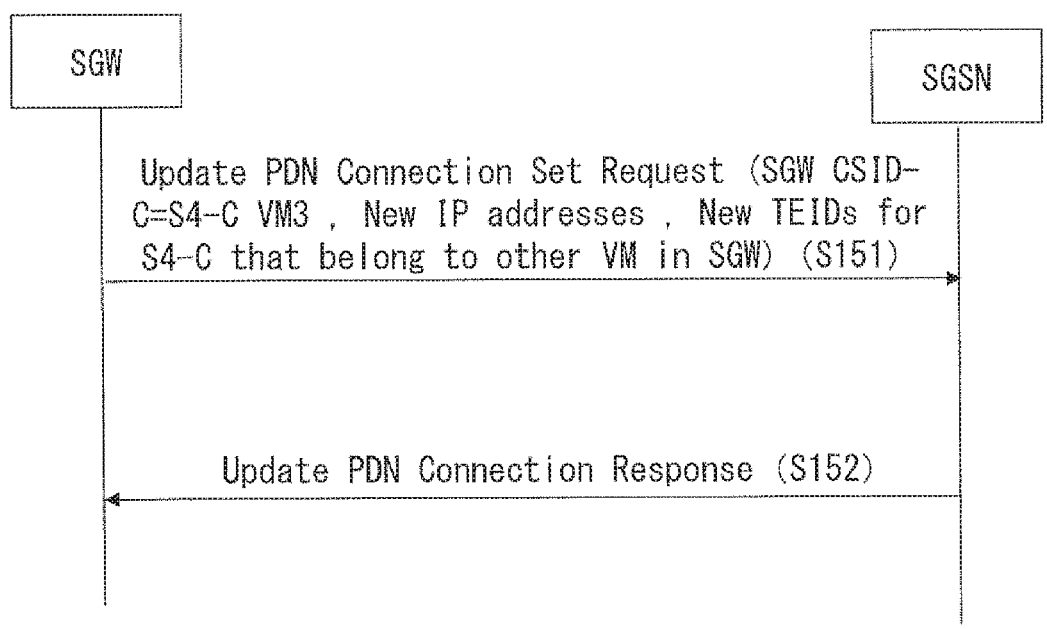
FIG. 38 shows a flow of the process that is performed when the VM of the Virtualized SGW according to the second exemplary embodiment is deleted.

Further, steps S151 and S152 in FIG. 38 are also similar to those in FIG. 35 except that sessions that are set in the S4C interface are updated, and therefore their detailed descriptions are omitted here.

Figure 39:
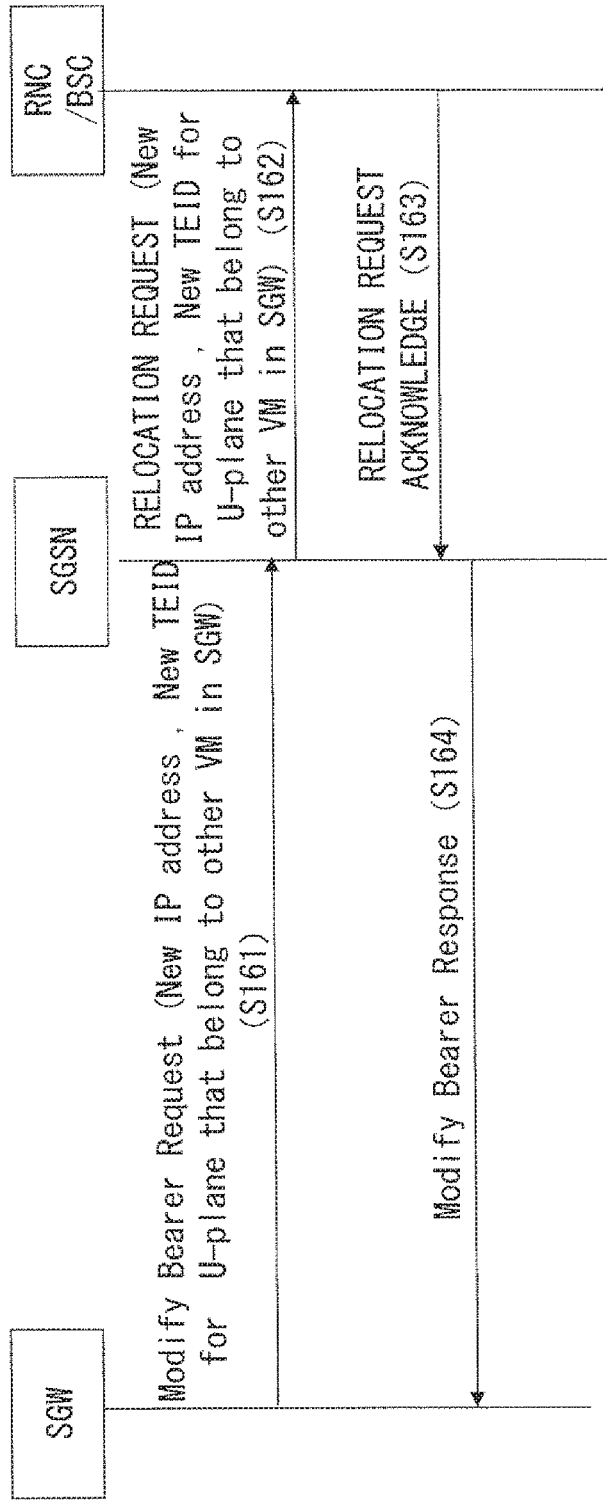
FIG. 39 shows a flow of the process that is performed when the VM of the Virtualized SGW according to the second exemplary embodiment is deleted.

Next, a flow of a session information update process according to the second exemplary embodiment of the present invention is explained with reference to FIG. 39. FIG. 39 shows a process that is performed when a VM that serves as an S4U interface of the Virtualized SGW 120 is deleted. Firstly, the Virtualized SGW 120 transmits a Modify Bearer Request message to the Virtualized SGSN 160 (S161). The Virtualized SGW 120 transmits/receives a Modify Bearer Request message and after that a Modify Bearer Response (step S164) through the S4C interface. The Virtualized SGW 120 sets an IP address indicating a VM at the transfer destination of the sessions and a TEID in the Modify Bearer Request message.

Next, the Virtualized SGSN 160 notifies the Virtualized RNC 210 of the update information of the VM serving as the S4U interface in the Virtualized SGW 120. Specifically, the Virtualized SGSN 160 transmits a RELOCATION REQUEST message to the Virtualized RNC 210 (S162). The Virtualized SGSN 160 sets the information received in the step S161 in the RELOCATION REQUEST message. The Virtualized RNC 210 transmits a RELOCATION REQUEST ACKNOWLEDGE message to the Virtualized SGSN 160 as a response to the RELOCATION REQUEST message (S163).

Upon receiving the RELOCATION REQUEST ACKNOWLEDGE message in the step S163, the Virtualized SGSN 160 transmits a Modify Bearer Response message to the Virtualized SGW 120 as a response to the Modify Bearer Request (S164). The Virtualized SGW 120 transmits a Modify Bearer Request message for each of the sessions set in the VM of the interface related to the S4U to be deleted.

As explained above with reference to the figure, the Virtualized SGW 120 does not directly notify the Virtualized RNC 210 of the information about the deletion of the VM, but can notify the Virtualized RNC 210 of the information about the deletion of the VM through the Virtualized SGSN 160. In this way, the processing load of the Virtualized SGW 120 for transmitting signals to the Virtualized RNC 210 can be reduced.

Figure 40:
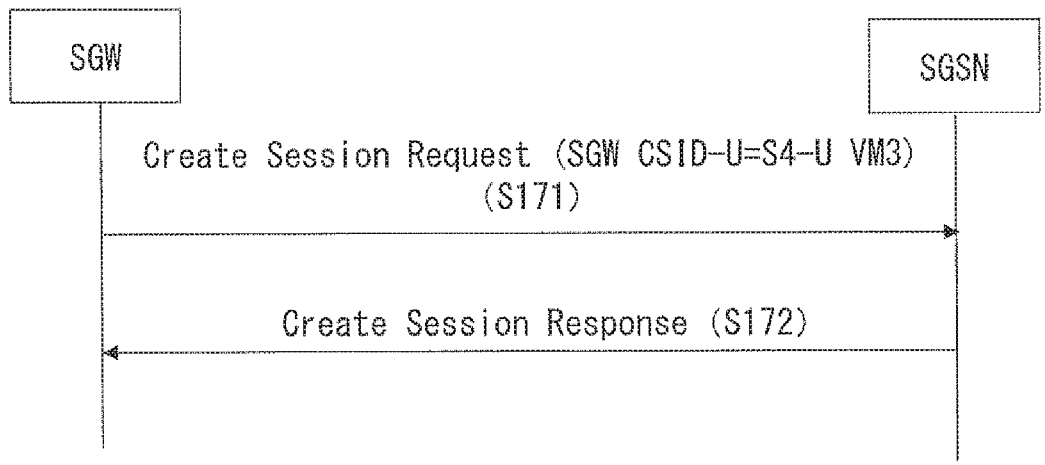
FIG. 40 shows a flow of the process that is performed when the VM of the Virtualized SGW according to the second exemplary embodiment is deleted.

Next, a flow of a session information update process according to the second exemplary embodiment of the present invention is explained with reference to FIG. 40. Similarly to FIG. 39, FIG. 40 shows a process that is performed when a VM that serves as an S4U interface of the Virtualized SGW 120 is deleted. Further, while FIG. 39 shows a process in which a Modify Bearer Request message is transmitted for each session, FIG. 40 shows an example in which a bulk process is performed. Note that steps S171 and S172 in FIG. 40 are similar to those in FIG. 37 except that sessions that are set in the S4U interface are updated, and therefore their detailed descriptions are omitted here.

Figure 41:
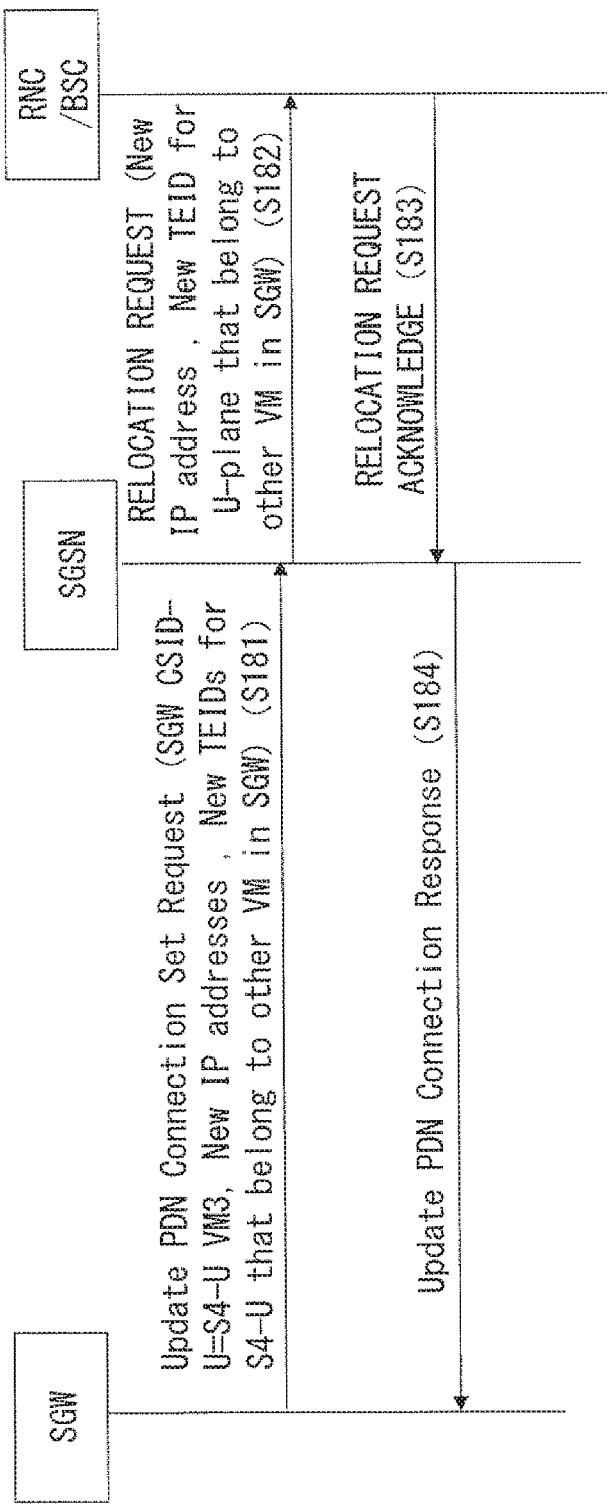
FIG. 41 shows a flow of the process that is performed when the VM of the Virtualized SGW according to the second exemplary embodiment is deleted.

Further, steps S181 and S184 in FIG. 41 are similar to those in FIG. 38 except that sessions that are set in the S4U interface are updated, and therefore their detailed descriptions are omitted here. Further, the Virtualized SGSN 160 repeats the steps S182 and S183 the same number of times as the number of set sessions. That is, the Virtualized SGW 120 notifies the Virtualized SGSN 160 that a plurality of sessions are collectively transferred to a new VM by using a bulk process. In contrast to this, the Virtualized SGSN 160 does not use the bulk process and repeats the steps S182 and S183 the same number of times as the number of set sessions. When the Virtualized SGSN 160 has completed the notification about the deletion of the VM in the Virtualized SGW 120 to the Virtualized RNC 210 for all the sessions, the Virtualized SGSN 160 transmits an Update PDN Connection Response message in a step S184.

Figure 42:
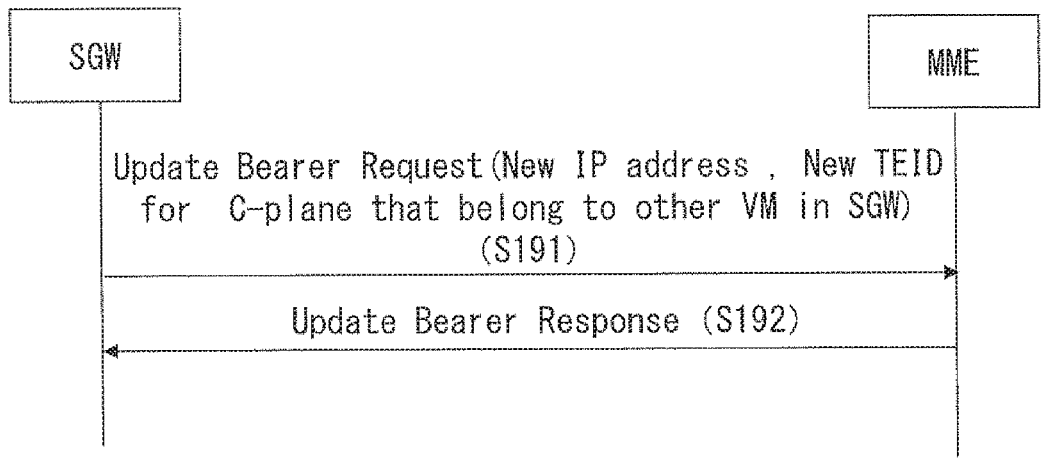
FIG. 42 shows a flow of the process that is performed when the VM of the Virtualized SGW according to the second exemplary embodiment is deleted.

Next, a flow of a session information update process according to the second exemplary embodiment of the present invention is explained with reference to FIG. 42. FIG. 42 shows a process that is performed when the S11 VM 127 or 128 of the Virtualized SGW 120 is deleted. Note that in steps S191 and S192 in FIG. 42, the entity with which the Virtualized SGW 120 communicates is the Virtualized MME 100. Further, the Virtualized SGW 120 and the Virtualized MME 100 use an Update Bearer Request message and an Update Bearer Response message. The content of each of these messages is similar to that in FIG. 30 and therefore their detailed descriptions are omitted here.

Figure 43:
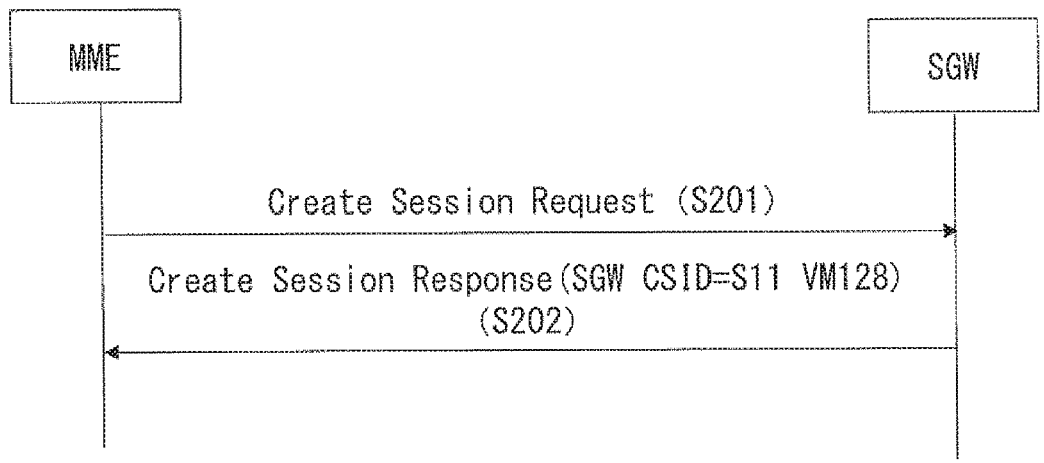
FIG. 43 shows a flow of the process that is performed when the VM of the Virtualized SGW according to the second exemplary embodiment is deleted.

Next, a flow of a session information update process according to the second exemplary embodiment of the present invention is explained with reference to FIG. 43. Similarly to FIG. 42, FIG. 43 shows a process that is performed when the S11 VM 127 or 128 of the Virtualized SGW 120 is deleted. Further, while FIG. 42 shows a process in which a Modify Bearer Request message is transmitted for each session, FIG. 43 shows an example in which a bulk process is performed.

In FIG. 43, as a response to a Create Session Request message transmitted from the Virtualized MME 100 to the Virtualized SGW 120 in a step S201, the Virtualized SGW 120 transmits a Create Session Response message to the Virtualized MME 100 (S202). The Virtualized SGW 120 transmits a CSID associated with a plurality of sessions that are set in the Create Session Response message by using the S11 VM 128 to the Virtualized SGW 120.

Figure 44:
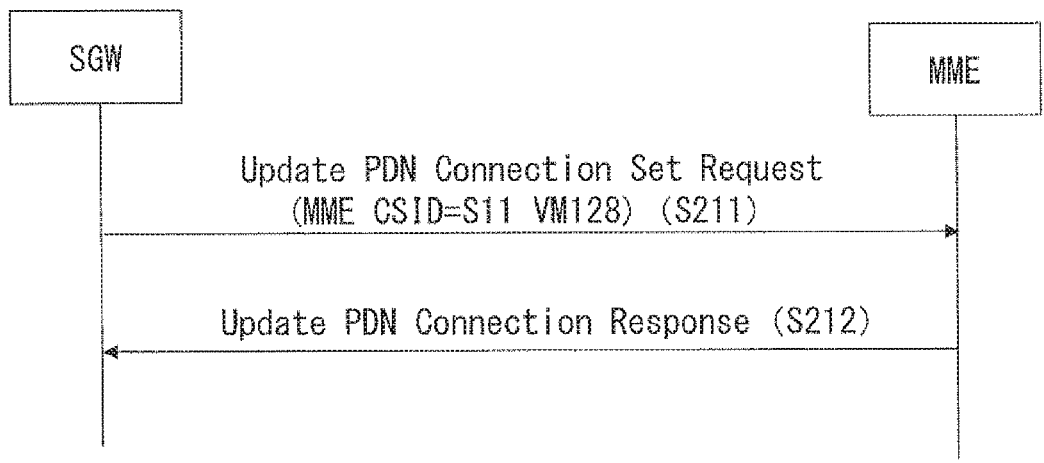
FIG. 44 shows a flow of the process that is performed when the VM of the Virtualized SGW according to the second exemplary embodiment is deleted.

Note that steps S211 and S212 in FIG. 44 are similar to those in FIG. 38 except that sessions set in the S11 VM 128 are updated and the entity with which the Virtualized SGW 120 communicates is the Virtualized MME 100, and therefore their detailed descriptions are omitted here.

Figure 45:
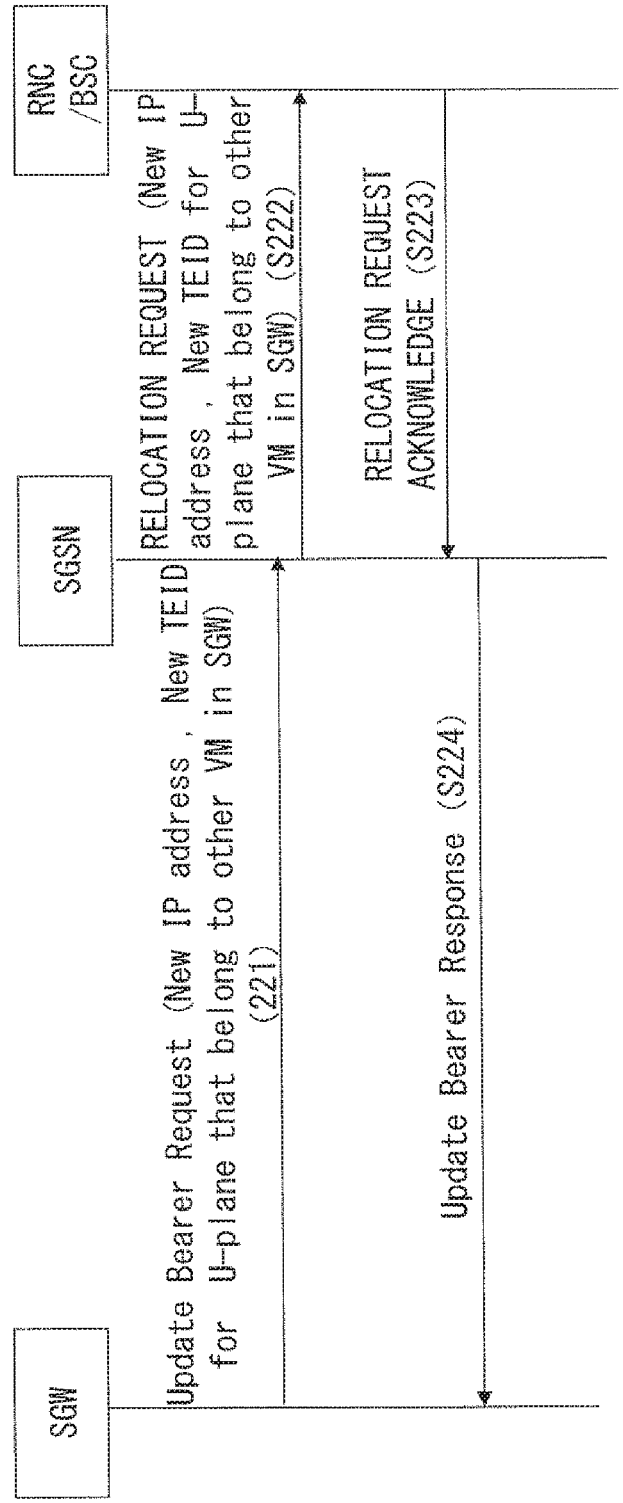
FIG. 45 shows a flow of the process that is performed when the VM of the Virtualized SGW according to the second exemplary embodiment is deleted.

Next, a flow of a session information update process according to the second exemplary embodiment of the present invention is explained with reference to FIG. 45. FIG. 45 shows a process that is performed when the S12 VM 131 or 132 of the Virtualized SGW 120 is deleted. Note that steps S221 to S224 in FIG. 45 are similar to those in FIG. 39 except that the message used in the steps S221 and S224 is an Update Bearer Request message, and therefore their detailed descriptions are omitted here.

Figure 46:
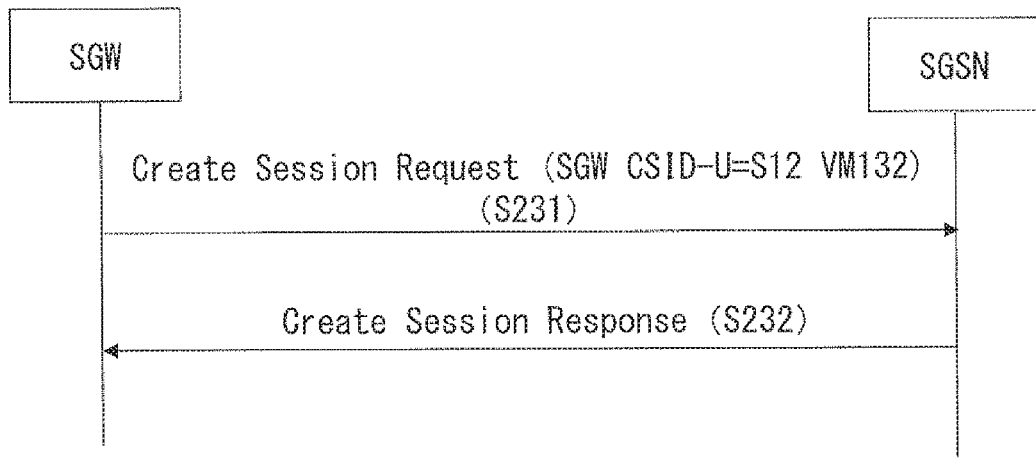
FIG. 46 shows a flow of the process that is performed when the VM of the Virtualized SGW according to the second exemplary embodiment is deleted.

Next, a flow of a session information update process according to the second exemplary embodiment of the present invention is explained with reference to FIG. 46. Similarly to FIG. 45, FIG. 46 shows a process that is performed when the S12 VM 131 or 132 of the Virtualized SGW 120 is deleted. Further, while FIG. 45 shows a process in which a Modify Bearer Request message is transmitted for each session, FIG. 46 shows an example in which a bulk process is performed. Note that steps S231 and S232 in FIG. 46 are similar to those in FIG. 40 except that sessions that are set in the S12 VM 132 are updated, and therefore their detailed descriptions are omitted here.

Figure 47:
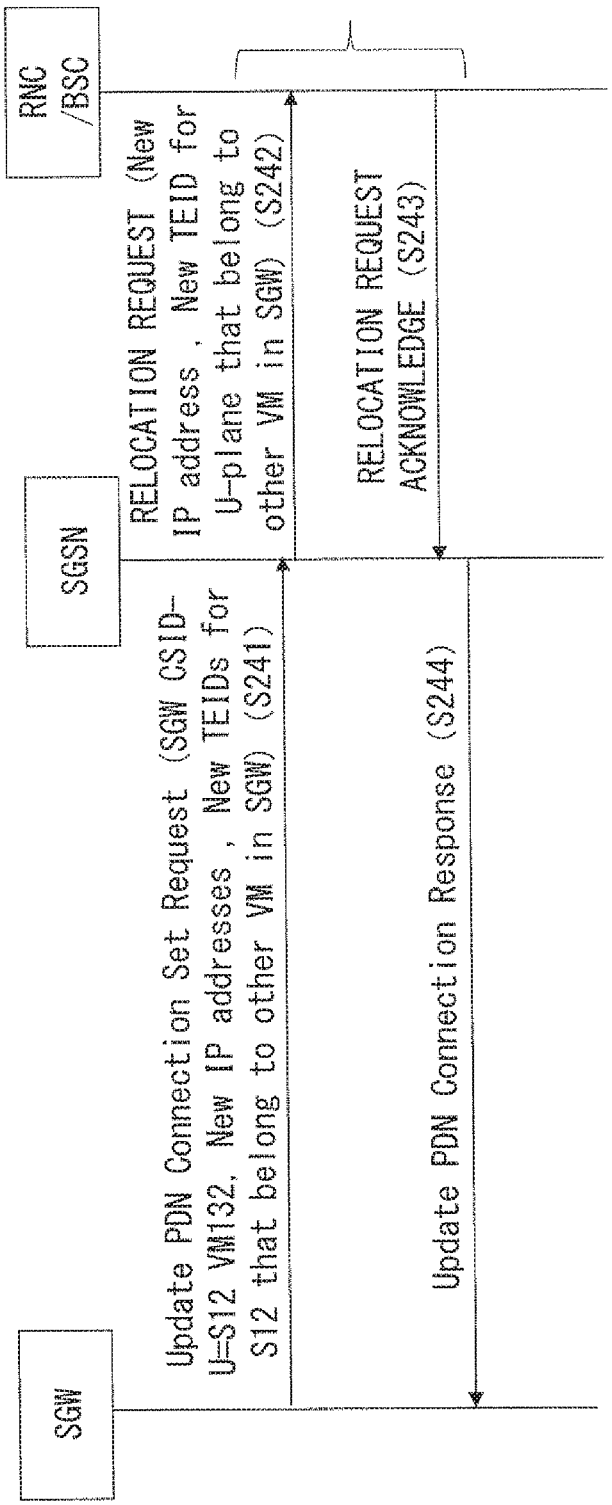
FIG. 47 shows a flow of the process that is performed when the VM of the Virtualized SGW according to the second exemplary embodiment is deleted.

Further, steps S241 to S244 in FIG. 47 are also similar to those in FIG. 41 except that sessions set in S12 VM 132 are updated, and therefore their detailed descriptions are omitted here.

Figure 48:
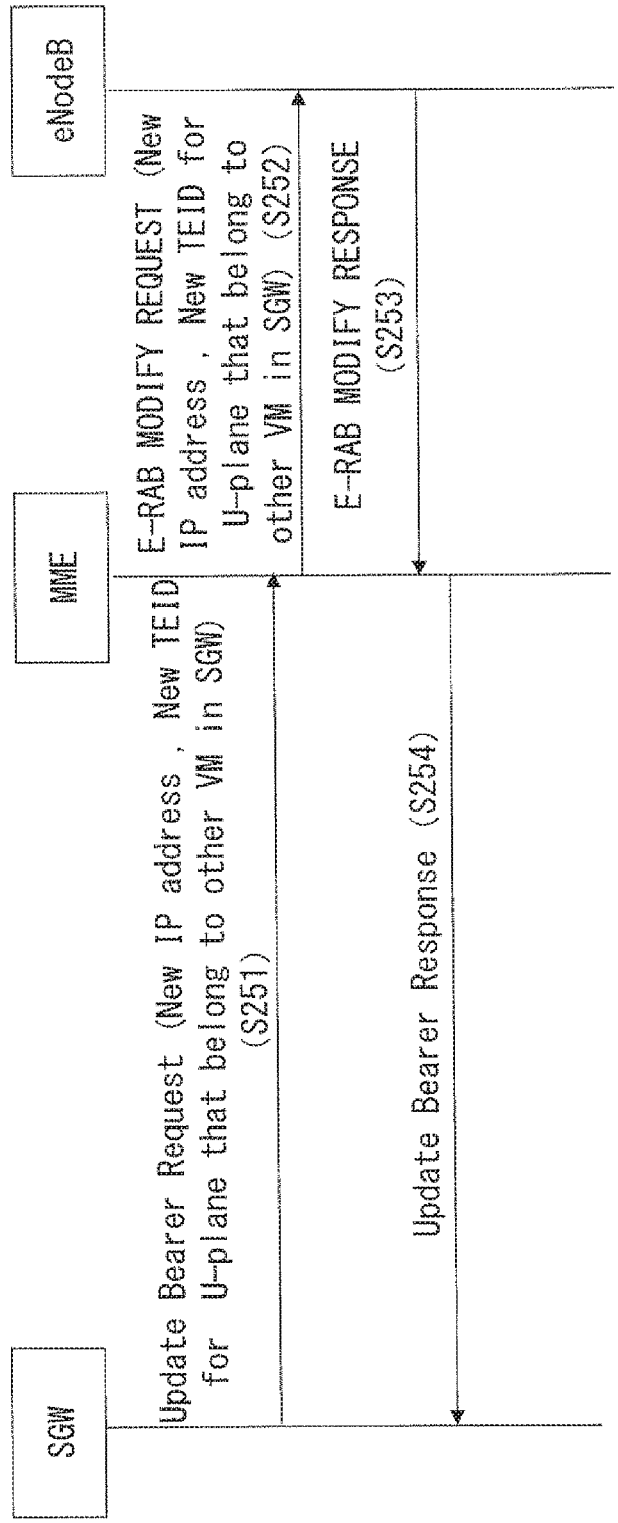
FIG. 48 shows a flow of the process that is performed when the VM of the Virtualized SGW according to the second exemplary embodiment is deleted.

Next, a flow of a session information update process according to the second exemplary embodiment of the present invention is explained with reference to FIG. 48. FIG. 48 shows a process that is performed when the S1-U VM 129 or 130 of the Virtualized SGW 120 is deleted. Note that steps S251 to S254 in FIG. 48 differ from those in FIG. 45 in that the entity with which the Virtualized SGW 120 communicates is the Virtualized MME 100 and the entity with which the Virtualized MME 100 communicates is the Virtualized eNodeB 200. Further, FIG. 48 also differs from FIG. 45 in that the message used in the steps S252 and S253 is an E-RAB MODIFY REQUEST message. The content and the like set in the message and other processes in FIG. 48 are similar to those in FIG. 45, and therefore their detailed descriptions are omitted here.

Figure 49:
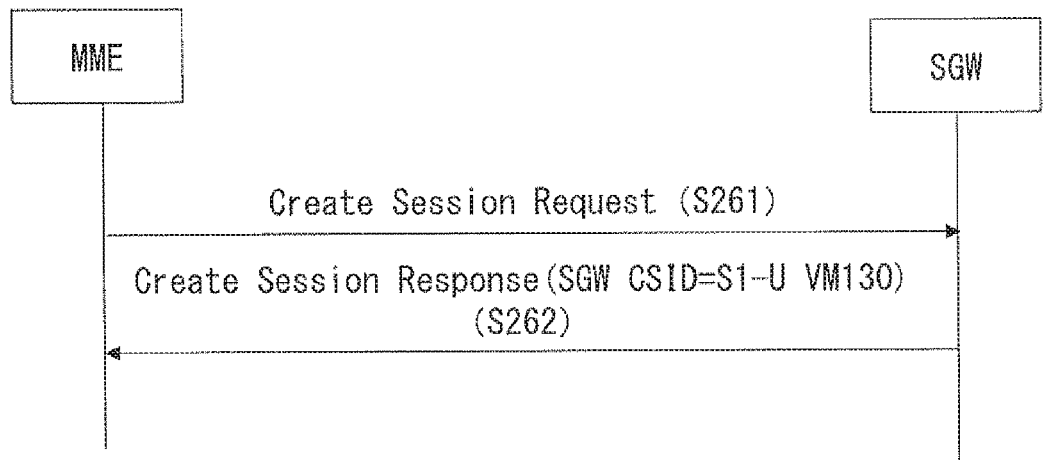
FIG. 49 shows a flow of the process that is performed when the VM of the Virtualized SGW according to the second exemplary embodiment is deleted.

Next, a flow of a session information update process according to the second exemplary embodiment of the present invention is explained with reference to FIG. 49. Similarly to FIG. 48, FIG. 49 shows a process that is performed when the S1-U VM 129 or 130 of the Virtualized SGW 120 is deleted. Further, while FIG. 48 shows a process in which a Modify Bearer Request message is transmitted for each session, FIG. 49 shows an example in which a bulk process is performed. Steps S261 and S262 in FIG. 49 are similar to the steps S201 and S202 in FIG. 43 except that a CSID associated with the S1-U VM 130 is notified (i.e., sent), and therefore their detailed descriptions are omitted here.

Figure 50:
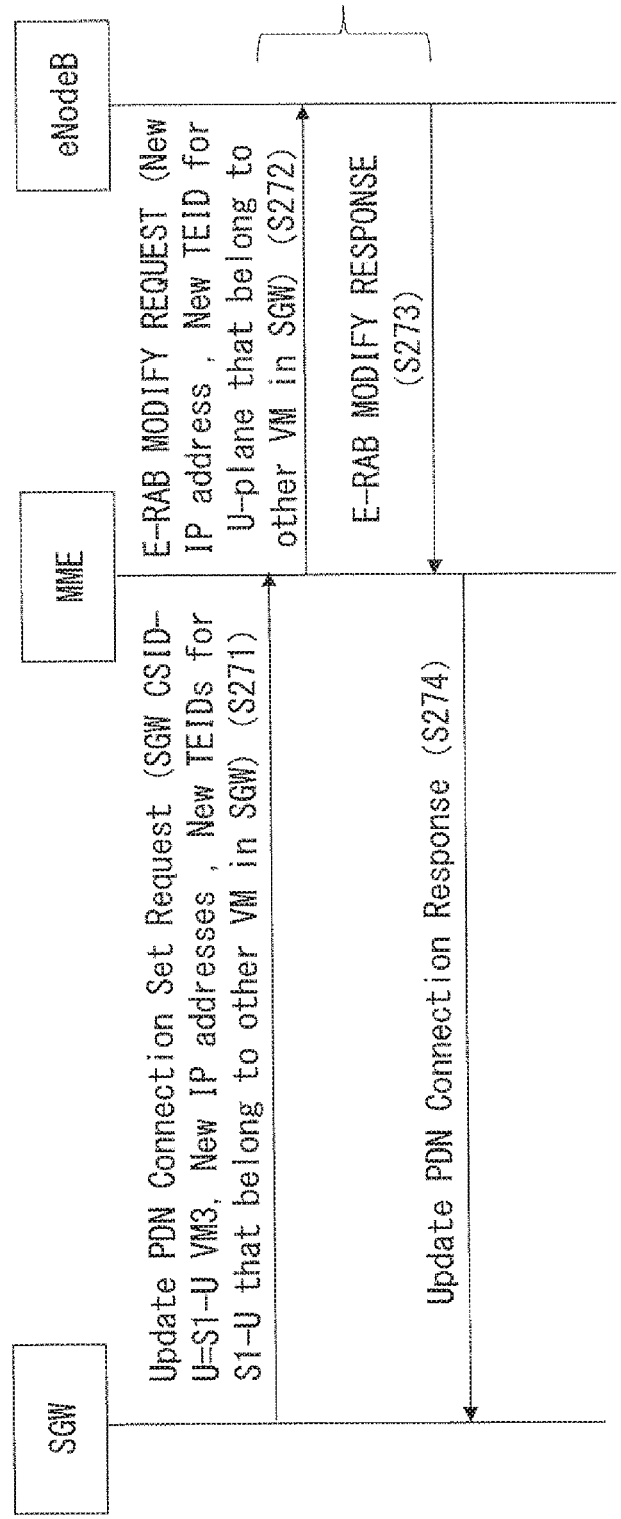
FIG. 50 shows a flow of the process that is performed when the VM of the Virtualized SGW according to the second exemplary embodiment is deleted.

Further, steps S272 to S274 in FIG. 50 are also similar to those in FIG. 48 except that a bulk process is performed in the steps S271 and S274, and therefore their detailed descriptions are omitted here.

Figure 51:
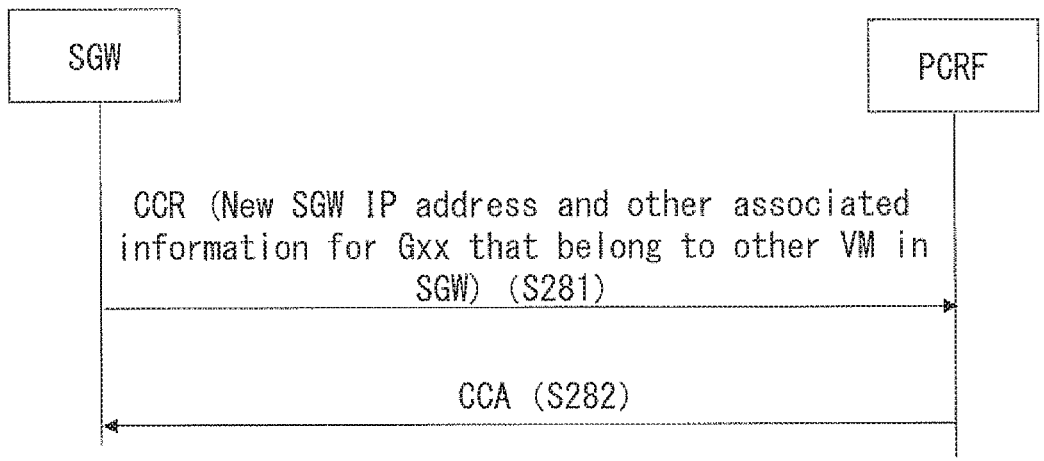
FIG. 51 shows a flow of the process that is performed when the VM of the Virtualized SGW according to the second exemplary embodiment is deleted.

Next, a flow of a session information update process according to the second exemplary embodiment of the present invention is explained with reference to FIG. 51. FIG. 51 shows a process that is performed when the Gxx VMs 121 and 122 of the Virtualized SGW 120 are deleted. Note that in a step S281 in FIG. 51, the V-PCRF 52 is notified of the fact that the Gxx VMs will be deleted by using a CCR message. Further, the V-PCRF 52 transmits a CCA message to the Virtualized SGW 120 as a response (S282).

Figure 52:
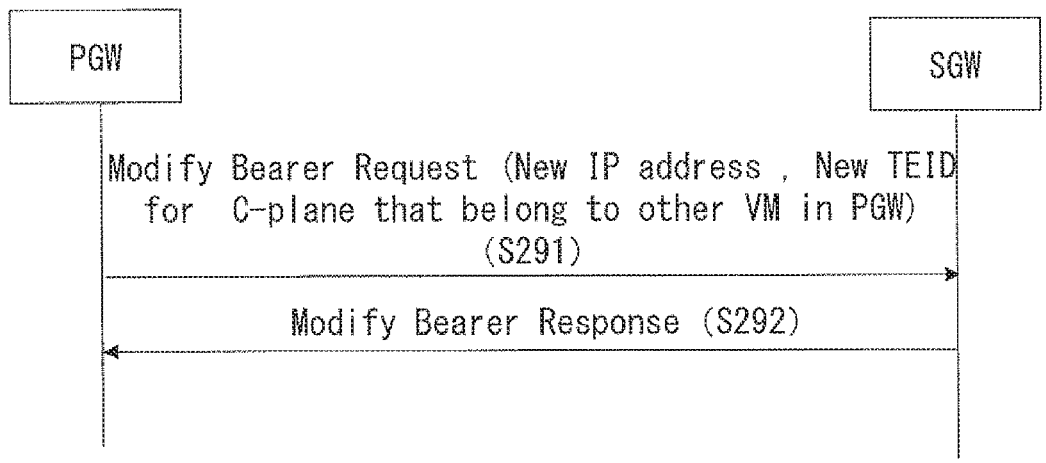
FIG. 52 shows a flow of a process that is performed when a VM of a Virtualized PGW according to the second exemplary embodiment is deleted.

Next, a flow of a session information update process according to the second exemplary embodiment of the present invention is explained with reference to FIG. 52. FIG. 52 shows a process that is performed when the S5/S8-C VM 149 or 150 of the Virtualized PGW 140 is deleted. Note that the processes in FIG. 52 are similar to those explained in FIG. 30 except that the transmission source of each signal is interchanged with the transmission destination thereof, and therefore their detailed descriptions are omitted here.

Figure 53:
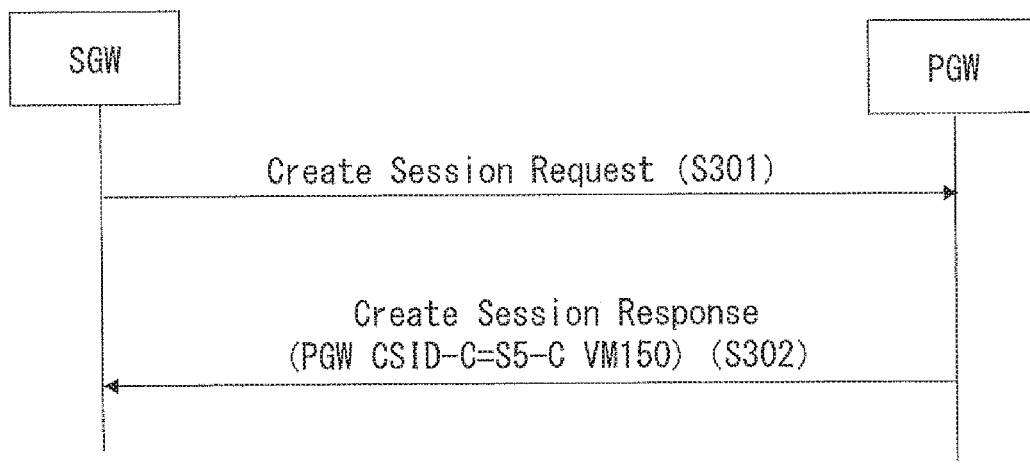
FIG. 53 shows a flow of the process that is performed when the VM of the Virtualized PGW according to the second exemplary embodiment is deleted.

Next, a flow of a session information update process according to the second exemplary embodiment of the present invention is explained with reference to FIG. 53. FIG. 53 shows a process that is performed when the S5/S8-C VM 149 or 150 of the Virtualized PGW 140 is deleted. In FIG. 53, in order to perform a bulk process, the Virtualized PGW 140 transmits a Create Session Response message to the Virtualized SGW 120 as a response to a Create Session Request message transmitted in the step S301 (S302). The Virtualized PGW 140 sets a CSID associated with the S5/S8-C VM 150 in the Create Session Response message.

Figure 54:
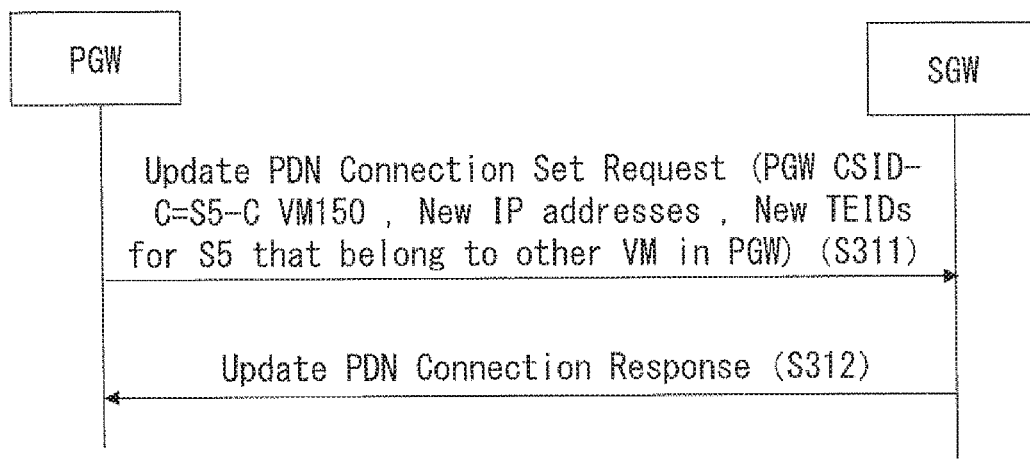
FIG. 54 shows a flow of the process that is performed when the VM of the Virtualized PGW according to the second exemplary embodiment is deleted.

Next, a flow of a session information update process according to the second exemplary embodiment of the present invention is explained with reference to FIG. 54. FIG. 54 shows a process that is performed when the S5/S8-C VM 150 of the Virtualized PGW 140 is deleted. Note that the processes in FIG. 54 are similar to those explained in FIG. 32 except that the transmission source of each signal is interchanged with the transmission destination thereof, and therefore their detailed descriptions are omitted here.

Figure 55:
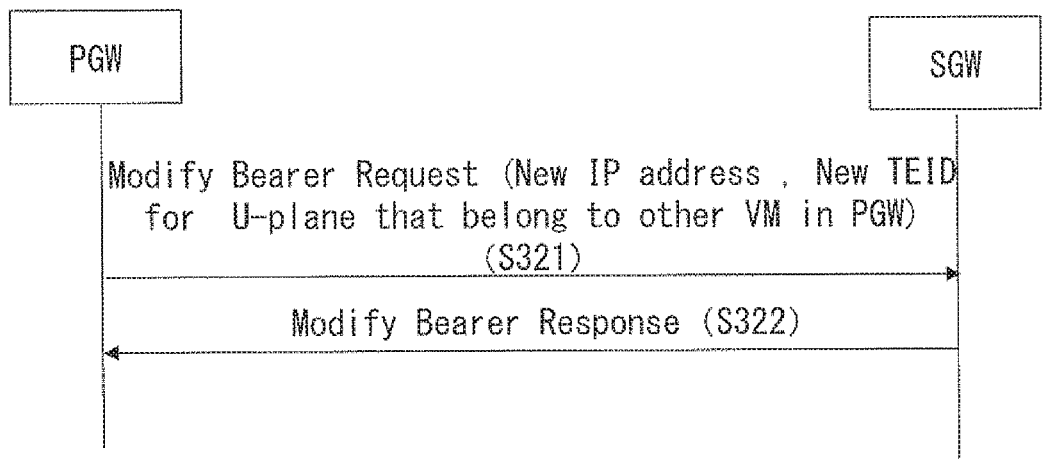
FIG. 55 shows a flow of the process that is performed when the VM of the Virtualized PGW according to the second exemplary embodiment is deleted.

Next, a flow of a session information update process according to the second exemplary embodiment of the present invention is explained with reference to FIG. 55. FIG. 55 shows a process that is performed when the S5/S8-U VM 151 or 152 of the Virtualized PGW 140 is deleted. Note that the processes in FIG. 55 are similar to those explained in FIG. 33 except that the transmission source of each signal is interchanged with the transmission destination thereof, and therefore their detailed descriptions are omitted here.

Figure 56:
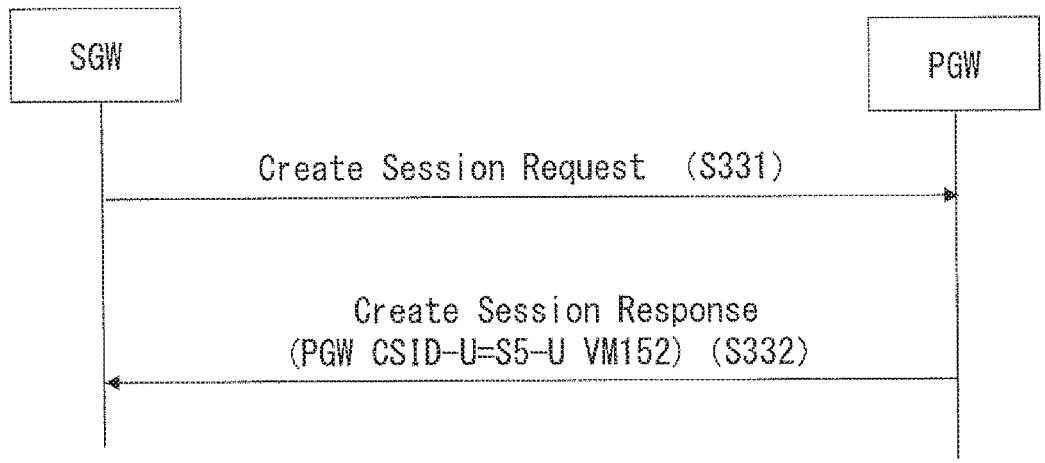
FIG. 56 shows a flow of the process that is performed when the VM of the Virtualized PGW according to the second exemplary embodiment is deleted.
Figure 57:
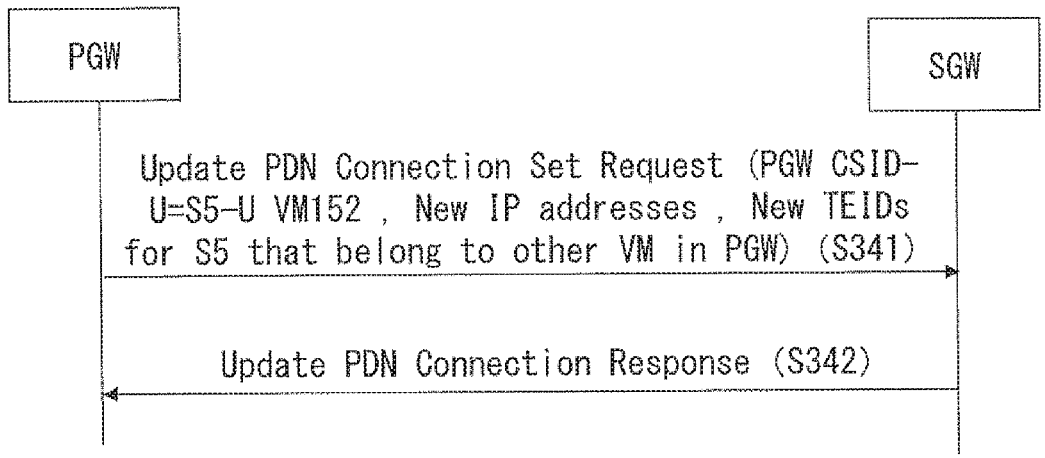
FIG. 57 shows a flow of the process that is performed when the VM of the Virtualized PGW according to the second exemplary embodiment is deleted.

Next, a flow of a session information update process according to the second exemplary embodiment of the present invention is explained with reference to FIGS. 56 and 57. FIGS. 56 and 57 show a process that is performed when the S5/S8-U VM 152 of the Virtualized PGW 140 is deleted. Note that the processes in FIG. 56 are similar to those explained in FIG. 34 except that the transmission source of each signal is interchanged with the transmission destination thereof, and therefore their detailed descriptions are omitted here. Further, the processes in FIG. 57 are similar to those explained in FIG. 35 except that the transmission source of each signal is interchanged with the transmission destination thereof, and therefore their detailed descriptions are omitted here.

Figure 58:
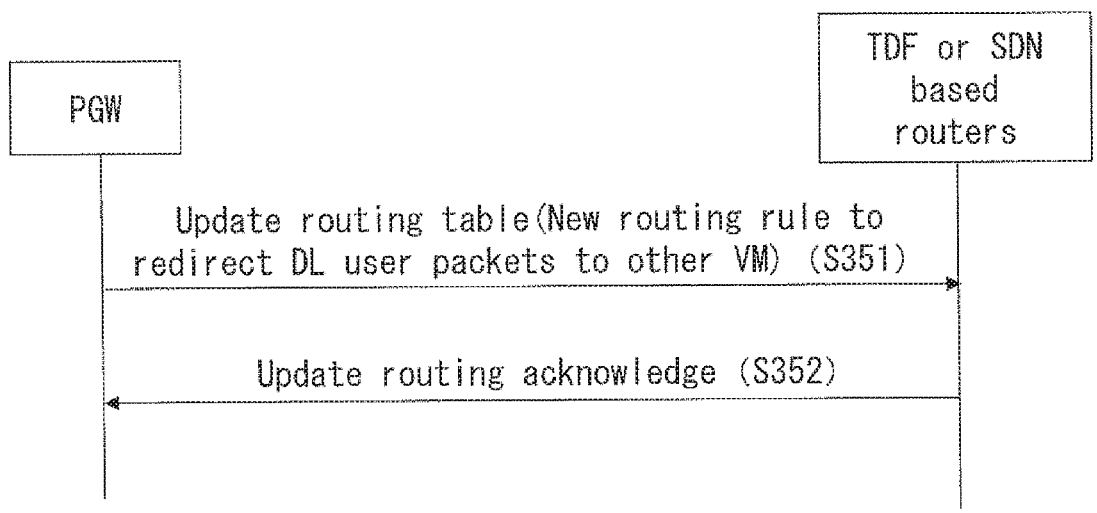
FIG. 58 shows a flow of the process that is performed when the VM of the Virtualized PGW according to the second exemplary embodiment is deleted.

Next, a flow of a session information update process according to the second exemplary embodiment of the present invention is explained with reference to FIG. 58. FIG. 58 shows a process that is performed when the SGi VM 147 or 148 of the Virtualized PGW 140 is deleted. The Virtualized PGW 140 sets the deletion of the SGi VM 1 in an Update routing table message and transmits the Update routing table message to a TDF, a SDN, or the like included in the operator network 18 (S351). Further, the Virtualized PGW 140 receives an Update routing acknowledge message as a response to the Update routing table message (S352).

Figure 59:
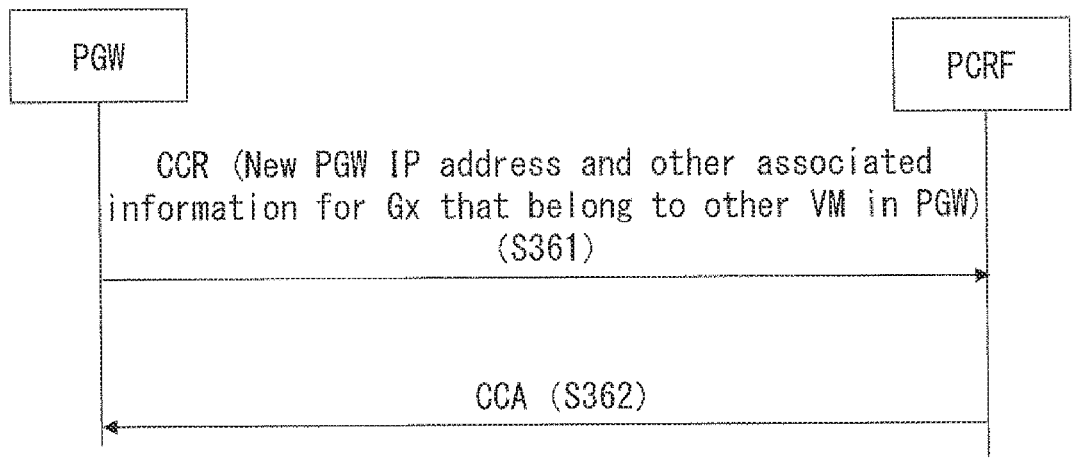
FIG. 59 shows a flow of the process that is performed when the VM of the Virtualized PGW according to the second exemplary embodiment is deleted.

Next, a flow of a session information update process according to the second exemplary embodiment of the present invention is explained with reference to FIG. 59. FIG. 59 shows a process that is performed when one of the Gx VMs 141-143 of the Virtualized PGW 140 is deleted. The processes in FIG. 59 are similar to those in FIG. 51 except that one of the Gx VMs 141-143 is deleted, and therefore their detailed descriptions are omitted here.

Figure 60:
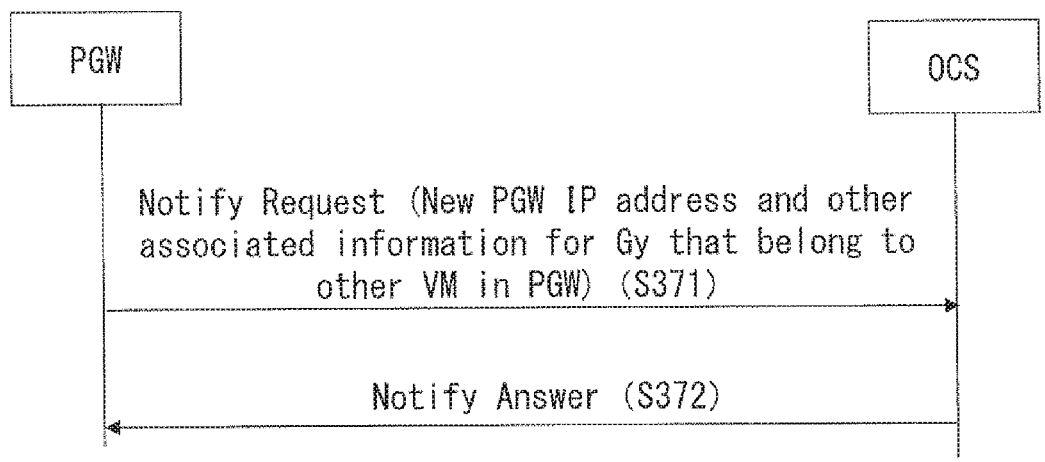
FIG. 60 shows a flow of the process that is performed when the VM of the Virtualized PGW according to the second exemplary embodiment is deleted.
Figure 61:
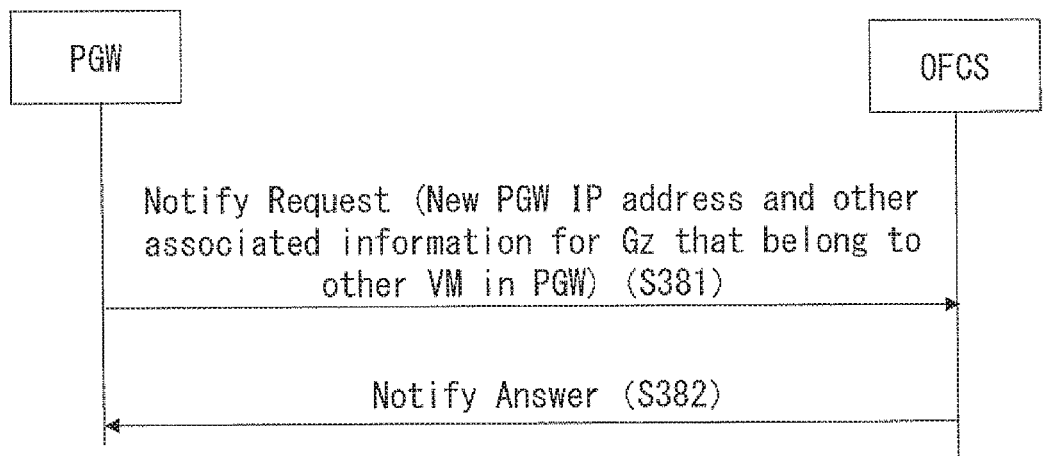
FIG. 61 shows a flow of the process that is performed when the VM of the Virtualized PGW according to the second exemplary embodiment is deleted.

Next, a flow of a session information update process according to the second exemplary embodiment of the present invention is explained with reference to FIG. 60. FIG. 60 shows a process that is performed when one of the Gy/Gz VMs 144-146 of the Virtualized PGW 140 is deleted. The Virtualized PGW 140 transmits a Notify Request message in which a VM to which the sessions of the deleted VM have been transferred is set to the OCS 58 (S371). The Virtualized PGW 140 receives a Notify Answer message as a response to the Notify Request message from the OSC 58 (S372). Further, similarly to FIG. 60, FIG. 61 shows a process that is performed when one of the Gy/Gz VMs 144-146 of the Virtualized PGW 140 is deleted. In FIG. 61, the entity with which the Virtualized PGW 140 communicates is the OFCS 60.

Figure 62:
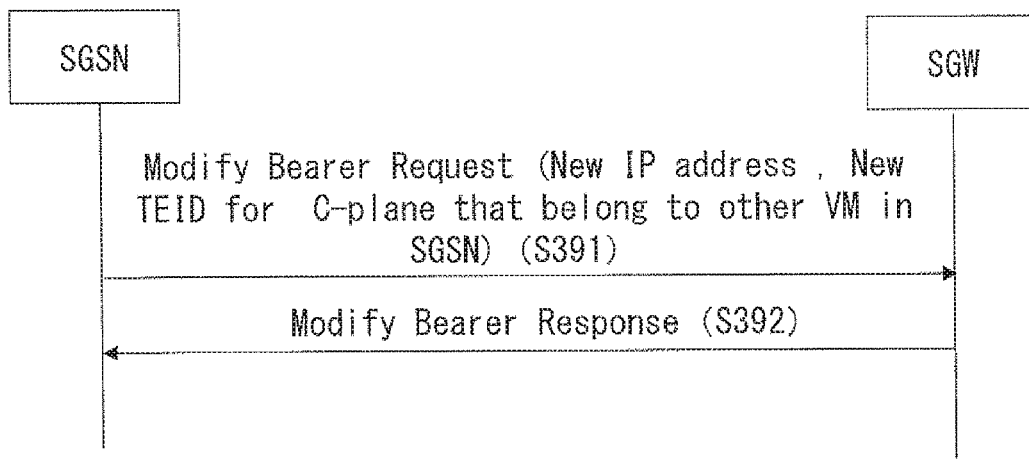
FIG. 62 shows a flow of a process that is performed when a VM of a Virtualized SGSN according to the second exemplary embodiment is deleted.

Next, a flow of a session information update process according to the second exemplary embodiment of the present invention is explained with reference to FIG. 62. FIG. 62 shows a process that is performed when the S4-C VM 161 or 162 of the Virtualized SGSN 160 is deleted. Note that the processes in FIG. 62 are similar to those explained in FIG. 36 except that the transmission source of each signal is interchanged with the transmission destination thereof, and therefore their detailed descriptions are omitted here.

Figure 63:
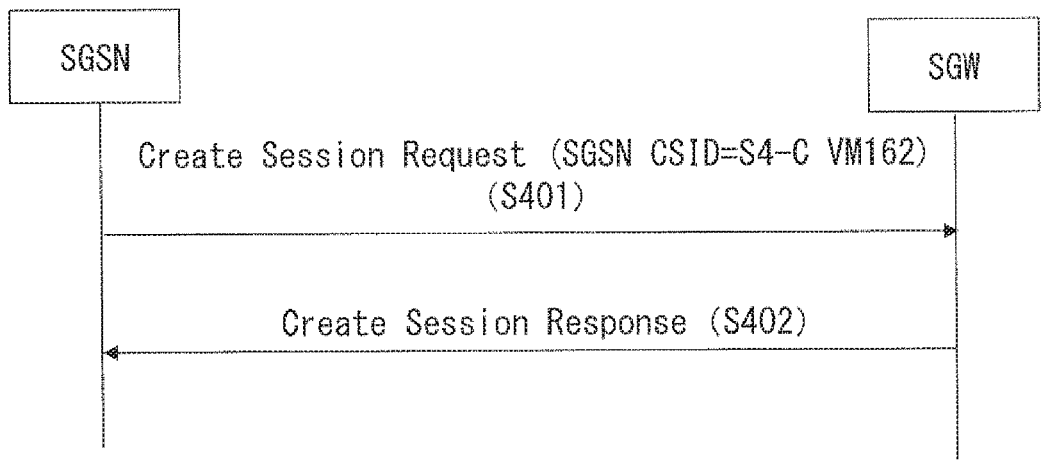
FIG. 63 shows a flow of the process that is performed when the VM of the Virtualized SGSN according to the second exemplary embodiment is deleted.
Figure 64:
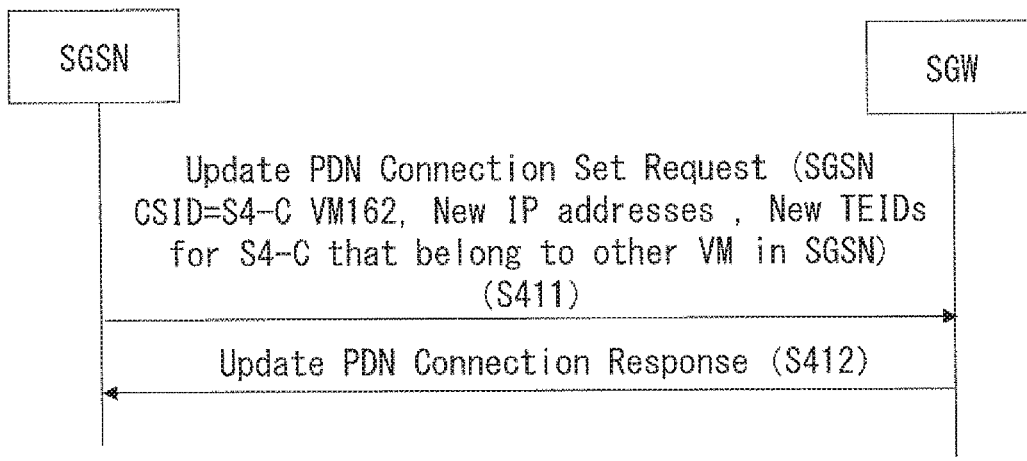
FIG. 64 shows a flow of the process that is performed when the VM of the Virtualized SGSN according to the second exemplary embodiment is deleted.

Next, a flow of a session information update process according to the second exemplary embodiment of the present invention is explained with reference to FIGS. 63 and 64. FIGS. 63 and 64 show a process that is performed when the S4-C VM 162 of the Virtualized SGSN 160 is deleted. Note that the processes in FIG. 63 are similar to those explained in FIG. 37 except that the transmission source of each signal is interchanged with the transmission destination thereof, and therefore their detailed descriptions are omitted here. Further, the processes in FIG. 64 are similar to those explained in FIG. 38 except that the transmission source of each signal is interchanged with the transmission destination thereof, and therefore their detailed descriptions are omitted here.

Figure 65:
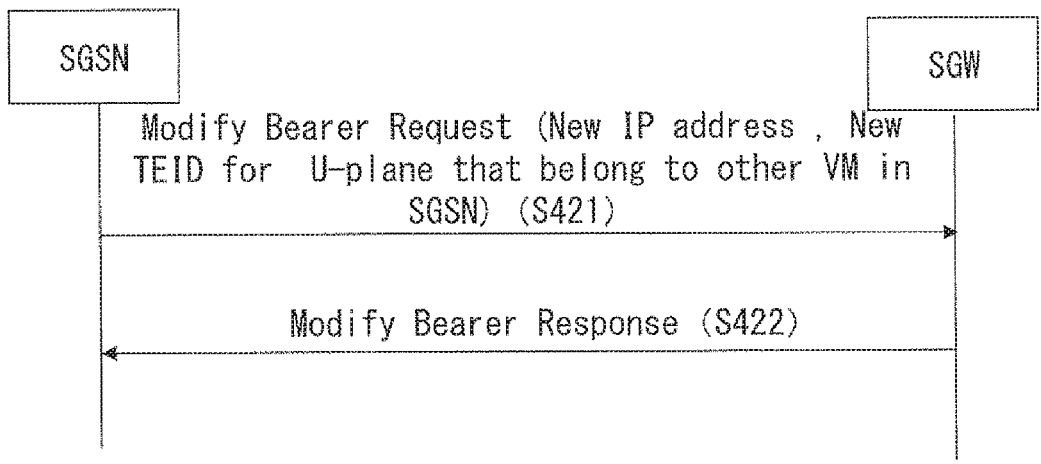
FIG. 65 shows a flow of the process that is performed when the VM of the Virtualized SGSN according to the second exemplary embodiment is deleted.

Next, a flow of a session information update process according to the second exemplary embodiment of the present invention is explained with reference to FIG. 65. FIG. 65 shows a process that is performed when the S4-U VM 169 or 170 of the Virtualized SGSN 160 is deleted. Note that the processes in FIG. 62 are similar to those explained in FIG. 39 except that the transmission source of each signal is interchanged with the transmission destination thereof in the steps S161 and S164, i.e., in the communication between the Virtualized SGSN 160 and the Virtualized PGW 140 explained above with reference to FIG. 39, and therefore their detailed descriptions are omitted here.

Figure 66:
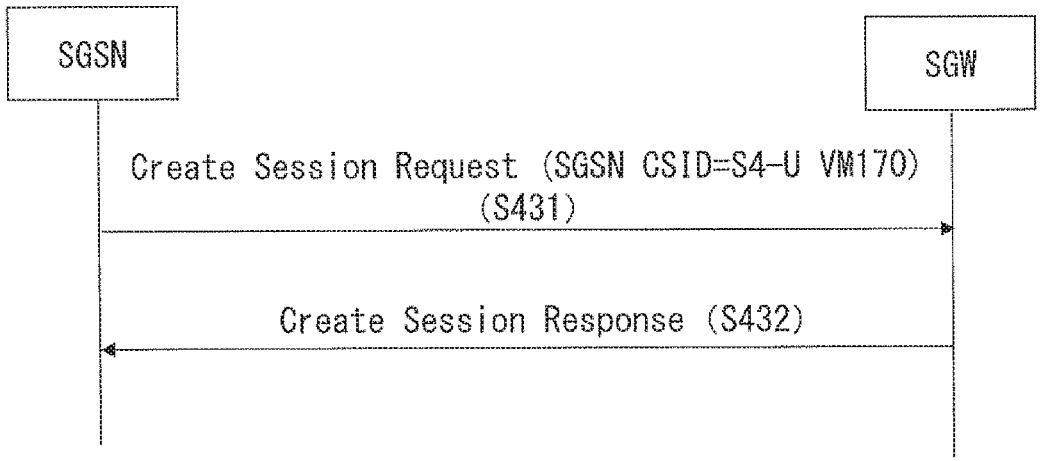
FIG. 66 shows a flow of the process that is performed when the VM of the Virtualized SGSN according to the second exemplary embodiment is deleted.
Figure 67:
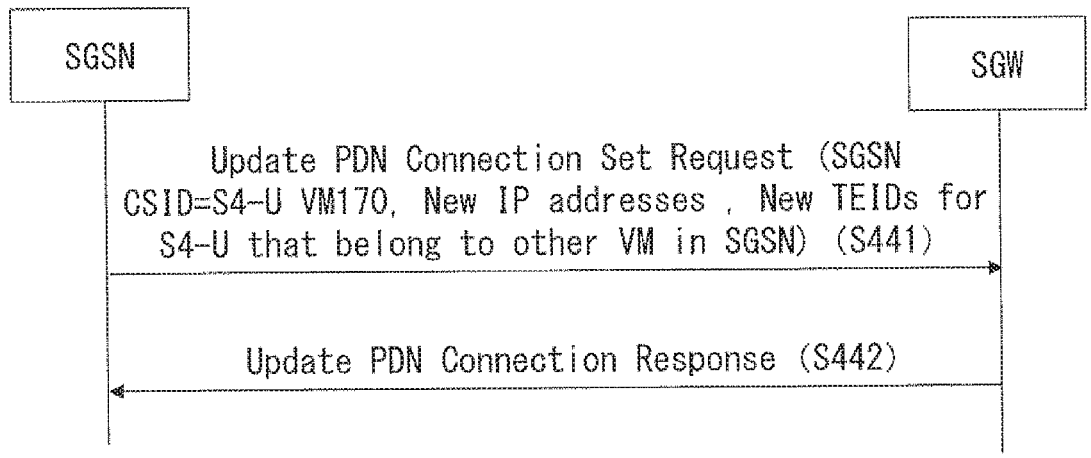
FIG. 67 shows a flow of the process that is performed when the VM of the Virtualized SGSN according to the second exemplary embodiment is deleted.

Next, a flow of a session information update process according to the second exemplary embodiment of the present invention is explained with reference to FIGS. 66 and 67. FIGS. 66 and 67 show a process that is performed when the S4-U VM 170 of the Virtualized SGSN 160 is deleted. Note that the processes in FIG. 66 are similar to those explained in FIG. 40 except that the transmission source of each signal is interchanged with the transmission destination thereof, and therefore their detailed descriptions are omitted here. Further, the processes in FIG. 67 are similar to those explained in FIG. 41 except that the transmission source of each signal is interchanged with the transmission destination thereof in the steps S181 and S184, i.e., in the communication between the Virtualized SGSN 160 and the Virtualized PGW 140 explained above with reference to FIG. 41, and therefore their detailed descriptions are omitted here.

Figure 68:
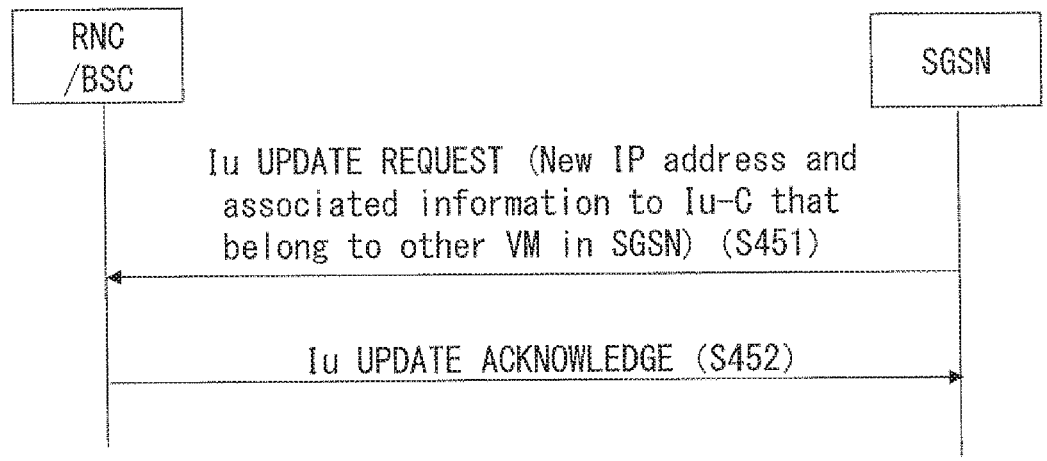
FIG. 68 shows a flow of the process that is performed when the VM of the Virtualized SGSN according to the second exemplary embodiment is deleted.

Next, a flow of a session information update process according to the second exemplary embodiment of the present invention is explained with reference to FIG. 68. FIG. 68 shows a process that is performed when the Iu-C VM 173 or 174 of the Virtualized SGSN 160 is deleted.

The Virtualized SGSN 160 transmits an Iu UPDATE Request message to the Virtualized RNC 210 (S451). The Virtualized SGSN 160 sets information about a VM at the transfer destination of the sessions after the deletion of the Iu-C VM 173 or 174 in an Iu UPDATEREQUEST message. Next, the Virtualized SGSN 160 receives an Iu UPDATE ACKNOWLEDGE message as a response to the Iu UPDATEREQUEST message (S452).

Figure 69:
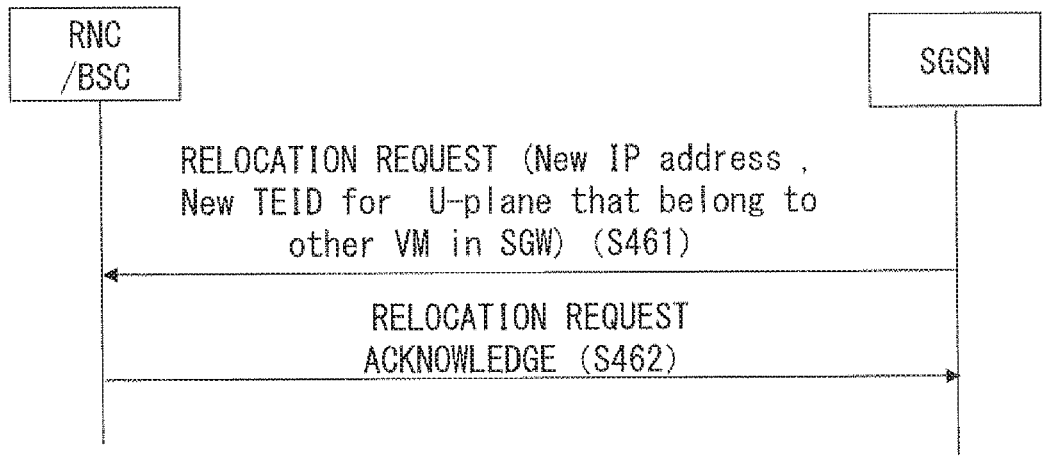
FIG. 69 shows a flow of the process that is performed when the VM of the Virtualized SGSN according to the second exemplary embodiment is deleted.

Next, a flow of a session information update process according to the second exemplary embodiment of the present invention is explained with reference to FIG. 69. FIG. 69 shows a process that is performed when the Iu-U VM 175 or 176 of the Virtualized SGSN 160 is deleted.

The Virtualized SGSN 160 transmits a RELOCATION Request message to the Virtualized RNC 210 (S461). The Virtualized SGSN 160 sets information about a VM at the transfer destination of the sessions after the deletion of the Iu-U VM 175 or 176 in a RELOCATION Request message. Next, the Virtualized SGSN 160 receives a RELOCATION REQUEST ACKNOWLEDGE message as a response to the RELOCATION Request message (S462).

Figure 70:
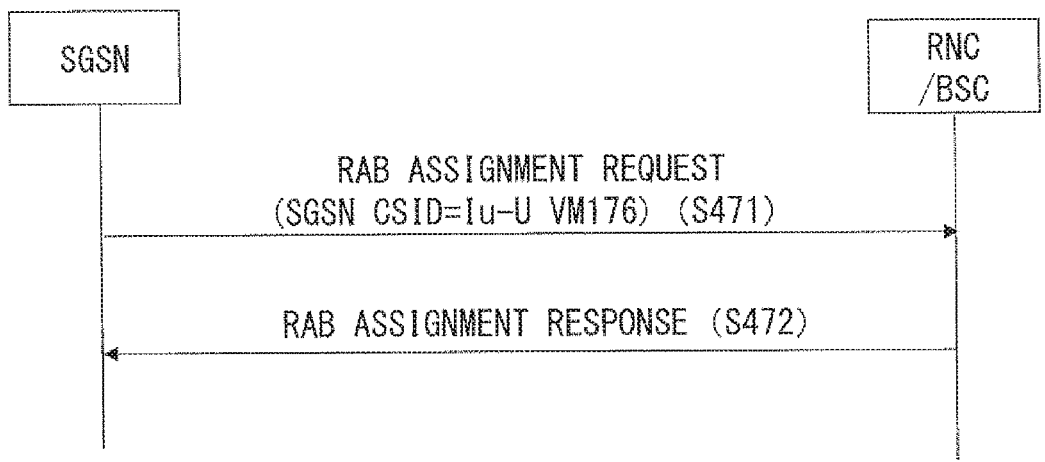
FIG. 70 shows a flow of the process that is performed when the VM of the Virtualized SGSN according to the second exemplary embodiment is deleted.
Figure 71:
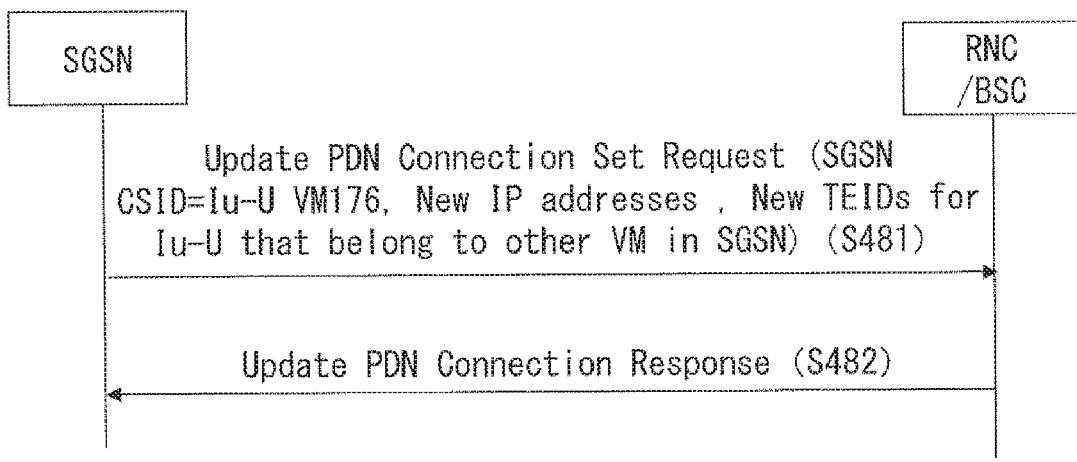
FIG. 71 shows a flow of the process that is performed when the VM of the Virtualized SGSN according to the second exemplary embodiment is deleted.

Next, a flow of a session information update process according to the second exemplary embodiment of the present invention is explained with reference to FIGS. 70 and 71. FIGS. 70 and 71 show a process that is performed when the Iu-U VM 176 of the Virtualized SGSN 160 is deleted.

In FIG. 70, the Virtualized SGSN 160 transmits a RAB ASSIGNMENT Request message to the Virtualized RNC 210 (S471). The Virtualized SGSN 160 sets a CSID associated with the Iu-U VM 176 in the RAB ASSIGNMENT Request message. The Virtualized SGSN 160 receives a RAB ASSIGNMENT RESPONSE message as a response to the RAB ASSIGNMENT Request message (S472).

FIG. 71 shows that the Virtualized SGSN 160 and the Virtualized RNC 210 perform a bulk process related to the deletion of the Iu-U VM 176 by using an Update PDN Connection Set Request message and the Update PDN Connection Response message.

Figure 72:
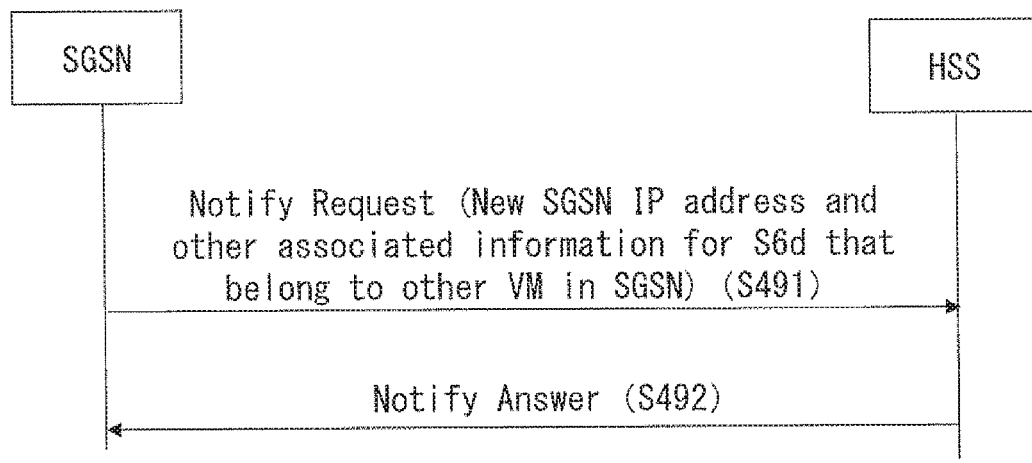
FIG. 72 shows a flow of the process that is performed when the VM of the Virtualized SGSN according to the second exemplary embodiment is deleted.
Figure 73:
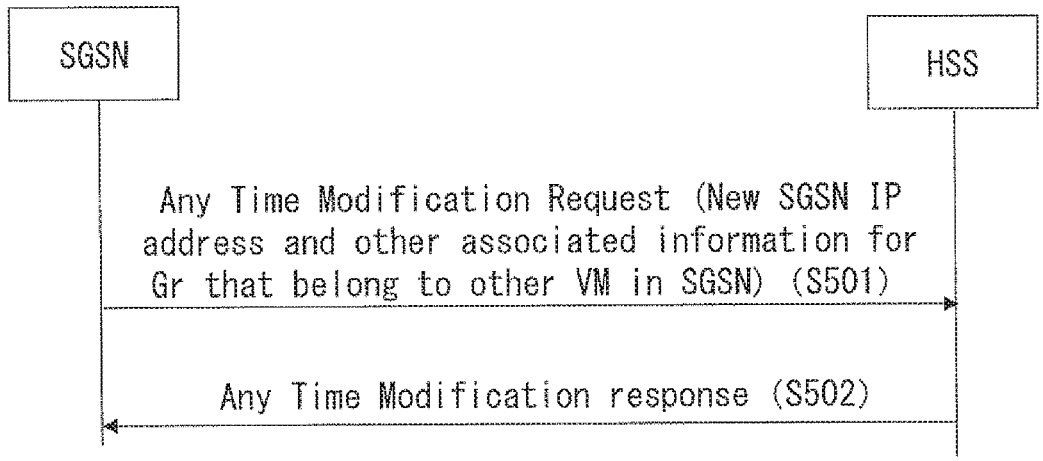
FIG. 73 shows a flow of the process that is performed when the VM of the Virtualized SGSN according to the second exemplary embodiment is deleted.

Next, a flow of a session information update process according to the second exemplary embodiment of the present invention is explained with reference to FIG. 72. FIG. 72 shows a process that is performed when the Gr/S6d VM 167 or 168 of the Virtualized SGSN 160 is deleted. Note that the processes in FIG. 72 are similar to those explained in FIG. 28 except that the Virtualized MME 100 in FIG. 28 is replaced by the Virtualized SGSN 160. Further, in FIG. 73, an Any Time Modification Request message and an Any Time Modification Response message are used instead of the Notify Request message and the Notify Answer message used in FIG. 72.

Figure 74:
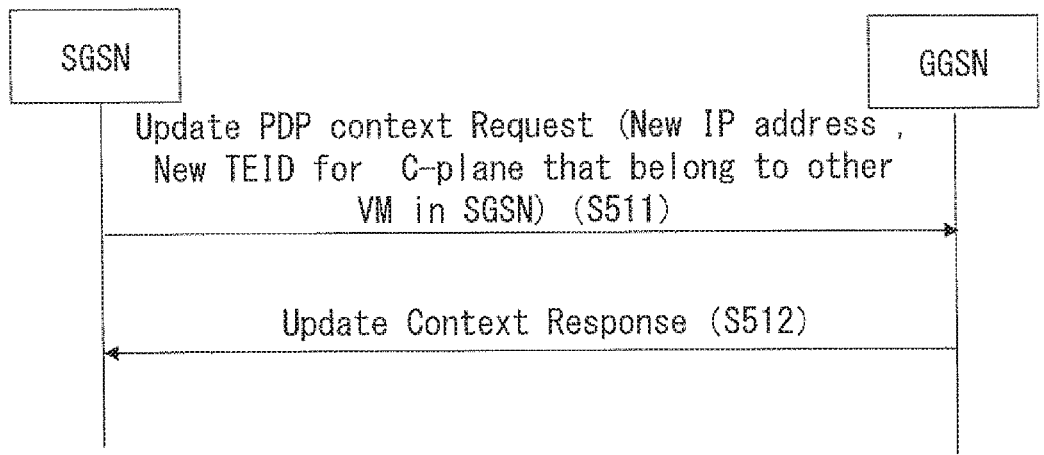
FIG. 74 shows a flow of the process that is performed when the VM of the Virtualized SGSN according to the second exemplary embodiment is deleted.

Next, a flow of a session information update process according to the second exemplary embodiment of the present invention is explained with reference to FIG. 74. FIG. 74 shows a process that is performed when the Gn-C VM 163 or 164 of the Virtualized SGSN 160 is deleted.

The Virtualized SGSN 160 transmits an Update PDP context Request message to the Virtualized GGSN 180 (S511). The Virtualized SGSN 160 sets information about a VM at the transfer destination of the sessions after the deletion of the Gn-C VM 163 or 164 in an Update PDP context Request message. Next, the Virtualized SGSN 160 receives an Update PDP context Response message as a response to the Update PDP context Request message (S512).

Figure 75:
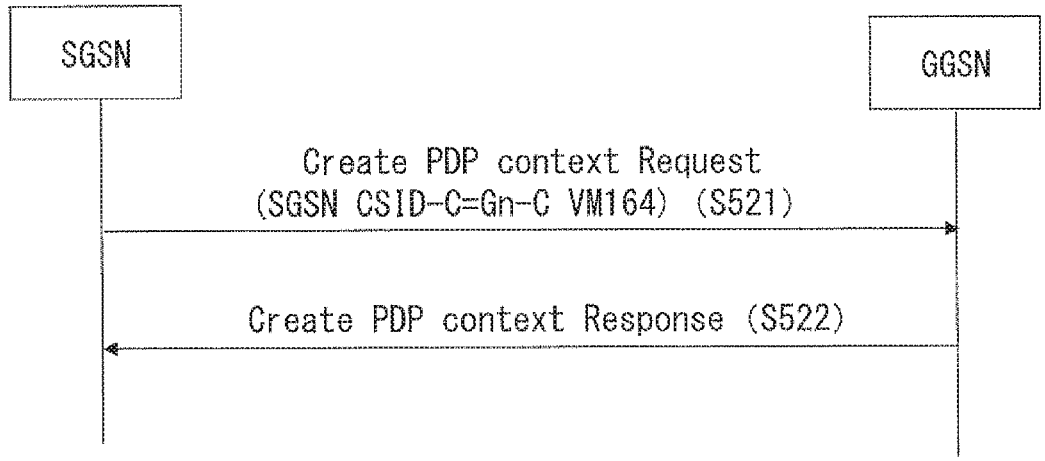
FIG. 75 shows a flow of the process that is performed when the VM of the Virtualized SGSN according to the second exemplary embodiment is deleted.
Figure 76:
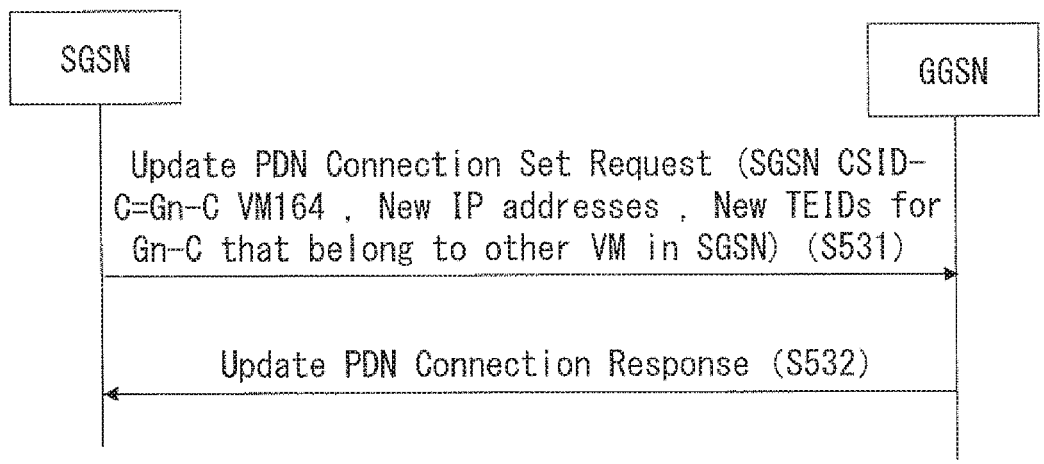
FIG. 76 shows a flow of the process that is performed when the VM of the Virtualized SGSN according to the second exemplary embodiment is deleted.

Next, a flow of a session information update process according to the second exemplary embodiment of the present invention is explained with reference to FIGS. 75 and 76. FIGS. 75 and 76 show a process that is performed when the Gn-C VM 164 of the Virtualized SGSN 160 is deleted.

In FIG. 75, the Virtualized SGSN 160 transmits a Create PDP context Request message to the Virtualized GGSN 180 (S521). The Virtualized SGSN 160 sets a CSID associated with the Gn-C VM 164 in the Create PDP context Request message. The Virtualized SGSN 160 receives a Create PDP context Response message as a response to the Create PDP context Request message (S522).

FIG. 76 shows that the Virtualized SGSN 160 and the Virtualized GGSN 180 perform a bulk process related to the deletion of the Gn-C VM 164 by using an Update PDN Connection Set Request message and the Update PDN Connection Response message.

Figure 77:
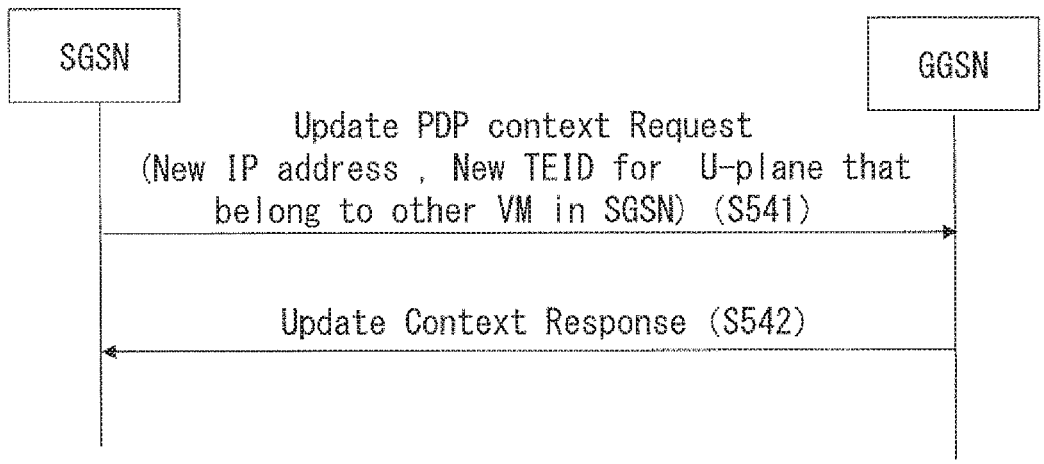
FIG. 77 shows a flow of the process that is performed when the VM of the Virtualized SGSN according to the second exemplary embodiment is deleted.

Next, a flow of a session information update process according to the second exemplary embodiment of the present invention is explained with reference to FIG. 77. FIG. 77 shows a process that is performed when the Gn-U VM 165 or 166 of the Virtualized SGSN 160 is deleted. Note that the operation in FIG. 77 is similar to that in FIG. 74 except that the Gn-U VM, instead of the Gn-C VM, is updated in the process, and therefore their detailed descriptions are omitted here.

Figure 78:
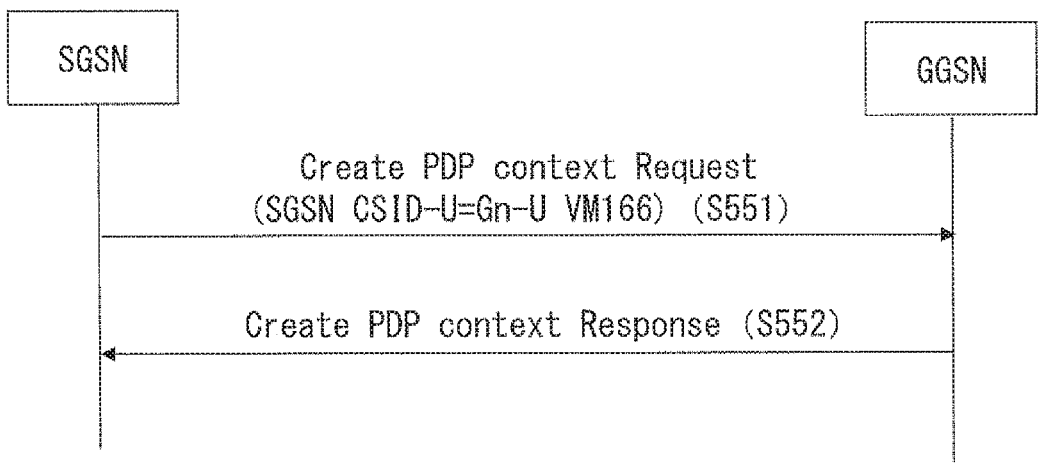
FIG. 78 shows a flow of the process that is performed when the VM of the Virtualized SGSN according to the second exemplary embodiment is deleted.
Figure 79:
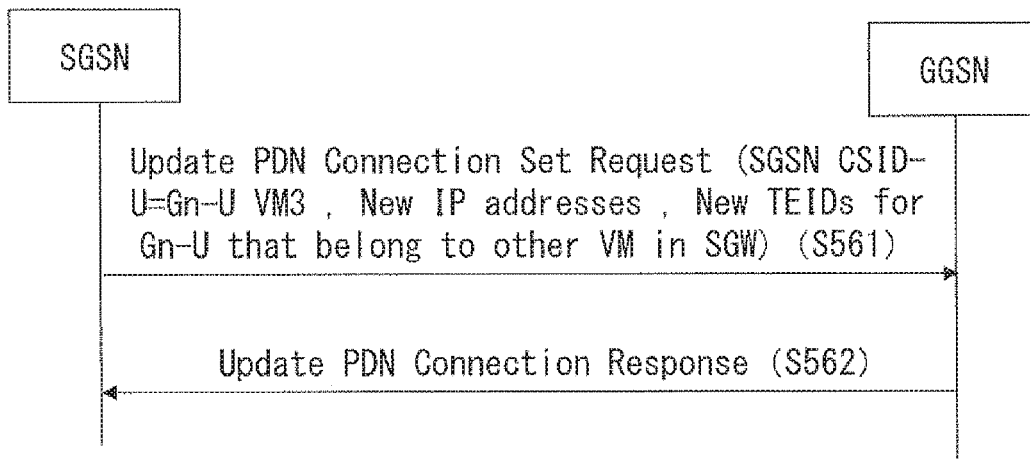
FIG. 79 shows a flow of the process that is performed when the VM of the Virtualized SGSN according to the second exemplary embodiment is deleted.

Next, a flow of a session information update process according to the second exemplary embodiment of the present invention is explained with reference to FIGS. 78 and 79. FIGS. 78 and 79 show a process that is performed when the Gn-U VM 166 of the Virtualized SGSN 160 is deleted. Note that the processes in FIGS. 78 and 79 are similar to those in FIGS. 75 and 76 except that the Gn-U VM is updated, and therefore their detailed descriptions are omitted here.

Figure 80:
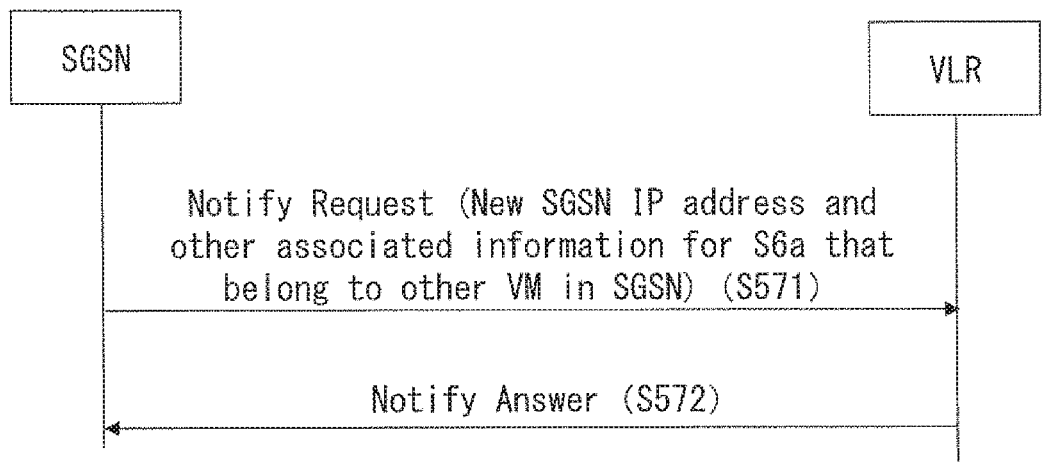
FIG. 80 shows a flow of the process that is performed when the VM of the Virtualized SGSN according to the second exemplary embodiment is deleted.

Next, a flow of a session information update process according to the second exemplary embodiment of the present invention is explained with reference to FIG. 80. FIG. 80 shows a process that is performed when the Gs VM 171 or 172 of the Virtualized SGSN 160 is deleted. Note that the processes in FIG. 80 are similar to those explained in FIG. 29 except that the Gs VM is updated, and therefore their detailed descriptions are omitted here.

Figure 81:
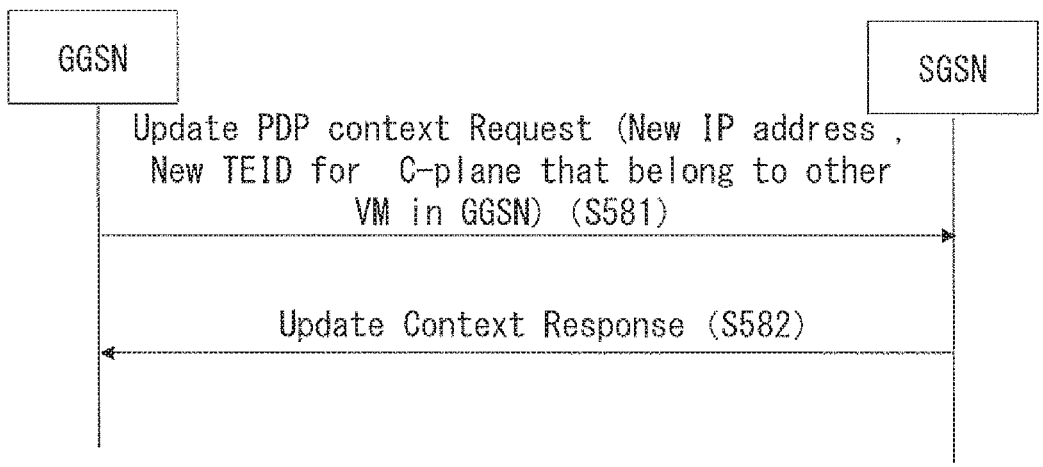
FIG. 81 shows a flow of a process that is performed when a VM of a Virtualized GGSN according to the second exemplary embodiment is deleted.

Next, a flow of a session information update process according to the second exemplary embodiment of the present invention is explained with reference to FIG. 81. FIG. 81 shows a process that is performed when the Gn-C VM 189 or 190 of the Virtualized GGSN 180 is deleted. Note that the processes in FIG. 81 are similar to those explained in FIG. 74 except that the transmission source of each signal is interchanged with the transmission destination thereof, and therefore their detailed descriptions are omitted here.

Figure 82:
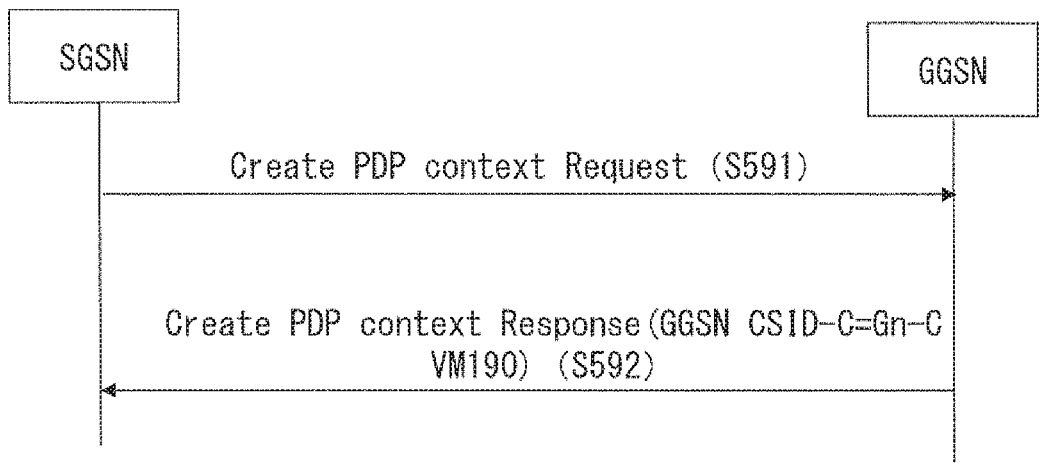
FIG. 82 shows a flow of the process that is performed when the VM of the Virtualized GGSN according to the second exemplary embodiment is deleted.
Figure 83:
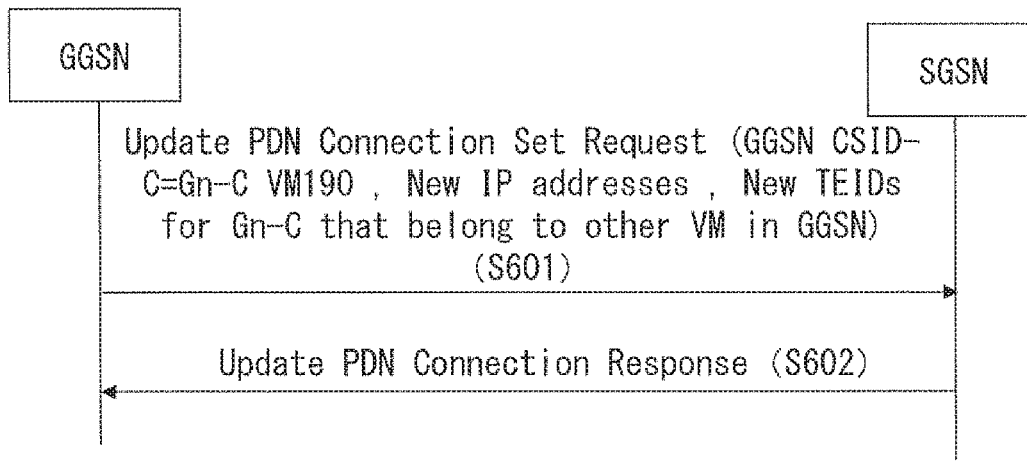
FIG. 83 shows a flow of the process that is performed when the VM of the Virtualized GGSN according to the second exemplary embodiment is deleted.

Next, a flow of a session information update process according to the second exemplary embodiment of the present invention is explained with reference to FIGS. 82 and 83. FIGS. 82 and 83 show a process that is performed when the Gn-C VM 190 of the Virtualized GGSN 180 is deleted.

In FIG. 82, the Virtualized SGSN 160 transmits a Create PDP context Request message to the Virtualized GGSN 180 (S591). Next, the Virtualized GGSN 180 transmits a Create PDP context Response message to the Virtualized SGSN 160 as a response to the Create PDP context Request message (S592). The Virtualized GGSN 180 sets a CSID associated with the Gn-C VM 190 in the Create PDP context Response message.

FIG. 83 shows that the Virtualized SGSN 160 and the Virtualized GGSN 180 perform a bulk process related to the deletion of the Gn-C VM 190 by using an Update PDN Connection Set Request message and the Update PDN Connection Response message.

Figure 84:
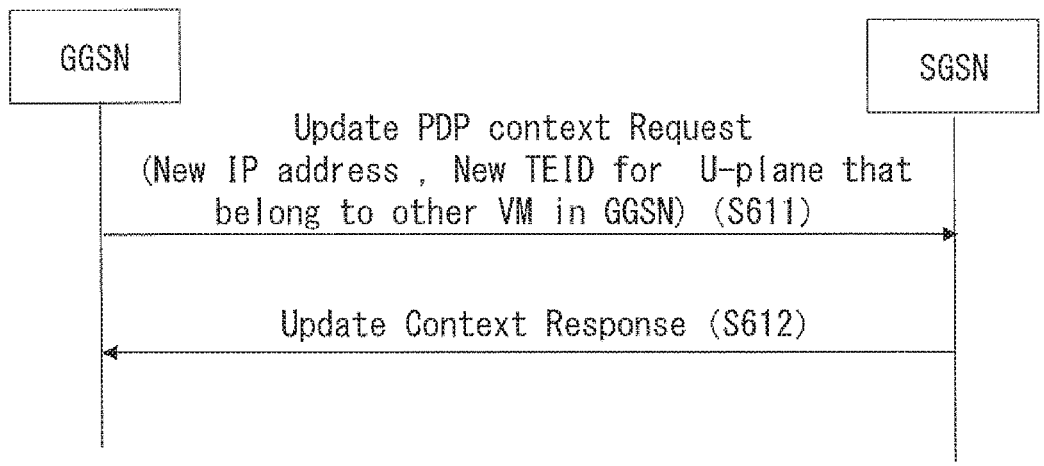
FIG. 84 shows a flow of the process that is performed when the VM of the Virtualized GGSN according to the second exemplary embodiment is deleted.

Next, a flow of a session information update process according to the second exemplary embodiment of the present invention is explained with reference to FIG. 84. FIG. 84 shows a process that is performed when the Gn-U VM 191 or 192 of the Virtualized GGSN 180 is deleted.

Note that the processes in FIG. 84 are similar to those explained in FIG. 77 except that the transmission source of each signal is interchanged with the transmission destination thereof, and therefore their detailed descriptions are omitted here.

Figure 85:
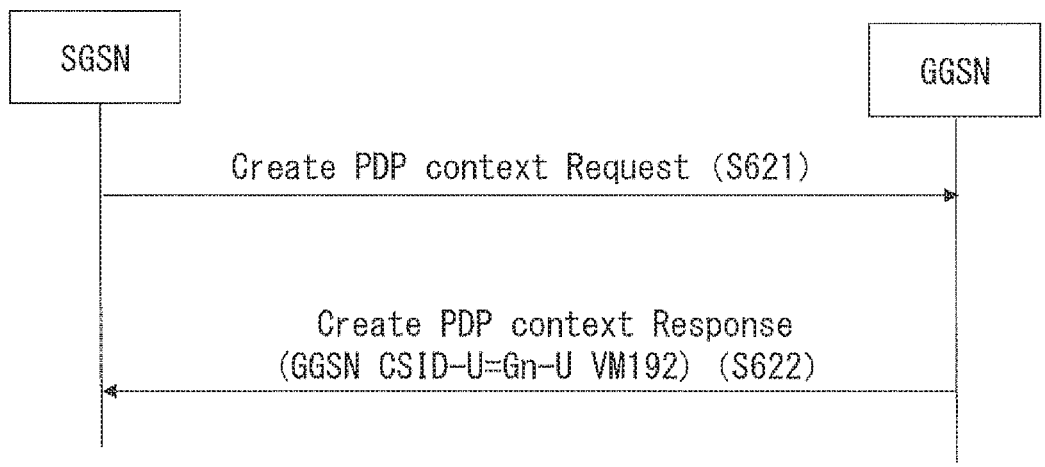
FIG. 85 shows a flow of the process that is performed when the VM of the Virtualized GGSN according to the second exemplary embodiment is deleted.
Figure 86:
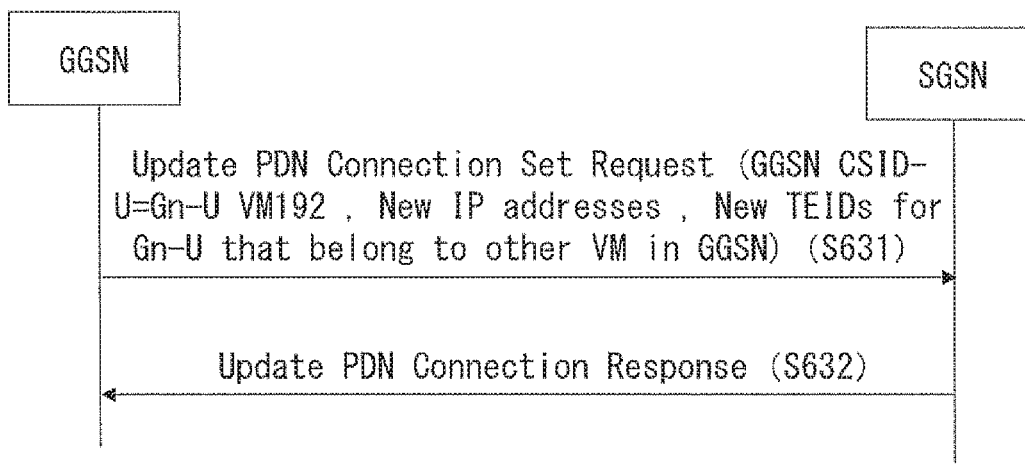
FIG. 86 shows a flow of the process that is performed when the VM of the Virtualized GGSN according to the second exemplary embodiment is deleted.

Next, a flow of a session information update process according to the second exemplary embodiment of the present invention is explained with reference to FIGS. 85 and 86. FIGS. 85 and 86 show a process that is performed when the Gn-U VM 192 of the Virtualized GGSN 180 is deleted.

Processes in FIG. 85 are similar to those explained in FIG. 82 except that the Virtualized GGSN 180 transmits the CSID related to the Gn-U VM 192 to the Virtualized SGSN 160, and therefore their detailed descriptions are omitted here.

FIG. 86 shows that the Virtualized SGSN 160 and the Virtualized GGSN 180 perform a bulk process related to the deletion of the Gn-U VM 192 by using an Update PDN Connection Set Request message and the Update PDN Connection Response message.

Figure 87:
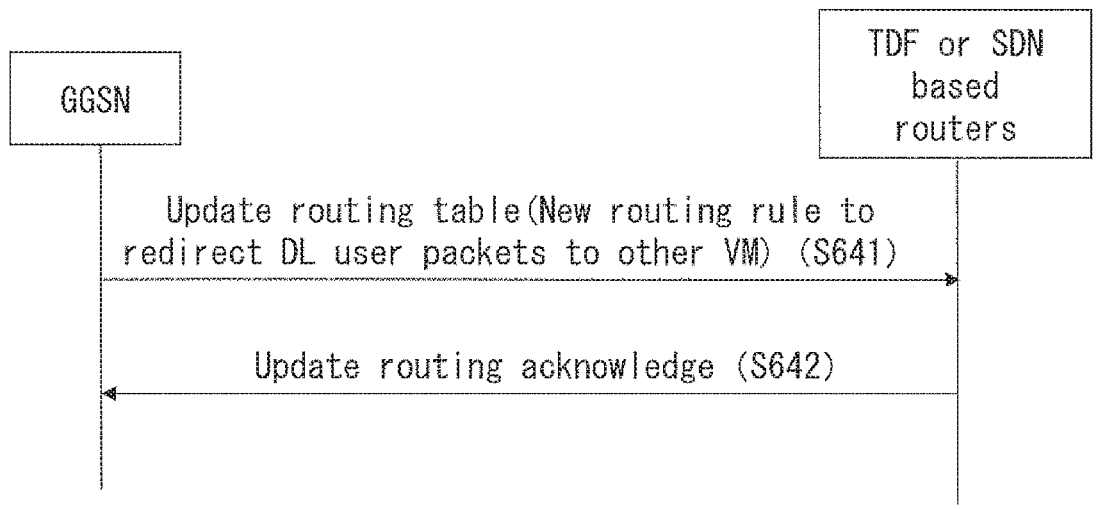
FIG. 87 shows a flow of the process that is performed when the VM of the Virtualized GGSN according to the second exemplary embodiment is deleted.

Next, a flow of a session information update process according to the second exemplary embodiment of the present invention is explained with reference to FIG. 87. FIG. 87 shows a process that is performed when the Gi VM 187 or 188 of the Virtualized GGSN 180 is deleted. Note that the processes in FIG. 87 are similar to those explained in FIG. 58 except that the Virtualized GGSN 180 is used in place of the Virtualized PGW 140, and therefore their detailed descriptions are omitted here.

Figure 88:
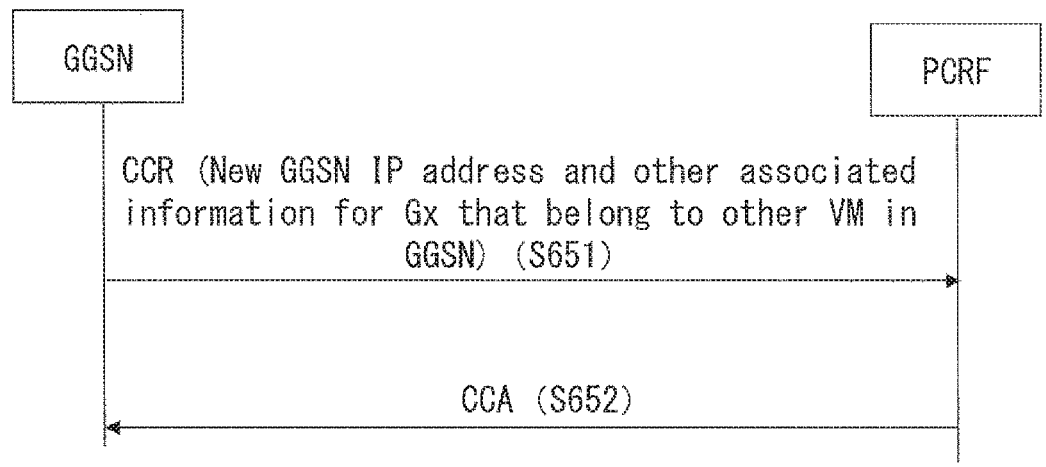
FIG. 88 shows a flow of the process that is performed when the VM of the Virtualized GGSN according to the second exemplary embodiment is deleted.

Next, a flow of a session information update process according to the second exemplary embodiment of the present invention is explained with reference to FIG. 88. FIG. 88 shows a process that is performed when one of the Gx VMs 181 to 183 of the Virtualized GGSN 180 is deleted. Note that the processes in FIG. 88 are similar to those explained in FIG. 59 except that the Virtualized GGSN 180 is used in place of the Virtualized PGW 140, and therefore their detailed descriptions are omitted here.

Figure 89:
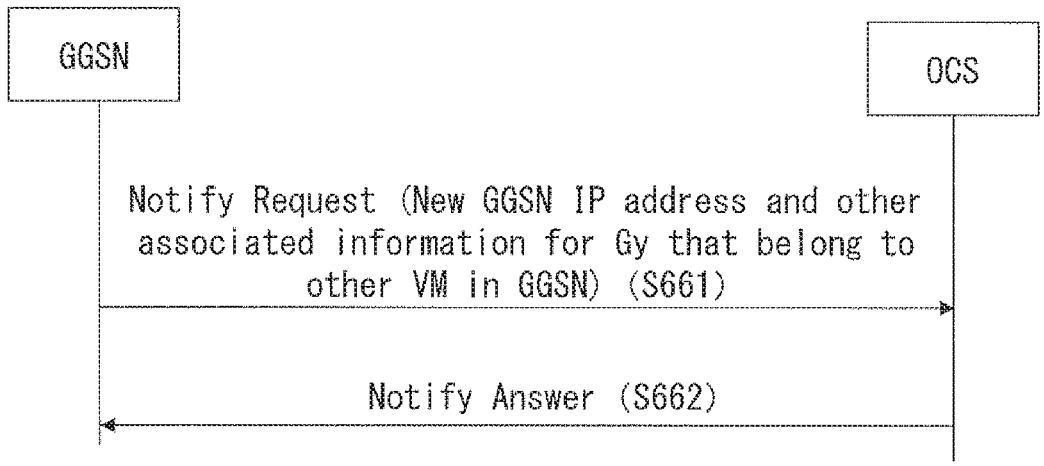
FIG. 89 shows a flow of the process that is performed when the VM of the Virtualized GGSN according to the second exemplary embodiment is deleted.

Next, a flow of a session information update process according to the second exemplary embodiment of the present invention is explained with reference to FIG. 89. FIG. 89 shows a process that is performed when one of the Gy/Gz VMs 184 to 186 of the Virtualized GGSN 180 is deleted. Note that the processes in FIG. 89 are similar to those explained in FIG. 60 except that the Virtualized GGSN 180 is used in place of the Virtualized PGW 140, and therefore their detailed descriptions are omitted here.

Figure 90:
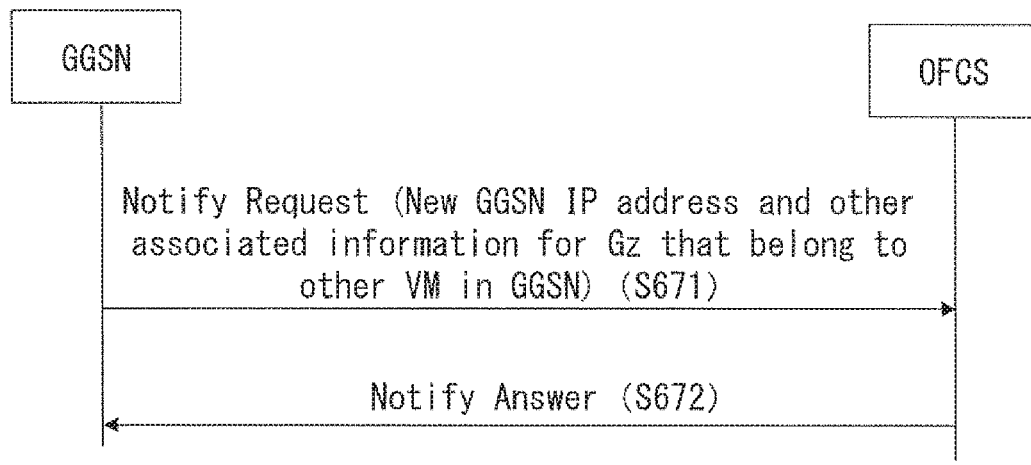
FIG. 90 shows a flow of the process that is performed when the VM of the Virtualized GGSN according to the second exemplary embodiment is deleted.

Next, a flow of a session information update process according to the second exemplary embodiment of the present invention is explained with reference to FIG. 90. FIG. 90 shows a process that is performed when one of the Gy/Gz VMs 184 to 186 of the Virtualized GGSN 180 is deleted. Note that the processes in FIG. 90 are similar to those explained in FIG. 61 except that the Virtualized GGSN 180 is used in place of the Virtualized PGW 140, and therefore their detailed descriptions are omitted here.

Figure 91:
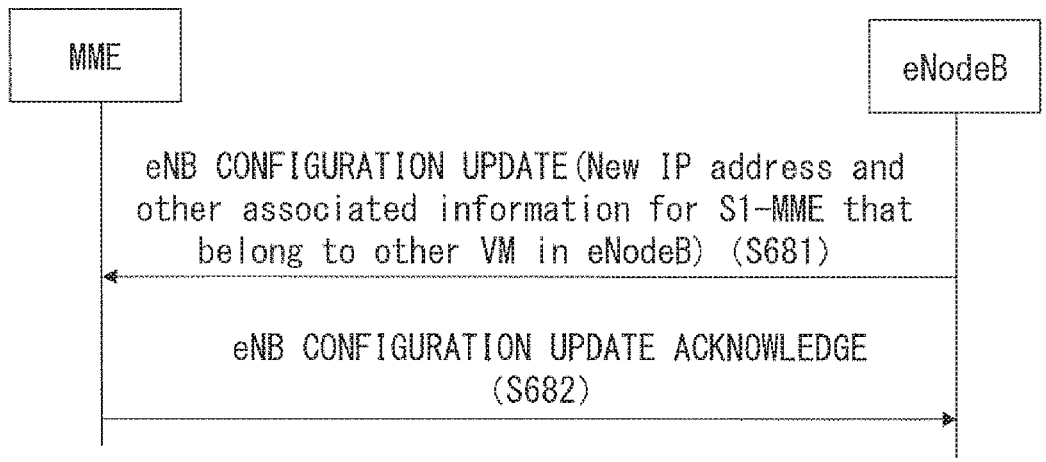
FIG. 91 shows a flow of a process that is performed when a VM of a Virtualized eNodeB according to the second exemplary embodiment is deleted.

Next, a flow of a session information update process according to the second exemplary embodiment of the present invention is explained with reference to FIG. 91. FIG. 91 shows a process that is performed when one of the S1-MME VMs 201 to 203 of the Virtualized eNodeB 200 is deleted.

The Virtualized eNodeB 200 transmits an eNB CONFIGURATION UPDATE message to the Virtualized MME 100 (S681). The Virtualized eNodeB 200 sets information about a VM at the transfer destination of the sessions after the deletion of one of the S1-MME VMs 201 to 203 in an eNB CONFIGURATION UPDATE message. Next, the Virtualized eNodeB 200 receives an eNB CONFIGURATION UPDATE ACKNOWLEDGE message as a response to the eNB CONFIGURATION UPDATE message (S682).

Figure 92:
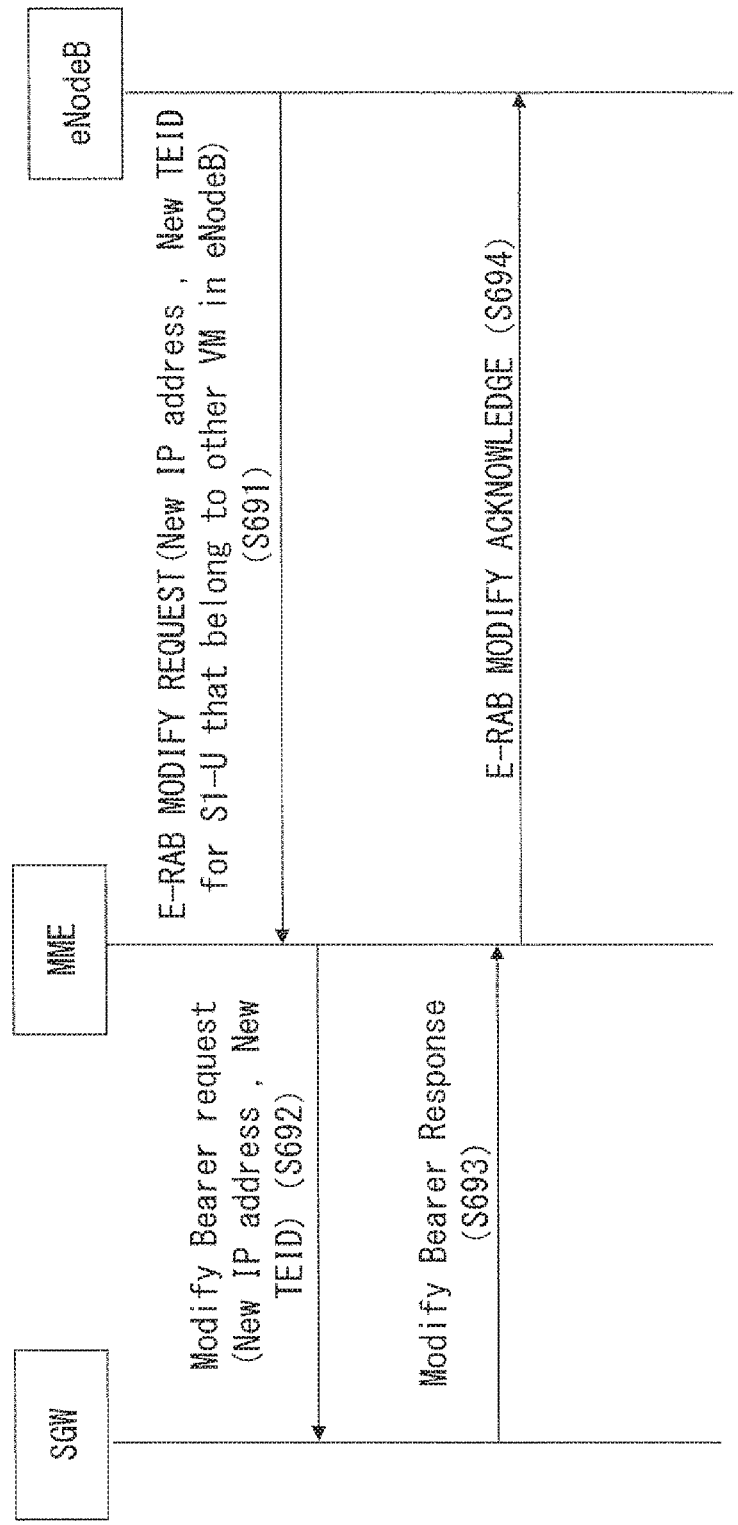
FIG. 92 shows a flow of the process that is performed when the VM of the Virtualized eNodeB according to the second exemplary embodiment is deleted.

Next, a flow of a session information update process according to the second exemplary embodiment of the present invention is explained with reference to FIG. 92. FIG. 92 shows a process that is performed when one of the S1-U VMs 204 to 206 of the Virtualized eNodeB 200 is deleted.

Firstly, the Virtualized eNodeB 200 transmits an E-RAB MODIFY Request message to the Virtualized MME 100 (S691). The Virtualized eNodeB 200 sets information about a VM at the transfer destination of the sessions after the deletion of one of the S1-U VMs 204 to 206 in an E-RAB MODIFY Request message. Note that the Virtualized eNodeB 200 transmits the E-RAB MODIFY Request message through an S1-MME interface.

Next, the Virtualized MME 100 transmits the Modify Bearer Request message in which the information notified (i.e., sent) from the Virtualized eNodeB 200 is set to the Virtualized SGW 120 (S692). Next, the Virtualized MME 100 receives a Modify Bearer Response message from the Virtualized SGW 120 as a response to the Modify Bearer Request message (S693). Next, the Virtualized MME 100 transmits an E-RAB MODIFY ACKNOWLEDGE message to the Virtualized eNodeB 200 as a response to the Modify Bearer Request message (S694).

Figure 93:
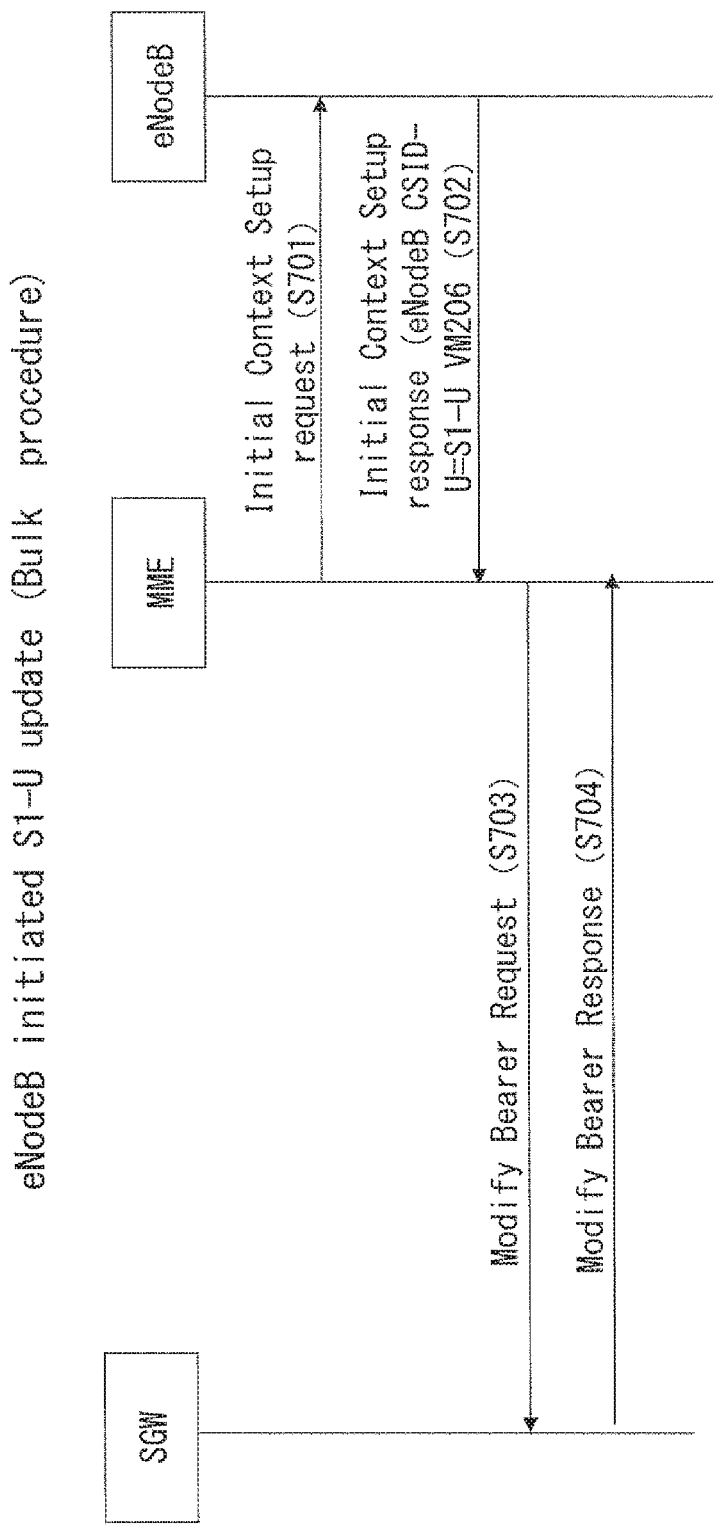
FIG. 93 shows a flow of the process that is performed when the VM of the Virtualized eNodeB according to the second exemplary embodiment is deleted.
Figure 94:
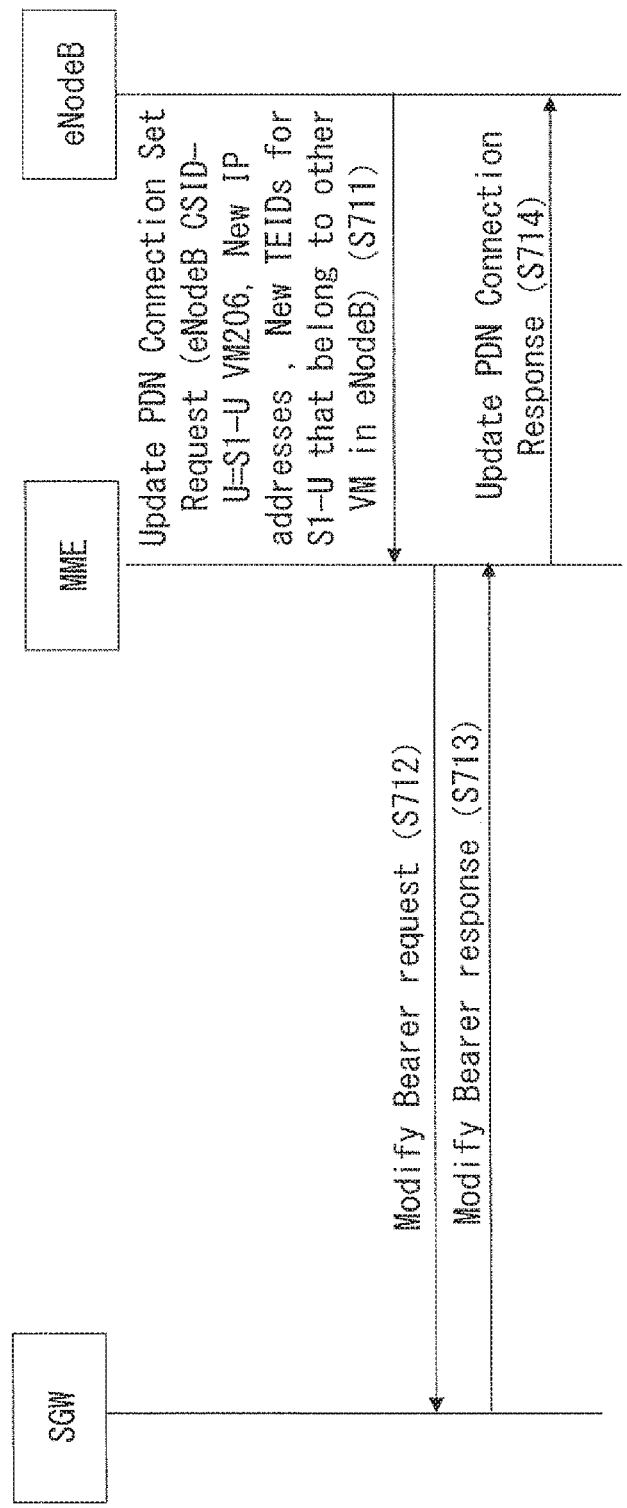
FIG. 94 shows a flow of the process that is performed when the VM of the Virtualized eNodeB according to the second exemplary embodiment is deleted.

Next, a flow of a session information update process according to the second exemplary embodiment of the present invention is explained with reference to FIGS. 93 and 94. FIGS. 93 and 94 show a process that is performed when the S1-U VM 206 of the Virtualized eNodeB 200 is deleted.

Firstly, the Virtualized eNodeB 200 transmits an Initial Context Setup Response message to the Virtualized MME 100 as a response to the Initial Context Setup Request message received in the step S701 (S702). The Virtualized eNodeB 200 sets a CSID associated with the S1-U VM 206 in the Initial Context Setup Response message. The Virtualized MME 100 notifies the Virtualized SGW 120 of the CSID notified (i.e., sent) from the Virtualized eNodeB 200 by transmitting/receiving a Modify Bearer Request message (S703) and a Modify Bearer Response message (S704).

In FIG. 94, when the Virtualized eNodeB 200 deletes the S1-U VM 206, the Virtualized eNodeB 200 transmits an Update PDN Connection Set Request message to the Virtualized MME 100. The Virtualized eNodeB 200 sets a CSID associated with the S1-U VM 206 to be deleted in the Update PDN Connection Set Request message (S711).

Next, when the Virtualized MME 100 receives the Update PDN Connection Set Request message with the CSID set therein, the Virtualized MME 100 transmits a Modify Bearer Request message to the Virtualized SGW 120 for a plurality of sessions associated with the CSID at a time (S712) and receives a Modify Bearer Response message as its response (S713). That is, the Virtualized MME 100 repeats the steps S712 and S713 until the processes for all the sessions have been completed.

When the processes for all the sessions have been completed, the Virtualized MME 100 transmits an Update PDN Connection Response message to the Virtualized eNodeB 200 (S714).

Figure 95:
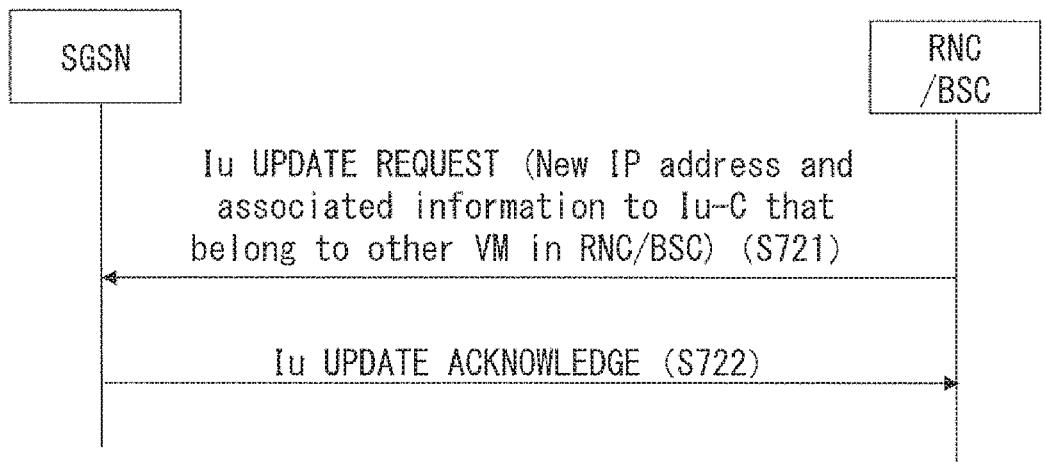
FIG. 95 shows a flow of a process that is performed when a VM of a Virtualized RNC according to the second exemplary embodiment is deleted.

Next, a flow of a session information update process according to the second exemplary embodiment of the present invention is explained with reference to FIG. 95. FIG. 95 shows a process that is performed when one of the Iu-C VMs 211 to 213 of the Virtualized RNC 210 is deleted. Note that the processes in FIG. 95 are similar to those explained in FIG. 68 except that the transmission source of each signal is interchanged with the transmission destination thereof, and therefore their detailed descriptions are omitted here.

Figure 96:
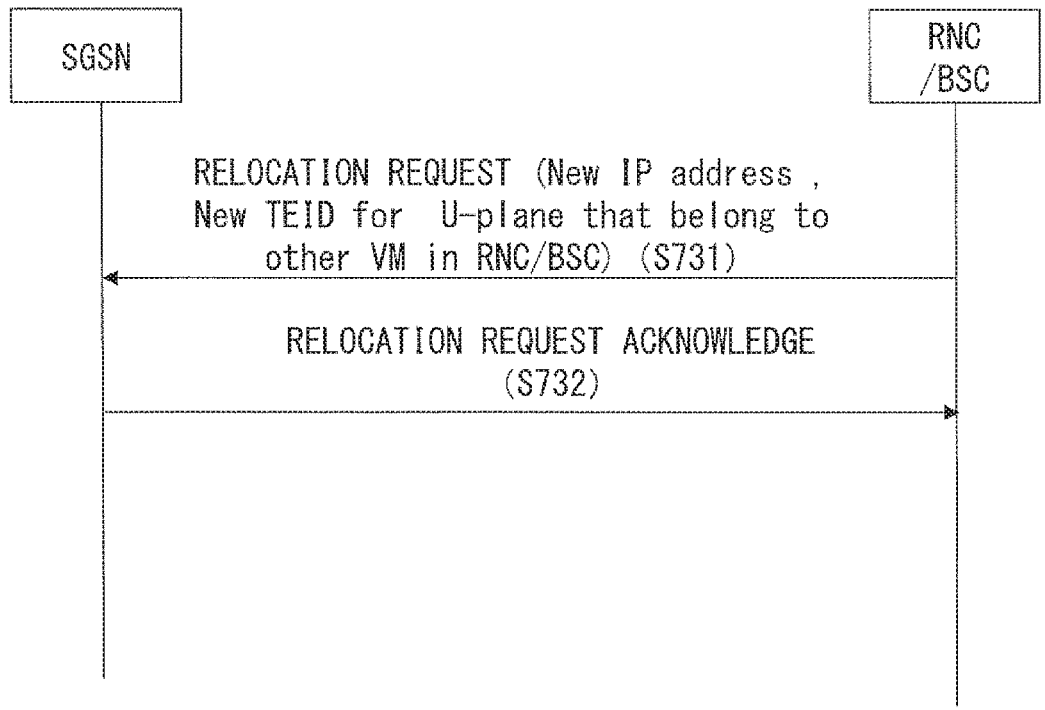
FIG. 96 shows a flow of the process that is performed when the VM of the Virtualized RNC according to the second exemplary embodiment is deleted.

Next, a flow of a session information update process according to the second exemplary embodiment of the present invention is explained with reference to FIG. 96. FIG. 96 shows a process that is performed when one of the Iu-U VMs 214 to 216 of the Virtualized RNC 210 is deleted. Note that the processes in FIG. 96 are similar to those explained in FIG. 69 except that the transmission source of each signal is interchanged with the transmission destination thereof, and therefore their detailed descriptions are omitted here.

Figure 97:
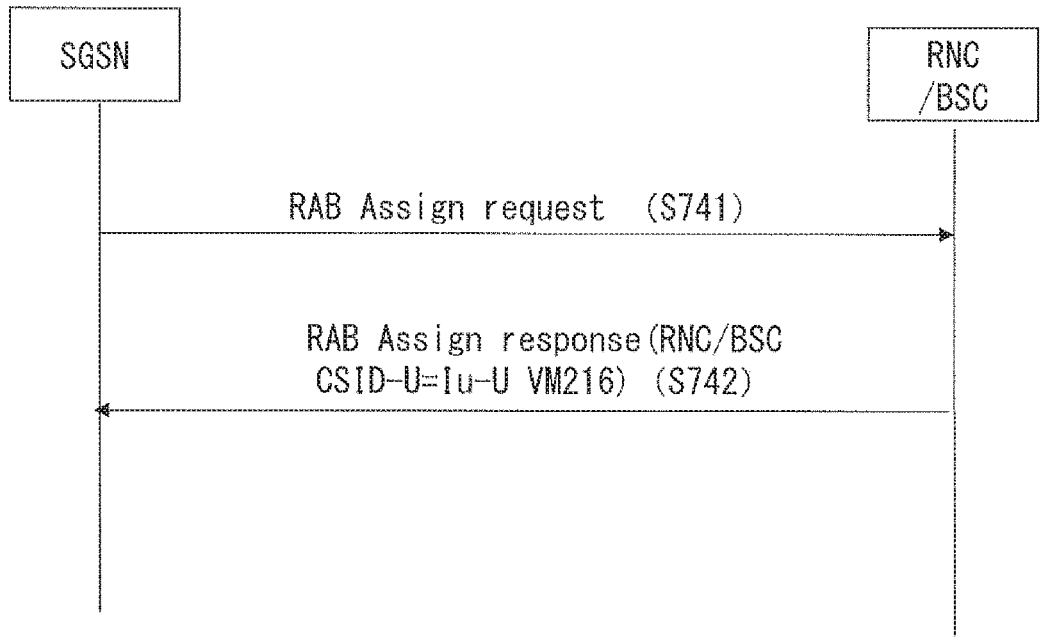
FIG. 97 shows a flow of the process that is performed when the VM of the Virtualized RNC according to the second exemplary embodiment is deleted.
Figure 98:
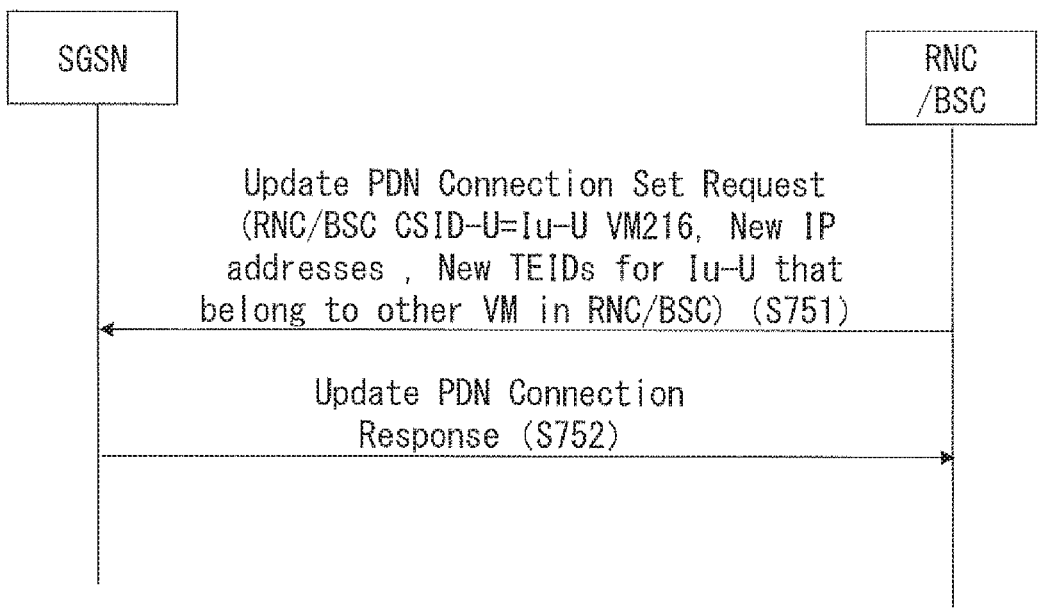
FIG. 98 shows a flow of the process that is performed when the VM of the Virtualized RNC according to the second exemplary embodiment is deleted.

Next, a flow of a session information update process according to the second exemplary embodiment of the present invention is explained with reference to FIGS. 97 and 98. FIGS. 97 and 98 show a process that is performed when the Iu-U VM 216 of the Virtualized RNC 210 is deleted.

In FIG. 97, firstly, the Virtualized RNC 210 transmits a RAB Assign Response message to the Virtualized SGSN 160 as a response to the RAB Assign Request message received in the step S741 (S742). The Virtualized RNC 210 sets a CSID associated with the Iu-U VM 216 in the RAB Assign Response message.

FIG. 98 shows a bulk process between the Virtualized RNC 210 and the Virtualized SGSN 160. Note that the processes in FIG. 98 are similar to those explained in FIG. 71 except that the transmission source of each signal is interchanged with the transmission destination thereof, and therefore their detailed descriptions are omitted here.

As explained above, by using the communication process according to the second exemplary embodiment of the present invention, it is possible, when a given VM is to be deleted, to notify the counterpart node device of the VM to which the sessions are transferred. As a result, the counterpart node device can communicates, for the node device in which the VM is changed, with the VM to which the sessions are transferred. Therefore, since a VM transfer process can be performed in neighboring node devices, there is no need to make a terminal device perform a Detach process and the like which would otherwise have to be performed when the transfer of a VM is performed. Consequently, since there is no need to perform the Detach process and the like, the number of control signals that occur in the communication network can be reduced.

Although the present invention is described as a hardware configuration in the above-described exemplary embodiments, the present invention is not limited to the hardware configurations. In the present invention, a process flow explained with reference to a respective figure can be also implemented by causing a CPU (Central Processing Unit) to execute a computer program.

In the above-described examples, the program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Note that the present invention is not limited to the aforementioned exemplary embodiments and may be changed as appropriate without departing from the spirit of the present invention.

Although the present invention is explained with reference to exemplary embodiments, the present invention is not limited to the above-described exemplary embodiments. Various modifications that can be understood by those skilled in the art can be made to the configuration and details of the present invention within the scope of the invention.

This application is based upon and claims the benefit of priority from Japanese patent applications No. 2014-25566, filed on Feb. 13, 2014, the disclosure of which is incorporated herein in its entirety by reference.

REFERENCE SIGNS LIST

1 COMMUNICATION DEVICE
2 COMMUNICATION DEVICE
3 VM
4 VM
5-8 COMMUNICATION RESOURCE
10 UE
11 E-UTRAN
12 MME
13 SGW
14 SGSN
15 HSS
16 PGW
17 PCRF
18 OPERATOR NETWORK
21 HSS
22 PGW
23 PCRF
24 OPERATOR NETWORK
31 TE
32 MT
33 UTRAN
34 SGSN
35 TE
36 MT
37 BSS
38 SGSN
39 GGSN
40 GGSN
41 MSC/VLR
42 SMS-GMSC, SMS-IWMSC
43 SMS-SC
44 gsmSCF
45 CGF
46 EIR
47 Billing System
48 TE
49 HLR
51 BBERF
52 V-PCRF
53 SPR 54 H-PCRF
55 PCEF
56 Gateway
57 AF
58 OCS
59 TDF
60 OFCS
71 UE
72 E-UTRAN
73 GERAN
74 UTRAN
75 SGSN
76 MME
77 MSC Server
100 Virtualized MME
101-106 S6a VM
107, 108 SGs VM
109-111 S1-MME VM
120 Virtualized SGW
121, 122 Gxx VM
123, 124 S5/S8-C VM
125, 126 S5/S8-U VM
127, 128 S11 VM
129, 130 S1-U VM
131, 132 S12 VM
140 Virtualized PGW
141-143 Gx VM
144, 145 Gy/Gz VM
146 Gy/Gz VM
147, 148 SGi VM
149, 150 S5/S8-C VM
151, 152 S5/S8-U VM
160 Virtualized SGSN
161, 162 S4-C VM
163, 164 Gn-C VM
165, 166 Gn-U VM
167, 168 Gr/S6d VM
169, 170 S4-U VM
171, 172 Gs VM
173, 174 Iu-C VM
175, 176 Iu-U VM
180 Virtualized GGSN
181-183 Gx VM
184, 185 Gy/Gz VM
186 Gy/Gz VM
187, 188 Gi VM
189, 190 Gn-C VM
191, 192 Gn-U VM
200 Virtualized eNodeB
201-203 S1-MME VM
204-206 S1-U VM
207 LTE-Uu
210 Virtualized RNC
211-213 Iu-C VM
214-216 Iu-U VM
217 Uu

The invention claimed is:

1. A mobile communication system comprising:
a first virtualized communication device configured to manage a session between communication devices; and
a second virtualized communication device configured to perform mobility management of a terminal device,
wherein:
the first virtualized communication device sends information comprising an indication of a third visualized communication device as a transfer destination of an old session between communication devices to the second virtualized communication device;
a new session is established by the third virtualized communication device indicated by the information; and
the old session established by the first virtualized communication device is released after the new session is established.

2. A first virtualized communication device used in a mobile communication system, the first virtualized communication device comprising:
a controller configured to manage a session between communication devices; and
a transmitter configured to send information comprising an indication of a third virtualized communication device as a transfer destination of an old session between communication devices to a second virtualized communication deice that performs mobility management of a terminal device,
wherein:
a new session is established by the third virtualized communication device based on the information; and
the old session established by the first virtualized communication device is released after the new session is established.

3. A communication method for a first virtualized communication device used in a mobile communication system, the communication method comprising:
managing a session between communication devices; and
sending information indicating a third virtualized communication device for as a transfer destination of an old session between communication devices to a second virtualized communication device that performs mobility management of a terminal device,
wherein:
a new session is established by the third virtualized communication device based on the information; and
the old session established by the first virtualized communication device is released after the new session is established.

* * * * *